(12) United States Patent
Chastine et al.

(10) Patent No.: US 10,357,796 B2
(45) Date of Patent: Jul. 23, 2019

(54) HOT MELT ADHESIVE SUPPLY AND METHODS ASSOCIATED THEREWITH

(71) Applicant: NORDSON CORPORATION, Westlake, OH (US)

(72) Inventors: Christopher R. Chastine, Lawrenceville, GA (US); Justin A. Clark, Suwanee, GA (US); Peter W. Estelle, Norcross, GA (US); Howard B. Evans, Sugar Hill, GA (US); Charles P. Ganzer, Cumming, GA (US); Manuel A. Guerrero, Kennesaw, GA (US); Enes Ramosevac, Snellville, CA (US); John M. Riney, Buford, GA (US); Sang Hyub Shin, Duluth, GA (US); Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 564 days.

(21) Appl. No.: 15/043,285

(22) Filed: Feb. 12, 2016

(65) Prior Publication Data

US 2016/0236230 A1    Aug. 18, 2016

Related U.S. Application Data

(60) Provisional application No. 62/115,964, filed on Feb. 13, 2015.

(51) Int. Cl.
*B05B 7/14*   (2006.01)
*B05C 11/10*  (2006.01)
(Continued)

(52) U.S. Cl.
CPC ........ *B05C 11/1042* (2013.01); *B05B 7/1472* (2013.01); *B29B 13/022* (2013.01);
(Continued)

(58) Field of Classification Search
CPC ....... B05C 11/1042; B29B 13/022; F27B 1/00
(Continued)

(56) References Cited

U.S. PATENT DOCUMENTS

| 1,570,795 A | 1/1926 | Tainton et al. |
| 2,116,105 A | 5/1938 | Stanley et al. |

(Continued)

FOREIGN PATENT DOCUMENTS

| CN | 103721900 | 4/2014 |
| EP | 2937145 A1 | 10/2015 |
| FR | 2952918 A1 | 5/2011 |

OTHER PUBLICATIONS

International Application No. PCT/US2016/017838: International Search Report and Written Opinion dated Sep. 2, 2016, 37 pages.
(Continued)

*Primary Examiner* — Avinash A Savani
*Assistant Examiner* — Aaron H Heyamoto
(74) *Attorney, Agent, or Firm* — Baker & Hostetler LLP

(57) ABSTRACT

A melter for heating and melting particulate hot melt adhesive into a liquefied form is disclosed. The melter includes a heated receiving device having an interior with an inlet configured to receive the particulate hot melt adhesive and an outlet. A flexible hopper holds a supply of the particulate hot melt adhesive and a particulate hot melt adhesive feed device allows the particulate hot melt adhesive to be directed from the flexible hopper to the inlet of the heated receiving device.

26 Claims, 50 Drawing Sheets

(51) Int. Cl.
*B29B 13/02* (2006.01)
*B65G 11/10* (2006.01)
*F27B 1/00* (2006.01)
*F27D 3/00* (2006.01)
*F27D 27/00* (2010.01)
*B65G 11/20* (2006.01)
*B05B 15/25* (2018.01)

(52) U.S. Cl.
CPC .......... *B65G 11/106* (2013.01); *B65G 11/206* (2013.01); *F27B 1/00* (2013.01); *F27D 3/0033* (2013.01); *F27D 27/00* (2013.01); *F27D 27/005* (2013.01); *B05B 15/25* (2018.02)

(58) Field of Classification Search
USPC ............................................. 126/284; 432/13
See application file for complete search history.

(56) References Cited

U.S. PATENT DOCUMENTS

| | | |
|---|---|---|
| 4,863,065 A | 9/1989 | Decrane |
| 5,271,695 A | 12/1993 | Bischof et al. |
| 5,567,048 A | 10/1996 | Hammonds |
| 5,947,333 A | 9/1999 | Hoffmann et al. |
| 5,975,366 A | 11/1999 | Ridgley |
| 6,290,098 B1 | 9/2001 | Sterner et al. |
| 9,764,537 B2 | 9/2017 | Chau et al. |
| 2005/0194405 A1 | 9/2005 | Kosich |
| 2012/0009046 A1 | 1/2012 | Mauchle et al. |
| 2013/0161356 A1 | 6/2013 | Kawata |
| 2014/0102858 A1* | 4/2014 | Chau ................... B05C 11/1002 198/617 |
| 2015/0307271 A1 | 10/2015 | Rey et al. |

OTHER PUBLICATIONS

PCT Application No. PCT/US2016/017838: Invitation to Pay Additional Fees dated May 23, 2016, 13 pages.
Observations by third parties Mailed on Dec. 20, 2018 for EP Application No. 16709851.
CN Office Action dated Jan. 4, 2019 for CN Application No. 201680009922.

* cited by examiner

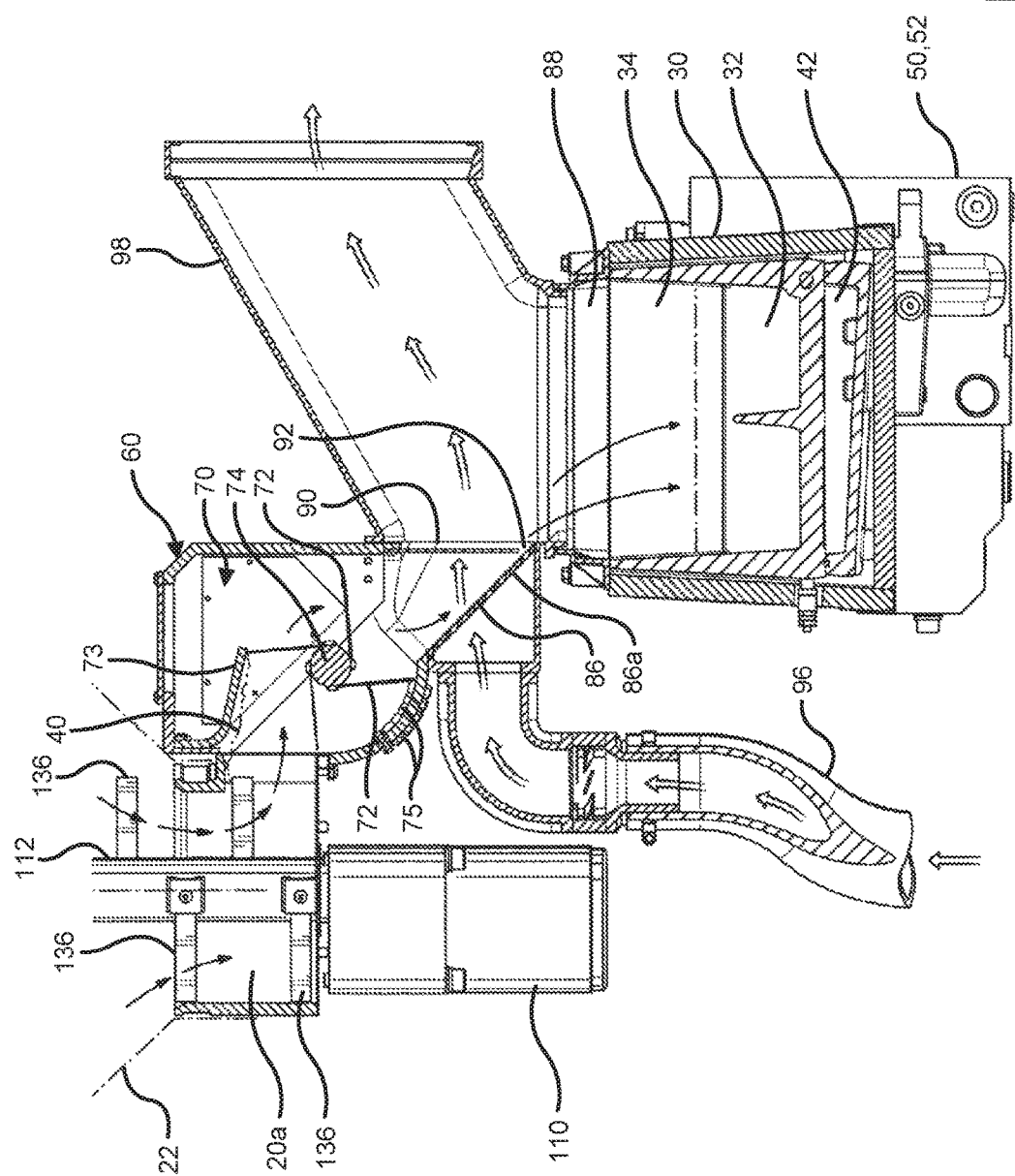

HOT MELT ADHESIVE SUPPLY AND METHODS ASSOCIATED THEREWITH

CROSS REFERENCE TO RELATED APPLICATIONS

This application claims priority to U.S. Provisional Patent Application No. 62/115,964, filed Feb. 13, 2015, which is incorporated herein by reference in its entirety.

FIELD OF THE INVENTION

The present invention generally relates to hot melt adhesive systems.

BACKGROUND

Hot melt adhesive systems have many applications in manufacturing and packaging. For example, thermoplastic hot melt adhesives are used for carton sealing, case sealing, tray forming, pallet stabilization, nonwoven applications including diaper manufacturing, and many other applications. Hot melt adhesives often come in the form of solid or semi-solid pellets or particulates. These hot melt adhesive particulates are melted into a liquid form by a melter, and the liquid hot melt adhesive is ultimately applied to an object such as a work piece, substrate or product by a dispensing device suitable to the application.

A supply of unmelted hot melt adhesive pieces (referred to variously herein as "particulate hot melt adhesive," "hot melt adhesive particulate," "adhesive particulate", or simply "particulate") must be maintained and delivered to the melter in order for the melter to produce the liquid hot melt adhesive used by the dispensing device. For example, it is known for a person to employ a scoop or bucket to retrieve hot melt adhesive particulate from a bulk supply, and to deliver the particulate to a melter. Typically, this involves filling a hopper or other container associated with the melter one scoop of hot melt adhesive particulate at a time. This requires the person to handle the hot melt adhesive particulate closely, which may be undesirable because hot melt adhesive dust may be stirred up during handling. In addition, transferring hot melt adhesive particulate in this manner is prone to waste caused by spillage.

Other challenges relate to issues surrounding the propensity for particulates of hot melt adhesive to become stuck together under certain storage and use conditions. If particulates stick or agglomerate together, it becomes difficult to feed the particulate into a hopper and/or into an associated melter tank. Once the particulates are in the hopper associated with a melter tank, and the hopper is separated from the melter tank by a particulate feed device, clumping and sticking of particulates can be caused by heat emanating from the melter tank. Therefore, improvements generally related to these and related areas of hot melt adhesive dispensing systems are needed.

SUMMARY

In a first illustrative embodiment, the invention provides a melter for heating and melting particulate hot melt adhesive into a liquefied form. The melter includes a heated receiving device having an interior with an inlet configured to receive the particulate hot melt adhesive and an outlet, the heated receiving device operative to heat and melt the particulate hot melt adhesive, and direct the hot melt adhesive as a liquefied form to the outlet. A flexible hopper is configured to hold a supply of the particulate hot melt adhesive. A particulate hot melt adhesive feed device allows the particulate hot melt adhesive to be directed from the flexible hopper to the inlet of the heated receiving device.

The melter may have various alternative or additional aspects or components. For example, the flexible hopper further comprises a bag, and the bag may be formed of any suitable material for the application needs. One advantageous material is fabric, such as any strong woven or nonwoven material that can hold particulate hot melt adhesive. The flexible hopper further comprises at least a first section that can be articulated relative to another section to move particulate adjacent to a wall of the flexible hopper toward a central interior location of the flexible hopper.

In another embodiment, the invention provides a melter for heating and melting particulate hot melt adhesive into a liquefied form, including a heated receiving device having an interior with an inlet configured to receive the particulate hot melt adhesive and an outlet. The heated receiving device is operative to heat and melt the particulate hot melt adhesive, and direct the hot melt adhesive as a liquefied form to the outlet. A flexible hopper is configured to hold a supply of the particulate hot melt adhesive. An articulation device includes a driven element operative to move the particulate hot melt adhesive held in the flexible hopper. A particulate hot melt adhesive feed device allows the particulate hot melt adhesive to be directed from the flexible hopper to the inlet of the heated receiving device. This embodiment, as with the remaining embodiments, may also have alternative or additional aspects and/or components, such as described herein.

The flexible hopper further comprises movable wall portions and an articulation device moves the wall portions to move the particulate hot melt adhesive held in the flexible hopper. The articulation device may be operatively coupled to the interior and/or exterior of the movable wall portions associated with the flexible hopper.

In another embodiment, the invention provides a melter for heating and melting particulate hot melt adhesive into a liquefied form, including a heated receiving device having an interior with an inlet configured to receive the particulate hot melt adhesive and an outlet. The heated receiving device is operative to heat and melt the particulate hot melt adhesive, and direct the hot melt adhesive as a liquefied form to the outlet. A hopper is configured to hold a supply of the particulate hot melt adhesive. A driven device is positioned within the hopper. The driven device is capable of moving to thereby move the particulate hot melt adhesive within the hopper. A particulate hot melt adhesive feed device allows the particulate hot melt adhesive to be directed from the hopper to the inlet of the heated receiving device. The driven device may take on any suitable form. For example, the driven device may further comprise at least one rotating element configured to stir the particulate hot melt adhesive.

In another embodiment, the invention provides a melter for heating and melting particulate hot melt adhesive into a liquefied form, including a heated receiving device having an interior with an inlet configured to receive the particulate hot melt adhesive and an outlet. The heated receiving device is operative to heat and melt the particulate hot melt adhesive, and direct the hot melt adhesive as a liquefied form to the outlet. A hopper is configured to hold a supply of the particulate hot melt adhesive. A particulate hot melt adhesive feed device includes a driven feed element operative to move the particulate hot melt adhesive from the hopper to the inlet of the heated receiving device. A cover element is mounted for movement adjacent to the inlet of the heated receiving device between an open condition and a closed condition. The cover element is in the open condition when the feed device is activated to move the particulate hot melt adhesive to the inlet, and the cover element is in the closed condition when the feed device is not moving the particulate hot melt adhesive to the inlet. The driven feed element may take any suitable form. As examples, the feed element may further comprise at least one of: a rotating wheel, an auger, or a conveyor. The cover element may, for example, be heated and in the closed condition particulate hot melt adhesive will melt and flow past the cover element into the interior of the heated receiving device.

In another embodiment, the invention provides a melter for heating and melting particulate hot melt adhesive into a liquefied form, including a heated receiving device having an interior with an inlet configured to receive the particulate hot melt adhesive and an outlet. The heated receiving device is operative to heat and melt the particulate hot melt adhesive, and direct the hot melt adhesive as a liquefied form to the outlet. A hopper is configured to hold a supply of the particulate hot melt adhesive. A particulate hot melt adhesive feed device includes a driven feed element operative to move the particulate hot melt adhesive from the hopper to the inlet of the heated receiving device. An air mover device is positioned proximate the inlet opening of the heated receiving device, and the air mover device directs air across the inlet opening.

In another embodiment, the invention provides a melter for heating and melting particulate hot melt adhesive into a liquefied form, including a heated receiving device having an interior with an inlet configured to receive the particulate hot melt adhesive and an outlet. The heated receiving device is operative to heat and melt the particulate hot melt adhesive, and direct the hot melt adhesive as a liquefied form to the outlet. A prepackaged container is provided and holds a supply of the particulate hot melt adhesive. The prepackaged container includes an outlet. A particulate hot melt adhesive feed device allows the particulate hot melt adhesive to be directed from the outlet of the prepackaged container to the inlet of the heated receiving device.

The prepackaged container may take many forms. As examples, the prepackaged container can further comprise a bag and, therefore, be flexible. Or, the prepackaged container may comprise a rigid container. Even when the container comprises a bag, it may include rigid portions for support and/or at various locations such as at the outlet. A cover is provided on the outlet of the prepackaged container, and the cover is capable of being opened for establishing a flow path for the particulate hot melt adhesive through the outlet of the prepackaged container. For example, the cover may comprise a rupturable element that opens when mounted to the melter, such as by a piercing element. Alternatively, the cover may be manually or automatically opened during or after a process used to connect the prepackaged container to the melter.

In another embodiment, the invention provides a melter for heating and melting particulate hot melt adhesive into a liquefied form, including a heated receiving device having an interior with an inlet configured to receive the particulate hot melt adhesive and an outlet. The heated receiving device is operative to heat and melt the particulate hot melt adhesive, and direct the hot melt adhesive as a liquefied form to the outlet. A container mounting component is positioned adjacent the heated receiving device. A prepackaged container is directly connected to the container mounting component and holds a supply of the particulate hot melt adhesive. The prepackaged container includes an outlet. The prepackaged container is capable of being connected to and disconnected from the container mounting component to allow removal of one prepackaged container and replacement by a different prepackaged container. A particulate hot melt adhesive feed device allows the particulate hot melt adhesive to be directed from the outlet of the prepackaged container to the inlet of the heated receiving device. The prepackaged container may have various alternative or additional features or components, such as described herein as examples.

In another embodiment, the invention provides a flexible hopper configured to hold a supply of the particulate hot melt adhesive for use with a melter for heating and melting particulate hot melt adhesive into a liquefied form. The flexible hopper comprises at least one side wall defining an interior for holding the particulate hot melt adhesive. The side wall includes at least a first section that can be moved relative to another section to move particulate adjacent to a wall of the flexible hopper toward a central interior location of the flexible hopper. An outlet of the flexible hopper is in communication with the interior. A coupling element is configured to connect the outlet with a particulate hot melt adhesive feed device of the melter. The flexible hopper may have various additional or alternative features or components, such as those described herein.

In another aspect, the invention provides various methods. For example, a method is provided for heating and melting particulate hot melt adhesive into a liquefied form. The method includes holding a supply of the particulate hot melt adhesive in a flexible hopper including an outlet coupled in fluid communication with a pathway leading to an inlet of a heated receiving device. Particulate hot melt adhesive is fed from the outlet of the flexible hopper through the inlet of the heated receiving device. The particulate hot melt adhesive is heated and melted in an interior of the heated receiving device. Liquefied hot melt adhesive is directed from the interior of the heated receiving device to an outlet of the heated receiving device. The liquefied hot melt adhesive is directed from the outlet to a hot melt adhesive dispenser.

This method, as well as the other methods disclosed herein may have various additional or alternative aspects or steps. For example, agglomerated masses of the particulate hot melt adhesive in the flexible hopper may be broken apart by 1) moving at least one wall portion of the flexible hopper relative to another wall portion of the flexible hopper and/or 2) moving a device within the flexible hopper configured to contact and break apart the agglomerated masses.

Another method for heating and melting particulate hot melt adhesive into a liquefied form includes holding a supply of the particulate hot melt adhesive in a flexible hopper including an outlet coupled in fluid communication with a pathway leading to an inlet of a heated receiving device. The particulate hot melt adhesive in the flexible hopper is moved by a device within the flexible hopper. The particulate hot melt adhesive is fed from the outlet of the flexible hopper through the inlet of the heated receiving device. The particulate hot melt adhesive is heated and melted in an interior of the heated receiving device. Liquefied hot melt adhesive is directed from the interior of the heated receiving device to an outlet of the heated receiving device. The liquefied hot melt adhesive is pumped from the outlet to a hot melt adhesive dispenser.

Moving the particulate hot melt adhesive further comprises rotating the device within the flexible hopper. Moving the particulate hot melt adhesive can further or alternatively comprise moving at least one wall portion of the flexible hopper with respect to another wall portion of the flexible hopper.

Another method for heating and melting particulate hot melt adhesive into a liquefied form includes holding a supply of the particulate hot melt adhesive in a flexible hopper including an outlet coupled in fluid communication with a pathway leading to an inlet of a heated receiving device. At least one wall portion of the flexible hopper is moved with respect to another wall portion of the flexible hopper. The particulate hot melt adhesive is fed from the outlet of the flexible hopper through the inlet of the heated receiving device. The particulate hot melt adhesive is heated and melted in an interior of the heated receiving device. Liquefied hot melt adhesive is directed from the interior of the heated receiving device to an outlet of the heated receiving device. The liquefied hot melt adhesive is pumped from the outlet to a hot melt adhesive dispenser.

Moving the particulate hot melt adhesive in the flexible hopper further comprises engaging an interior surface of the wall portion with a driven device and moving the wall portion inward and outward. Moving the particulate hot melt adhesive in the flexible hopper can further or alternatively comprise engaging an exterior surface of the wall portion with a driven device and moving the wall portion inward and outward.

Another method for heating and melting particulate hot melt adhesive into a liquefied form includes holding a supply of the particulate hot melt adhesive in a first prepackaged container including a first outlet coupled in fluid communication with a pathway leading to an inlet of a heated receiving device. The particulate hot melt adhesive is fed from the first outlet of the first prepackaged container through the inlet of the heated receiving device. The particulate hot melt adhesive from the first prepackaged container is heated and melted in an interior of the heated receiving device. Liquefied hot melt adhesive is directed from the interior of the heated receiving device to an outlet of the heated receiving device. The liquefied hot melt adhesive is directed from the outlet to a hot melt adhesive dispenser. The first prepackaged container is removed from fluid communication with the pathway, and replaced with a second prepackaged container of particulate hot melt adhesive including a second outlet. The particulate hot melt adhesive is then fed from the second outlet of the second prepackaged container through the inlet of the heated receiving device, and the corresponding heating, melting, directing and pumping steps are performed with regard to the particulate from the second prepackaged container.

As exemplary additional aspects, the first and second prepackaged containers further comprise flexible bags, and the method further comprises opening respective first and second covers disposed over the first and second outlets either during or after coupling the first and second prepackaged containers, respectively, to a melter.

Various additional aspects and features of the invention will become more readily apparent to those of ordinary skill in the art upon review of the following detailed description of the illustrative embodiments.

BRIEF DESCRIPTION OF THE DRAWINGS

FIG. 6A is a cross sectional view similar to FIG. 5 and illustrating further operational details.

DETAILED DESCRIPTION

Figure 1:
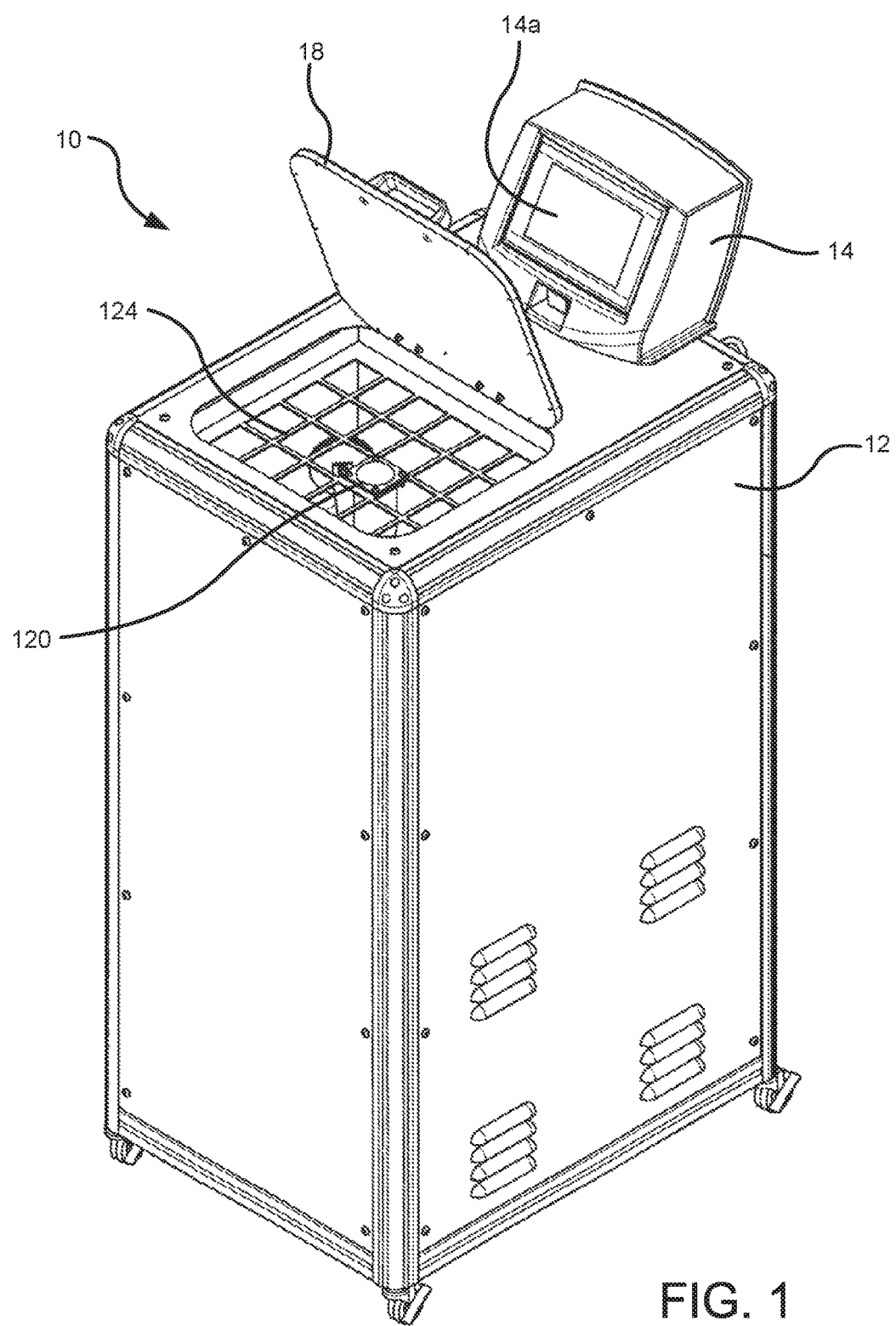
FIG. 1 is perspective view of a melter constructed in accordance with a first embodiment of the invention.
Figure 2:
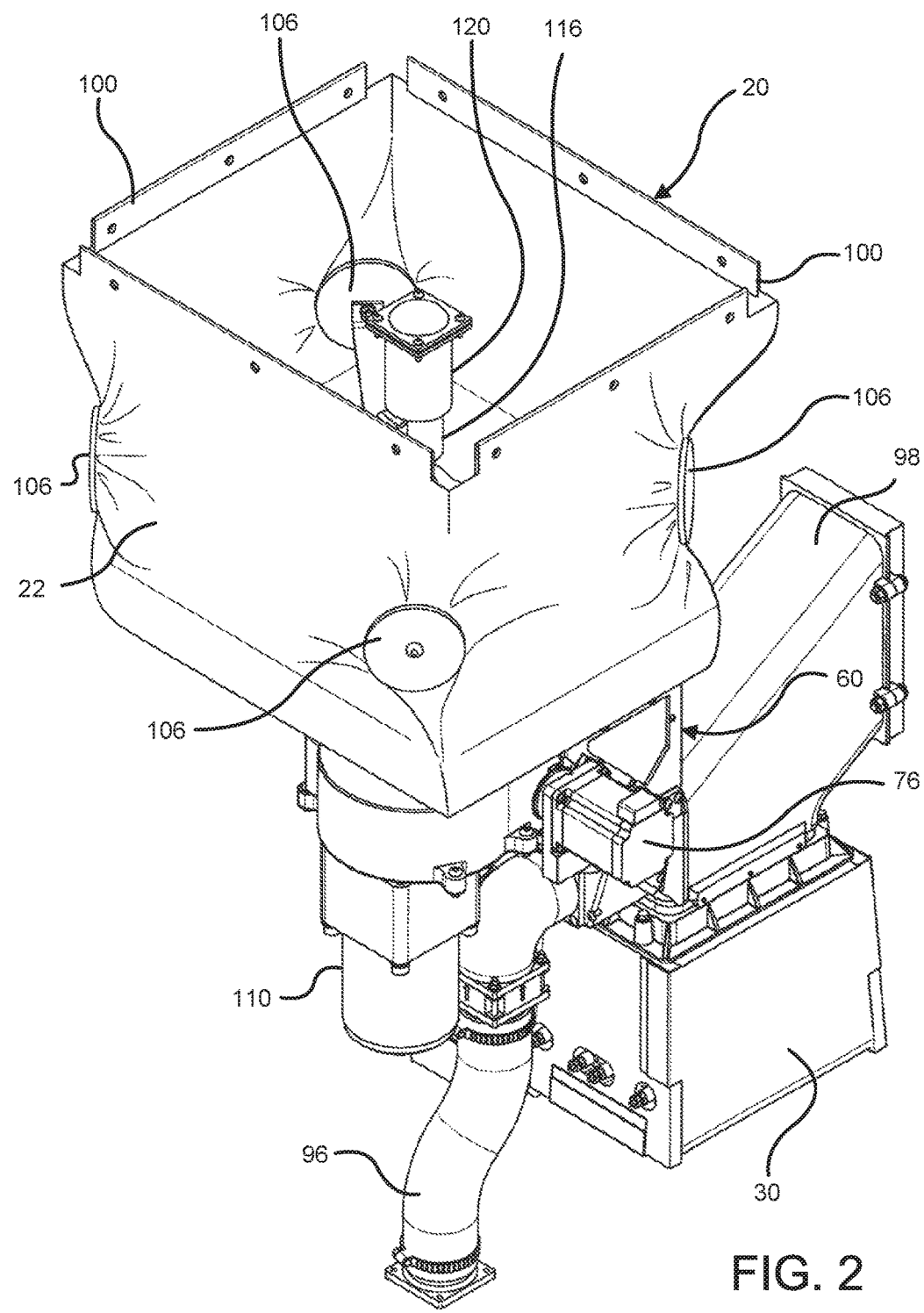
FIG. 2 is a perspective view of interior components of the melter shown in FIG. 1, including a first embodiment of a flexible hopper.

FIGS. 1 through 8 illustrate a first illustrative embodiment of a melter 10 constructed in accordance with various aspects of the invention. It will be appreciated that like reference numbers throughout the figures of the same or different embodiments refer to like elements of structure. Therefore, with regard to later embodiments, descriptions of such like structure will not need to be repeated. FIG. 1 illustrates generally an outer housing 12 and a controller 14 with a control panel 14a for allowing an operator to control the various parameters and operational aspects of the melter 10. The housing 12 includes a lid 18 which may be opened for purposes of filling a particulate hot melt adhesive hopper 20 within the housing 12. As more specifically shown in FIGS. 2 through 4, which eliminate the outer housing 12 of the melter 10, the hopper 20 comprises a flexible container or bag 22 in this embodiment. It will be appreciated that various aspects of the melter 10 may be practiced instead with a melter that uses a hopper made with an inflexible or more rigid construction. In this embodiment, the bag 22 is constructed from a strong fabric type material, such as woven or nonwoven material that may be easily flexed without tearing or otherwise weakening the structure of the bag 22 through repeated motions. In other embodiments, the flexible hoppers 20 of this invention instead may be formed in multiple sections of rigid polymer, sheet metal, or other materials, and the sections may be coupled together for movement relative to each other such as by the use of hinge structures. As used herein, the term "flexible hopper" means a hopper having one or more side wall portions capable of repeatedly moving back and forth toward and away from an opposite wall portion by a distance more than that caused by mere vibration. For example, the material forming a flexible hopper wall portion is capable of moving back and forth through a distance equal to 10% or more of the total distance to an opposite wall portion without plastic deformation of the moving wall portion.

Figure 5:
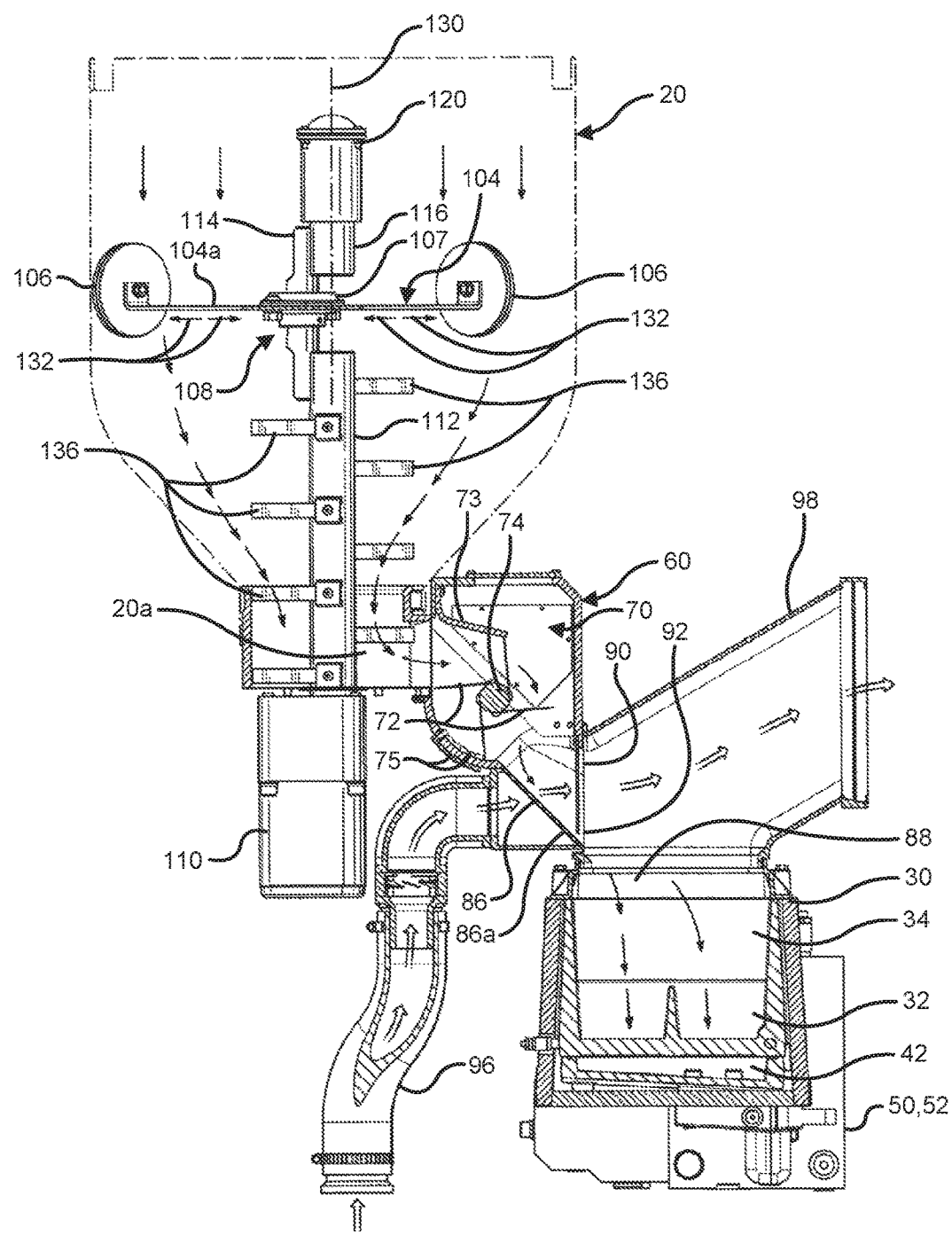
FIG. 5 is an elevational view, partially sectioned to show further interior details and operation.
Figure 6B:
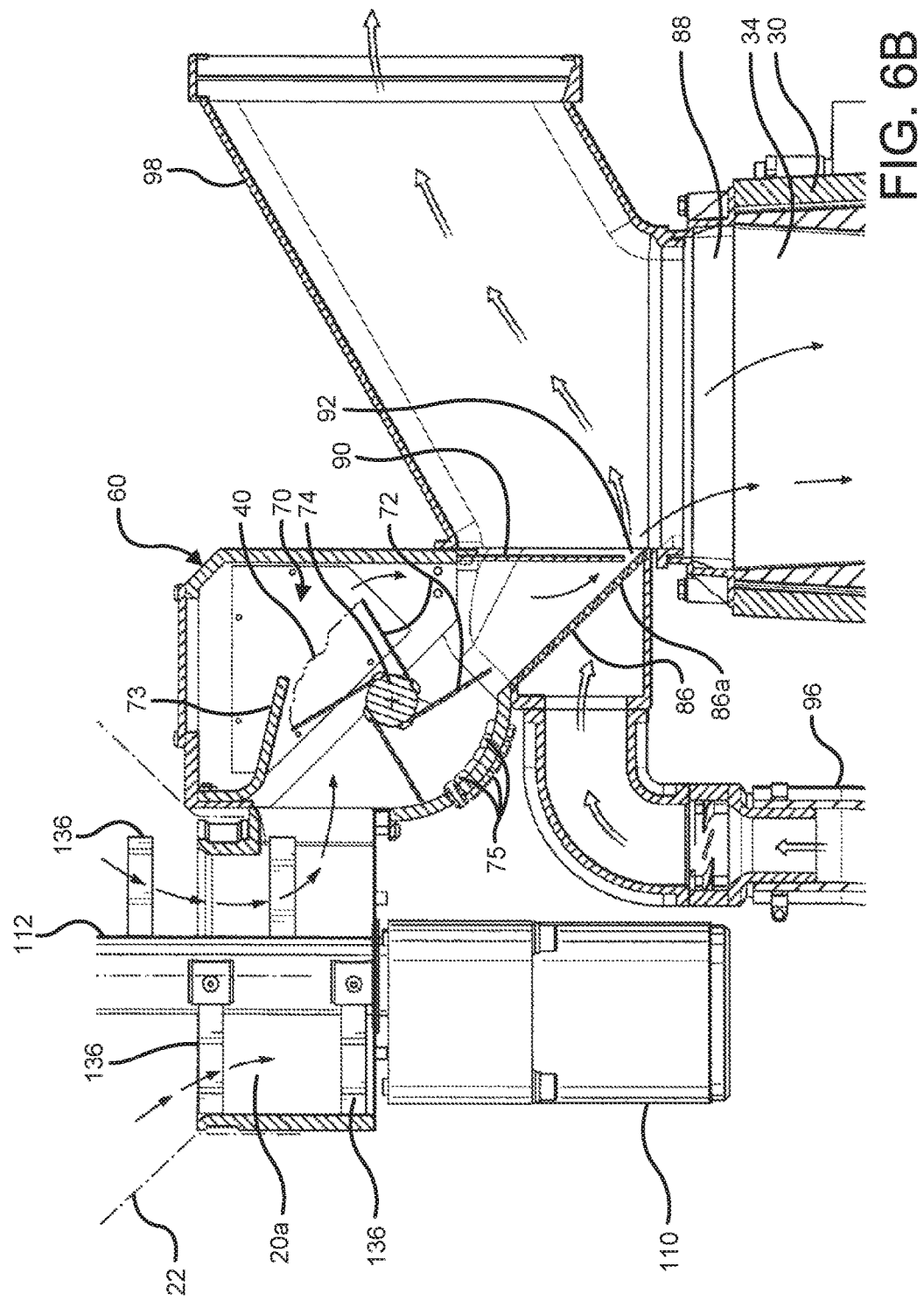
FIG. 6B is a cross sectional view similar to FIG. 6A, and showing further operational details.

The melter 10 further comprises a heated receiving device 30, which may comprise a melting tank having a melting grid 32 in a lower portion (FIG. 5). Generally, in this embodiment the tank 30 includes a chamber 34 for receiving pellets or other particulate forms of hot melt adhesive 40 (FIGS. 6A and 6B). It will be appreciated that the heated receiving device 30 may be a large or small tank, or may be a much smaller heating device with a chamber that receives a small amount of particulate hot melt adhesive 40 for melt-on-demand purposes. A space 42 below the melting grid 32 receives liquefied hot melt adhesive for directing the adhesive to an outlet (not shown) and then to a pump 50 and manifold 52 for delivery to a suitable dispensing device or devices (not shown).

Figure 3:
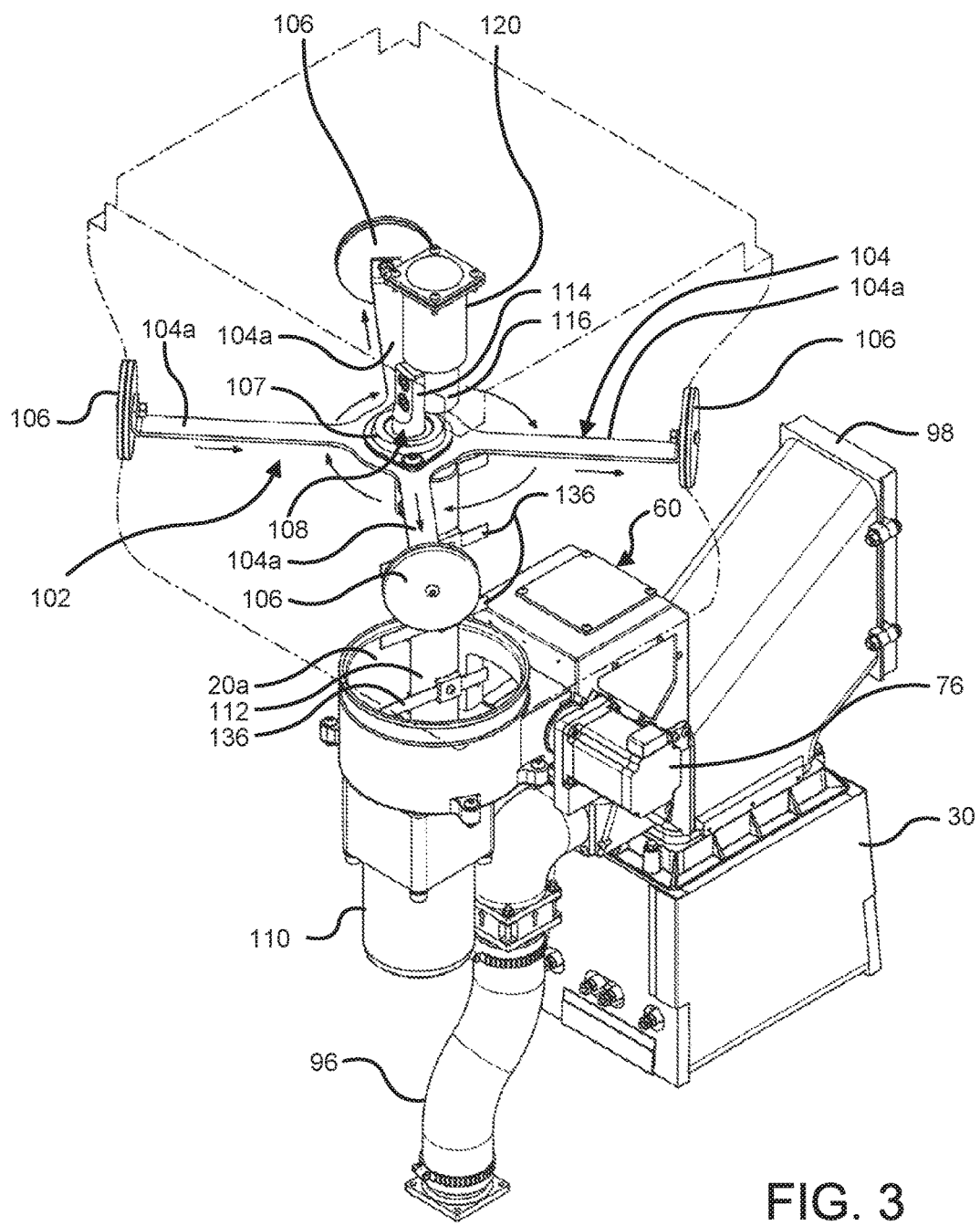
FIG. 3 is a perspective view similar to FIG. 2, but illustrating the flexible hopper in dash-dot lines to show interior details.
Figure 4:
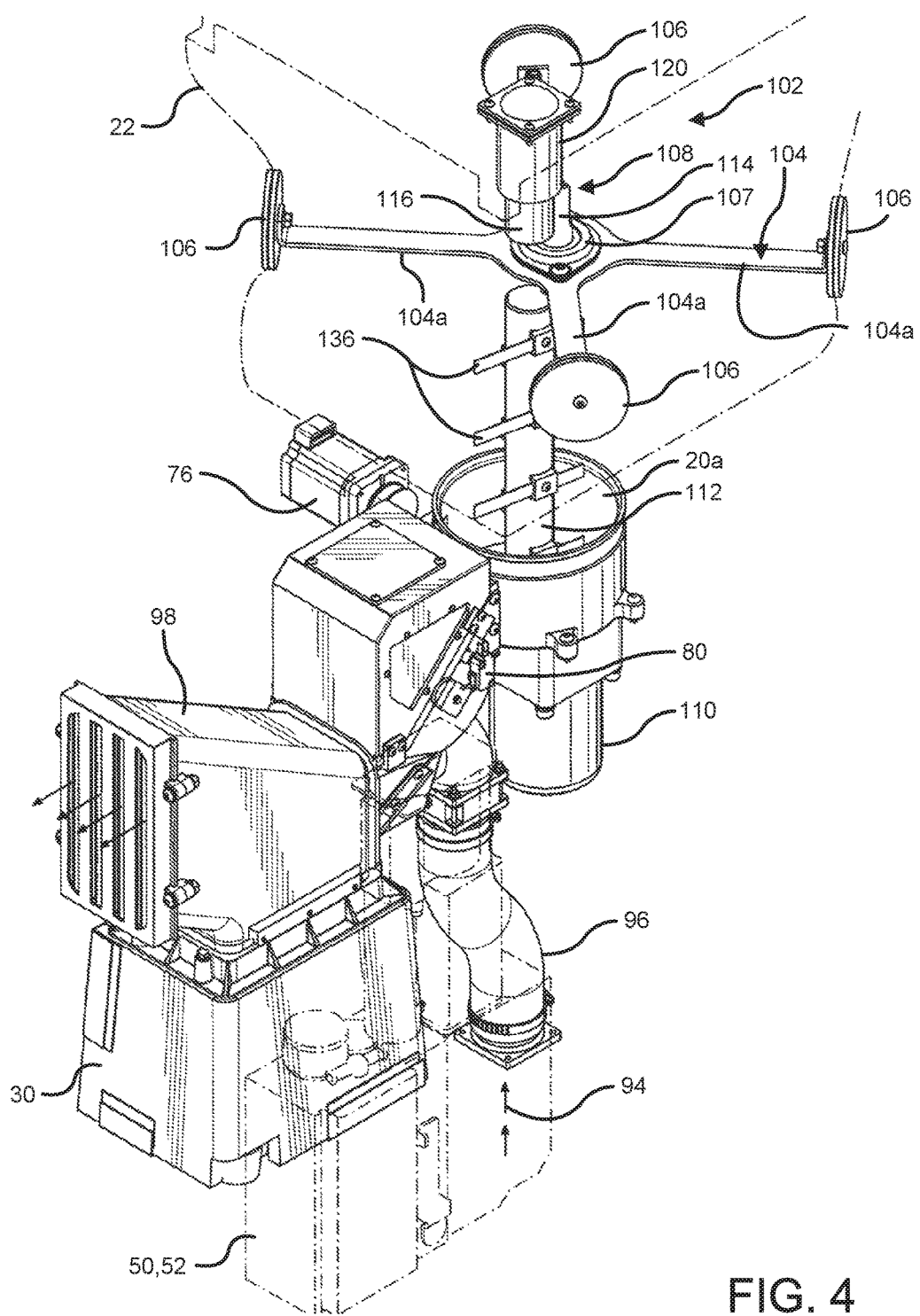
FIG. 4 is a perspective view illustrating the components shown in FIG. 3, from an opposite perspective.
Figure 7:
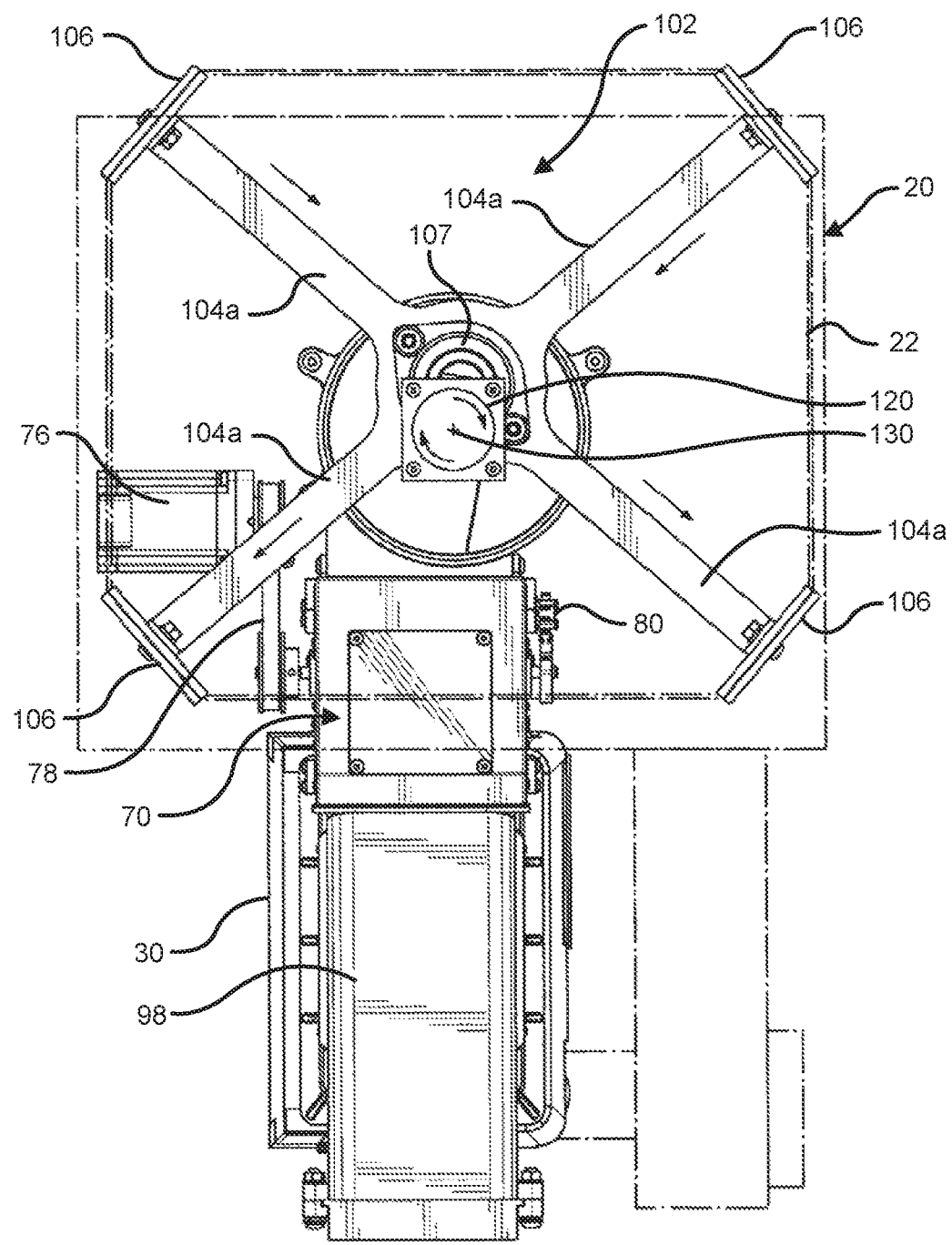
FIG. 7 is a top elevational view of the melter shown in FIGS. 1 through 6B.
Figure 8:
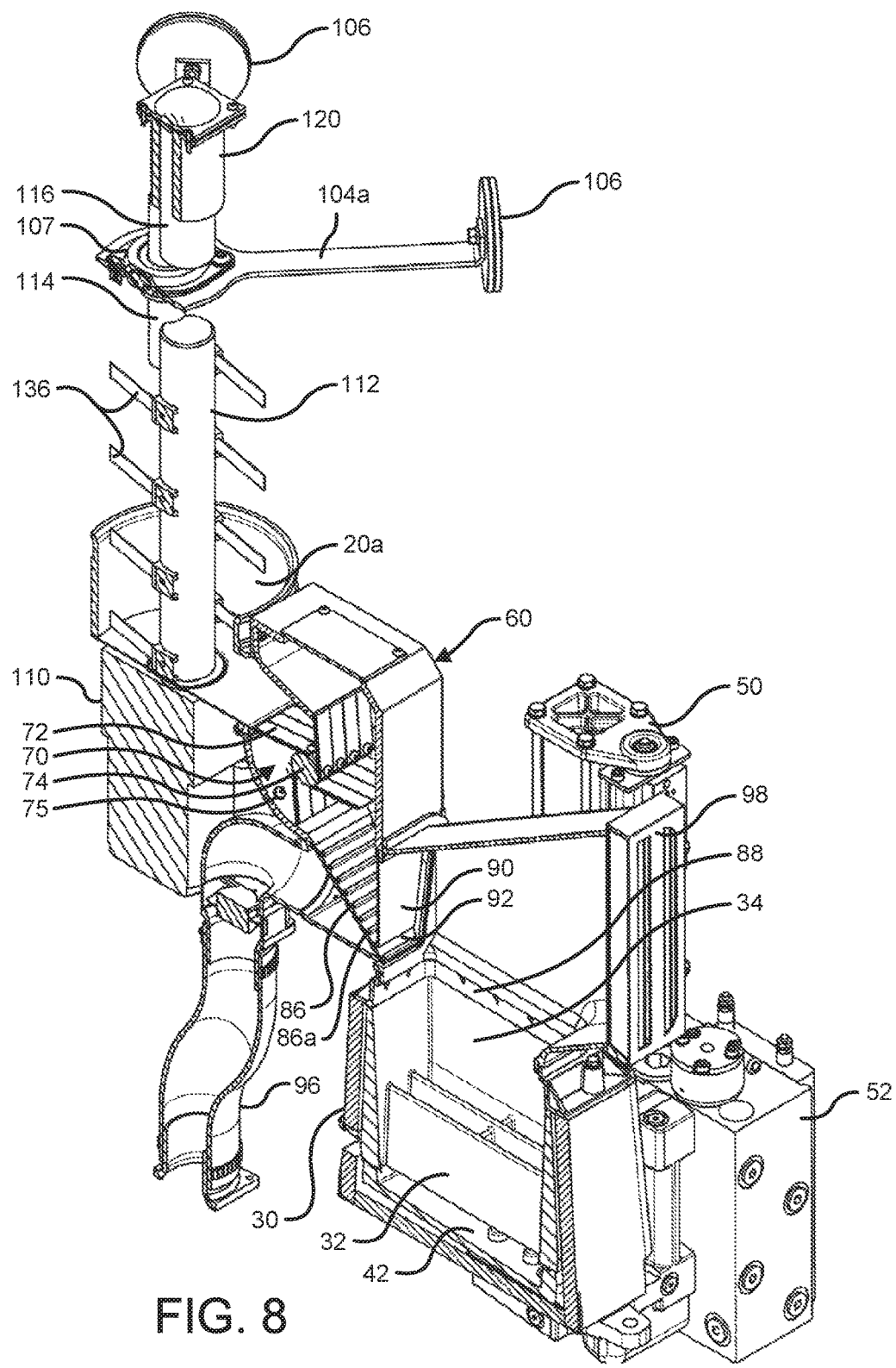
FIG. 8 is a perspective view, cross sectioned to show the various details of the melter, hot melt adhesive feed device, and flexible hopper.
Figure 9:
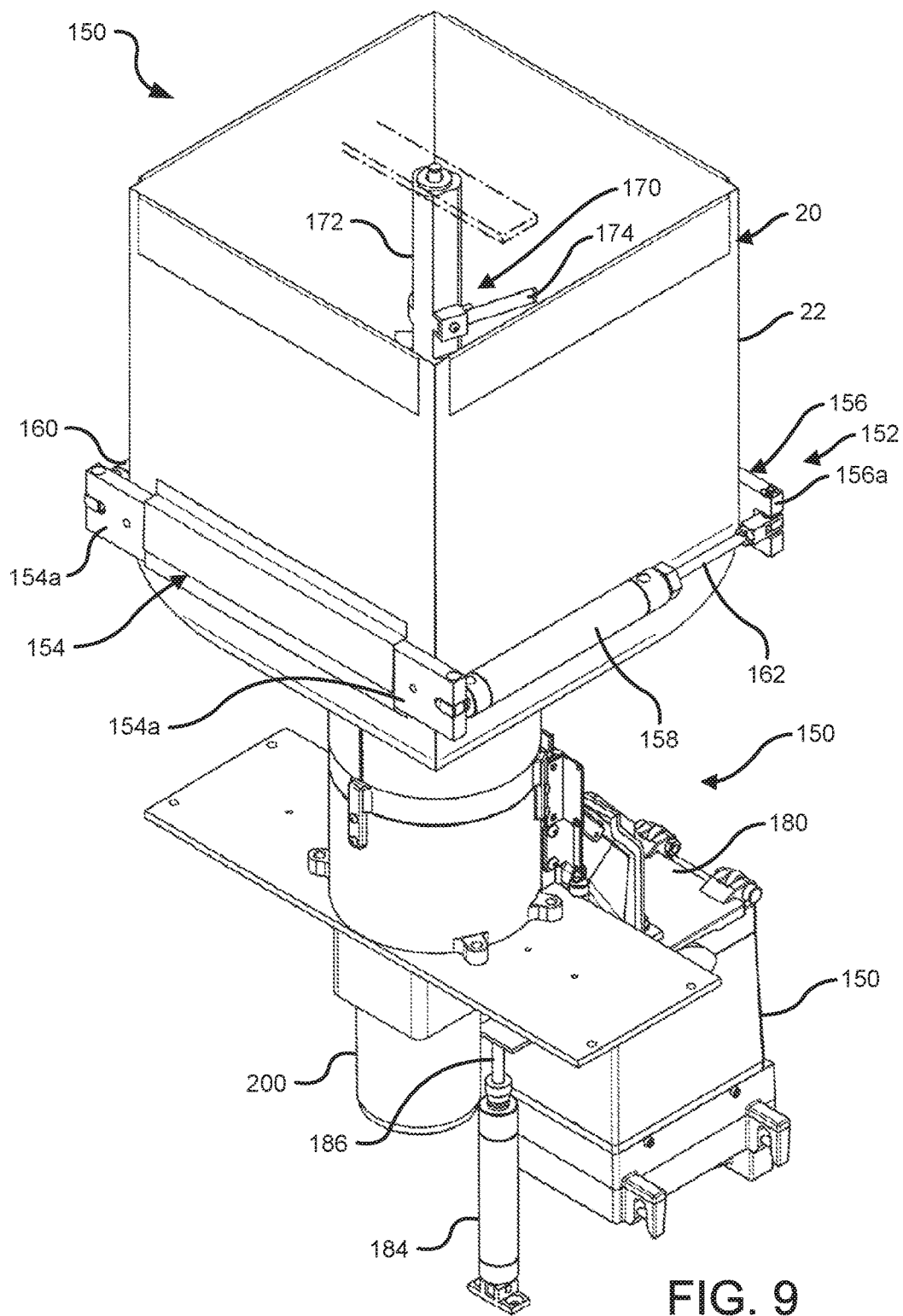
FIG. 9 is a perspective view showing another embodiment of a melter and flexible hopper.
Figure 10A:
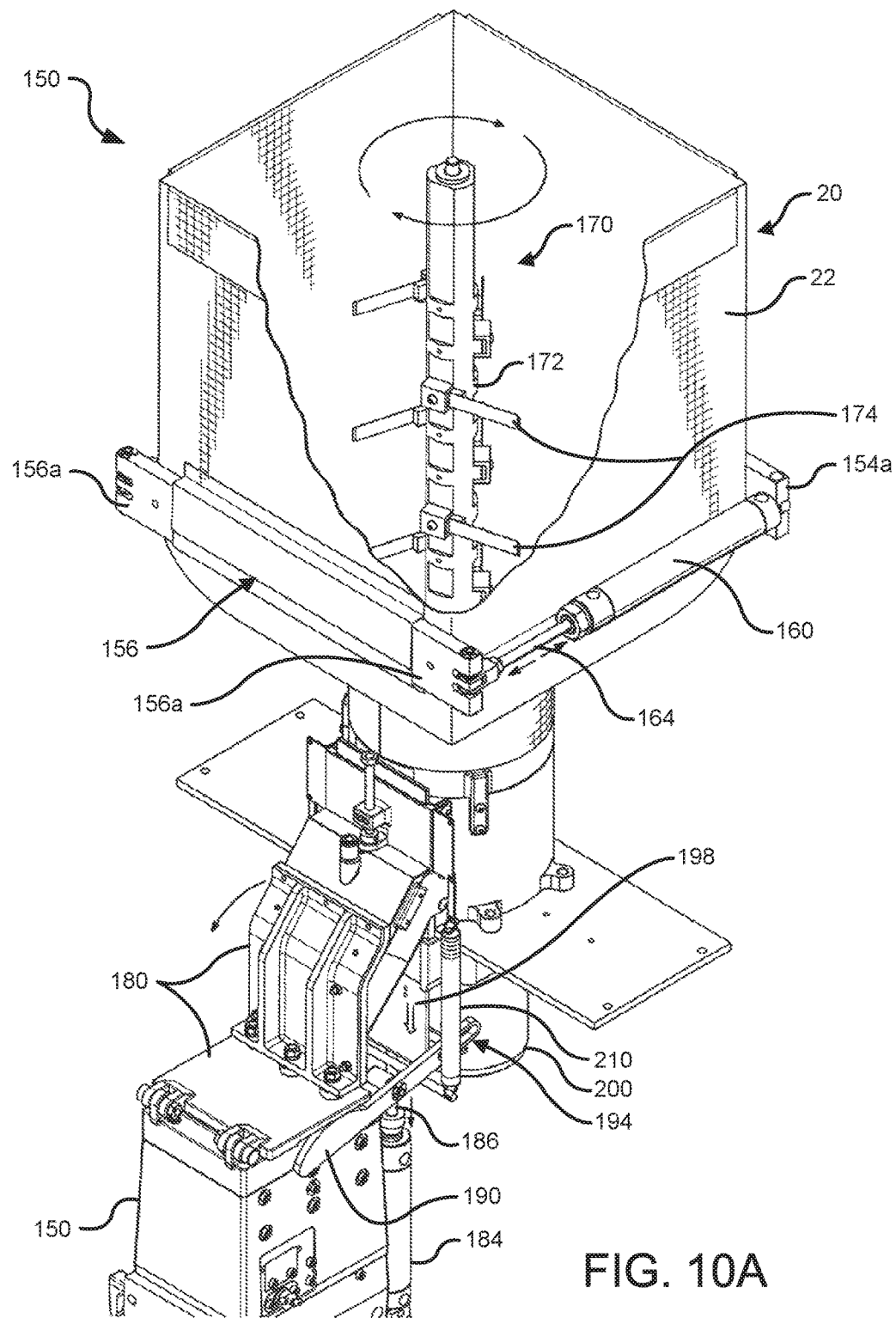
FIG. 10A is a partially fragmented perspective view of the flexible hopper shown in FIG. 9.
Figure 10B:
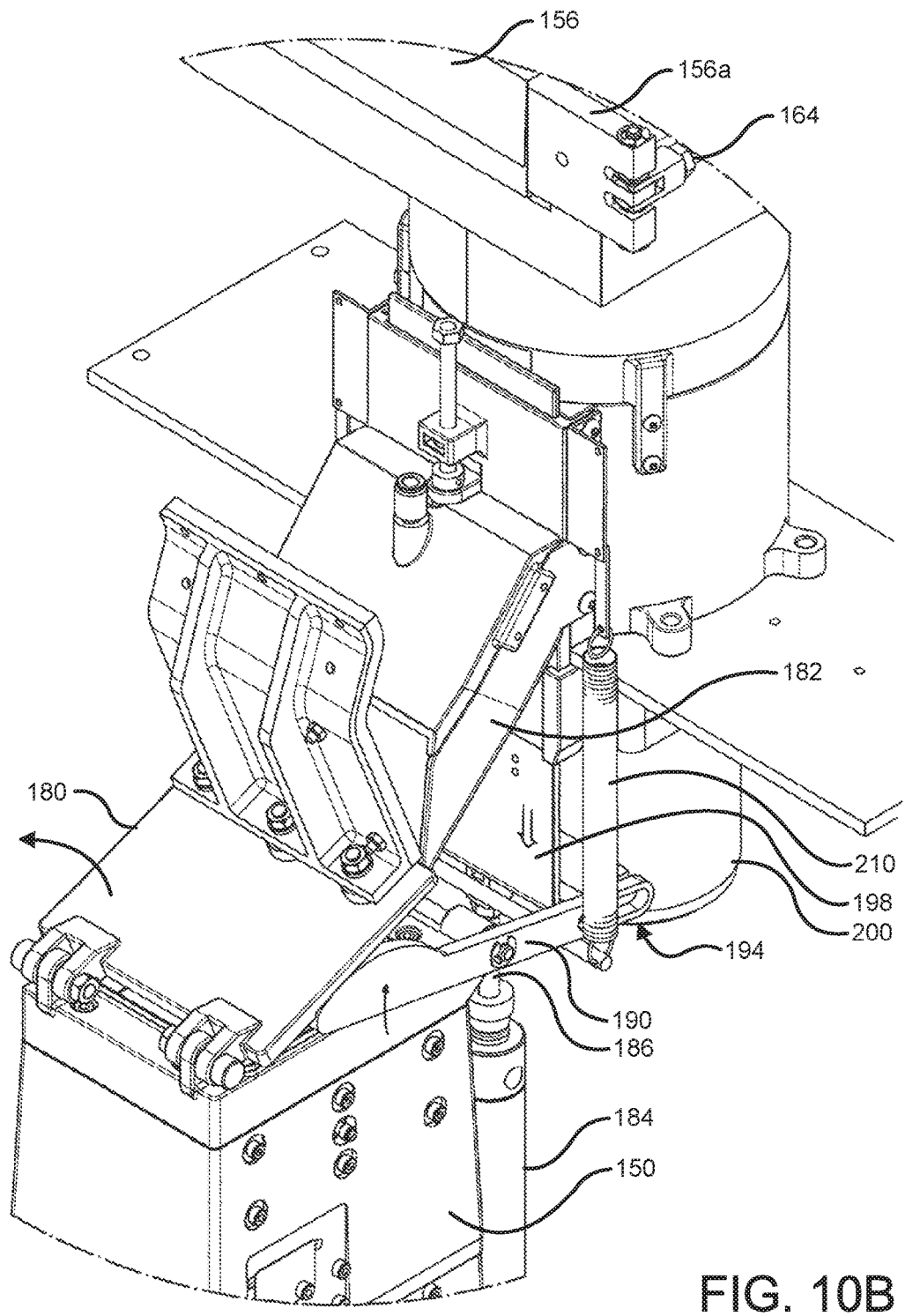
FIG. 10B is an enlarged perspective view of the feed device shown in FIG. 10A.
Figure 10C:
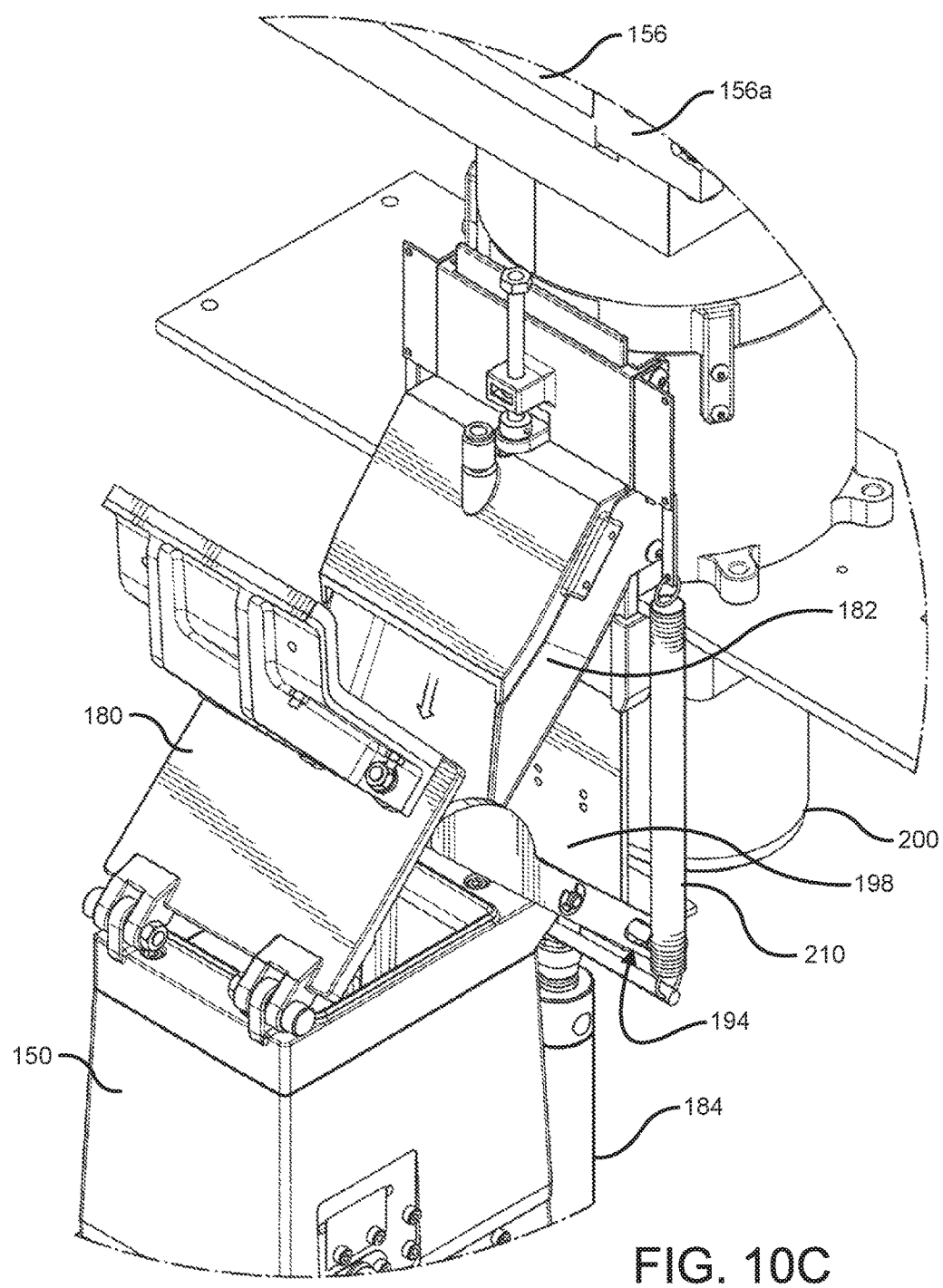
FIG. 10C is a perspective view similar to FIG. 10B, but illustrating the feed device in a different position for feeding adhesive particulate to the melter tank.

Referring further to FIGS. 5, 6A, 6B and 8, a particulate hot melt adhesive feed device 60 is mounted between an outlet 20a at the bottom of the flexible hopper 20 and the heated receiving device 30. This feed device 60 may take any suitable form for carrying or otherwise delivering the particulate hot melt adhesive 40 from the flexible hopper 20 into the heated receiving device 30. It may be motorized, or it may simply rely on gravity feed. Feed devices such as augers or other screw-style conveyors, belt driven devices or other conveying devices may be used to feed the particulate adhesive. In this embodiment the feed device comprises a rotary valve 70 or wheel device having flexible paddle elements 72. The rotary valve 70 is constructed with a central rotating member 74 coupled to a motor 76 by a belt 78 (FIG. 7). The paddle elements 72 are affixed to and extend generally radially outward from the central rotating member 74. As shown in FIG. 3, the motor 76 is used to rotate the rotary valve 70 and a microswitch 80 is used to detect and control the various rotational positions of the rotary valve 70 for purposes of determining when the rotary valve 70 rotates and stops to thereby control the feed rate of particulate hot melt adhesive 40 from the flexible hopper 20 into the receiving device 30 or tank used for heating and liquefying the thermoplastic hot melt adhesive. The rotary valve 70 is rotated in a clockwise direction, and through controlled and sequential angular movements as best depicted in FIGS. 6A and 6B, delivers precise amounts of particulate hot melt adhesive 40 by carrying the amounts of particulate hot melt adhesive 40 between adjacent paddle elements, as shown in FIG. 6B, and dropping or delivering these amounts downwardly into an outlet of the feed device 60 when prompted by the controller 14, such as when the controller 14 receives a signal from a level sensor (not shown) that the tank 30 needs more adhesive. As shown further in FIGS. 5, 6A and 6B, a flexible skimmer flap 73 is provided in proximity to the rotary valve 70. The flexible skimmer flap 73 is positioned above the rotary valve 70 such that it skims across or rides above the particulate adhesive 40 that is deposited in each quadrant of the rotary valve 70 on the blades or paddle elements 72. This skimming action controls the amount of particulate adhesive 40 in each quadrant thereby improving the volumetric consistency of particulate hot melt adhesive 40 delivered by the rotary valve 70. The flexible skimmer flap 73 further prevents uncontrolled flow of particular hot melt adhesive 40 over the tops of the blades or paddle elements 72, such as when processing a particular hot melt adhesive 40 that is free-flowing. FIGS. 5, 6A, 6B and 8 also show a plurality of blade or paddle flicking elements 75. Especially when processing adhesives in high ambient temperature conditions, the potential exists for adhesives to bond to the individual flexible blades or paddle elements 72. To help mitigate this problem, the elements 75 provide bumps aligned with each paddle element or blade 72 for individually engaging each flexible blade or paddle element 72 as it passes during rotation of the rotary valve 70. As the blade or paddle element 72 passes over a bump 75, it will be flexed and "flicked" such that it releases any adhesive particulate that is stuck to or bonded with the paddle element 72. This feature provides a mechanism for preventing jamming of the rotary valve 70 and to ensure that accurate amounts of particulate adhesive 40 are transferred by the valve 70. Specifically, the particulate hot melt adhesive 40 is delivered onto a downwardly inclined ramp 86. The ramp 86 is perforated and angled downwardly toward the open top or inlet 88 of the heated receiving device 30. A flexible skirt of rubber, fabric or similar material 90 creates a small opening 92 between a lower end 90a of the panel 90 and the lower end 86a of the ramp 86 for providing a controlled flow of the particulate hot melt adhesive 40 through the opening 92 and into the inlet or open top 88 of the heated receiving device 30 or tank. The skirt 90 also minimizes migration of hot gases from the tank 30 into the adhesive feed device 60.

In addition, the melter 10 includes a cooling air input, which may include a fan or other source for moving air 94 (FIG. 4) coupled with an air inlet supply conduit 96. The air supply conduit 96 leads to the inclined ramp 86 and, because of the perforated nature of the ramp 86, the cooling air passes through the ramp 86 and through the lower opening 92 for the particulate hot melt adhesive 40. The skirt 90 is fixed to the feed device housing along a top edge of the skirt 90, in order to leave minimal gaps along the sides of the skirt 90 and the small opening 92 at the bottom, through which the cooling air travels. The cooling air then travels across the open top 88 of the heated receiving device 30 or tank and through an outlet plenum or conduit 98. This cooling air provides a heat transfer mechanism for carrying away the heat from the open top 88 of the hot chamber 34. In this way, the heat emanating upwardly from the open top 88 of the chamber 34 is directed away from the particulate hot melt adhesive 40 in the feed device 60, and in the flexible hopper 20. Therefore, heat from the tank 30 is less likely to cause the particulate hot melt adhesive 40 to become sticky, or even melt before it reaches the chamber 34.

Referring to FIGS. 2 through 8, the flexible bag 22 is attached to a suitable rigid frame structure 100. An articulation device 102 is attached to the bag 22. It will be appreciated that the articulation devices described herein are only examples. These devices may take any form suitable for moving the flexible hopper to maintain fluidity of the particulate adhesive 40. In this embodiment, the articulation device 102 comprises a multi-armed device 104 having end pieces 106 rigidly affixed or otherwise engaging corner portions of a generally square shaped bag 22. Any other shape may be used for the bag 22 or other flexible container, and a bag articulation or deforming device may be designed in any suitable and desired manner to effect movements of the bag 22 designed to break up any clumps or agglomerations of particulates 40 therein. The central portions of each arm 104a are coupled with a bearing structure 107 and an eccentric drive mechanism 108 that rotates the central portions of the arms 104a and the bearing structure 107. A motor 110 is secured to a central shaft 112 and the central shaft 112 is affixed to an eccentric coupling element 114 which then is affixed to a short rotating shaft 116. The short rotating shaft 116 is affixed for rotation relative to a stationary fixture 120 which, in turn, is affixed to a mounting grid structure 124 (FIG. 1) near the upper opening of the flexible hopper 20. The hopper 20 may be filled with particulate adhesive 40 through the grid structure. The shafts 112, 116 and the eccentric coupling element 114 rotate slowly, such as at about 12 to 15 rpm, about a central axis 130 and this rotates the center or radial inner portions of the arms 104a. This is best shown in FIGS. 3 and 7. As the arm assembly 104 rotates, the arms 104a effectively move radially inwardly and outwardly as indicated by the arrows 132. This moves the corners of the bag 22 inwardly and outwardly toward and away from opposite wall portions of the bag 22 in a generally reciprocating manner, however, also in a slightly rotating manner. The effect is that the particulate hot melt adhesive 40 within the bag 22 is moved from an outer peripheral area of the bag 22 adjacent to the bag 22 itself toward a radially inward or central area and, in the process, any clumps or agglomerated masses of the particulates 40 are broken up. In addition, the rotating shaft 112 includes a plurality of elongate paddle members or elongate pins 136 extending generally radially outward. These paddle members 136 extend generally outwardly from the central axis 130 and therefore, as the shaft 112 rotates, these paddle members 136 travel through the particulate hot melt adhesive 40 in a rotating fashion and disrupt the particulate hot melt adhesive 40 at the center of the flexible bag 22. The paddle members 136 are resilient and flexible and, therefore, as the shaft 112 rotates, these paddle members 136 can bend or flex in an arc generally around the shaft 112. The paddle members 136 provide scraping action as the paddles 136 force their way to a more straightened condition until fully extended. This minimizes motor torque required to agitate the particulate adhesive mass 40. The combined effect is that any clumps or agglomerated masses of particulate hot melt adhesive 40 in the outer peripheral regions of the flexible hopper 20, or at the inner or central regions of the flexible hopper 20, are broken apart. In this manner, the particulate hot melt adhesive 40 exiting the flexible hopper 20 at the lower end, and entering the inlet of the feed device 60 comprises the smallest portions broken up for purposes of delivery to the tank 30.

FIGS. 9 through 12 are directed to another illustrative embodiment of a melter 150. This embodiment also utilizes a flexible bag type hopper 20, which may be constructed as set forth for the first embodiment. However, the main difference is that an alternative, illustrative articulation device 152 is used for moving or articulating the bag 22 inwardly and outwardly in order to move particulate hot melt adhesive 40 (not shown, for clarity) from peripheral portions of the bag interior to more central regions of the bag interior. In this regard, first and second elongate elements 154, 156 are secured on opposite sides of the bag 22 and include end sections 154a, 156a. The end sections 154a, 156a of the opposite elements 154, 156 are pivotally coupled together by pneumatic cylinders 158, 160 each having a reciprocating piston rod 162, 164. The rods 162, 164 move inwardly and outwardly relative to the associated cylinder 158, 160. The first and second elongate elements 154, 156 are relatively rigid and attached to or otherwise engage the exterior of the bag 22. This is unlike the first embodiment in which most of the structure for articulating or moving the flexible bag 22 is contained within the flexible hopper 20. In addition, this articulation structure is secured to a lower portion of the bag 22, closer to the outlet of the bag 22 to help ensure that the particulate 40 is broken apart as close as possible to the upper inlet of the feed device 60. In this manner, the particulate hot melt adhesive 40 is broken up just as it exits the flexible hopper 20 and enters the feed device 60. Similar to the first embodiment, a central stirring device 170 is included within the hopper 20, and generally comprises a central rotating shaft 172 and a plurality of generally radially extending paddle elements 174. As with the first embodiment, this central stirring device 170 stirs and breaks up any agglomerated masses or clumps of particulate hot melt adhesive 40 in the central regions of the flexible hopper 20 as the outer or peripheral regions of the bag 22 are flexed and moved inwardly and outwardly by the exterior articulation device 152.

Figure 11:
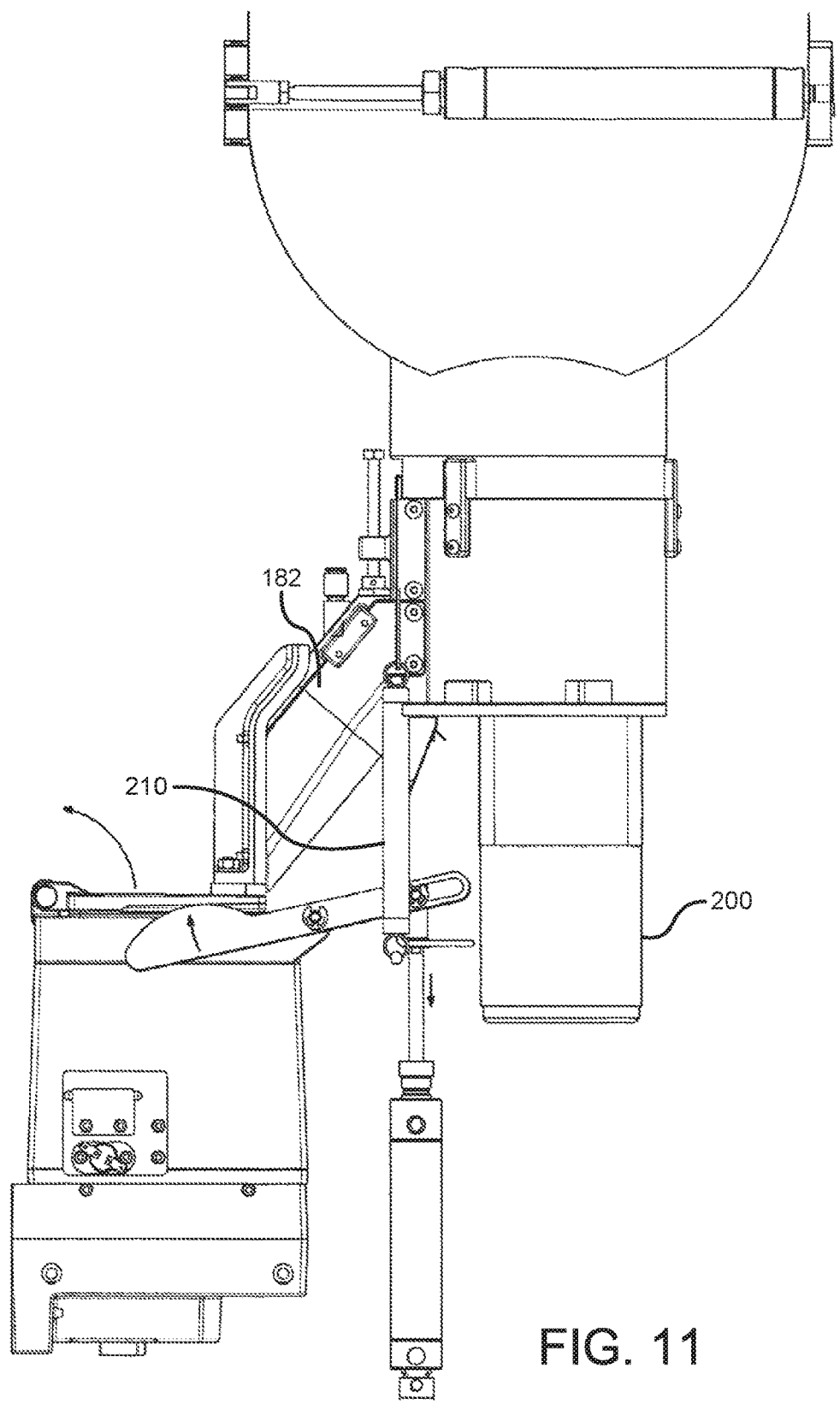
FIG. 11 is a side elevational view showing the melter of FIGS. 10A-10C.
Figure 11A:
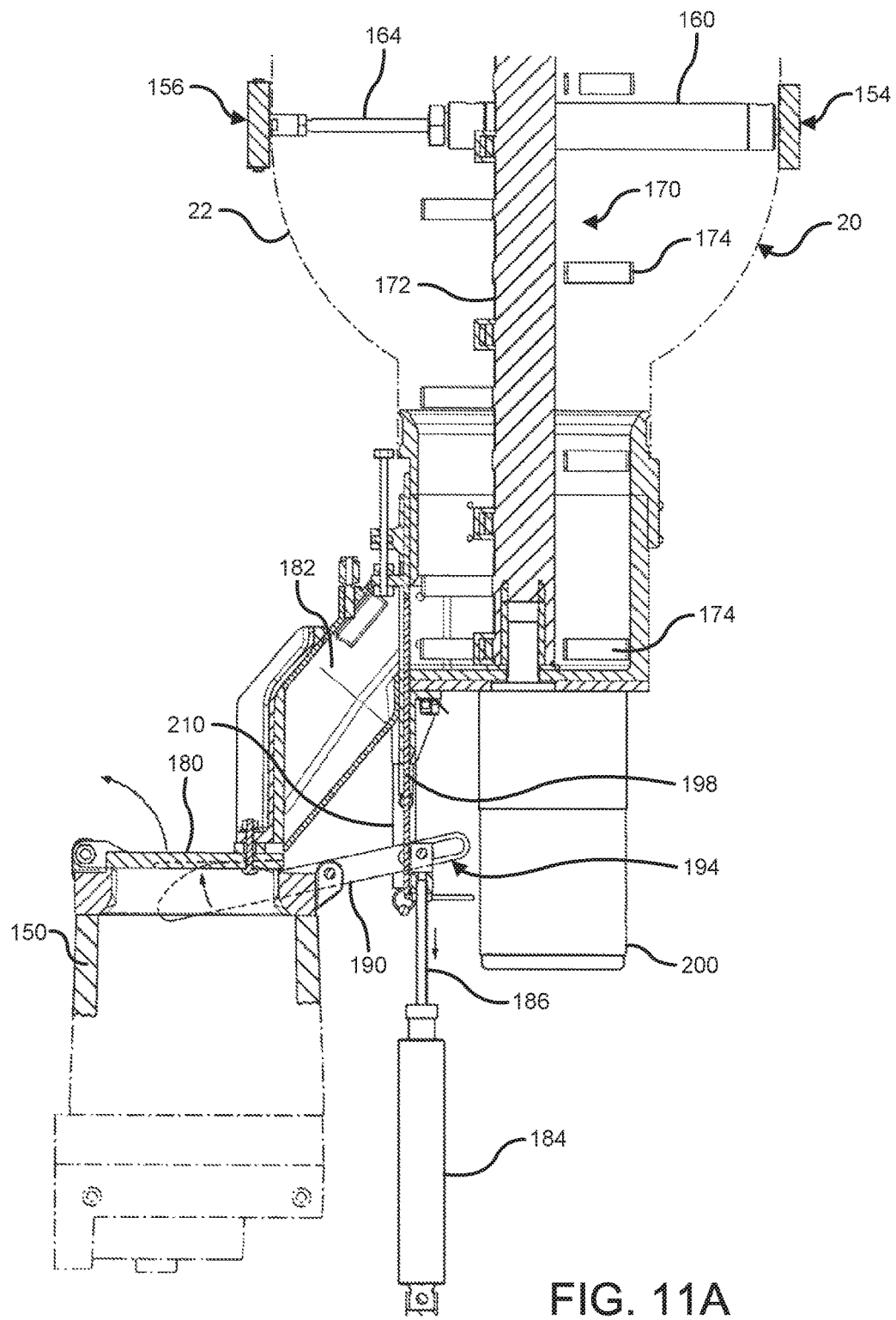
FIG. 11A is a view similar to FIG. 11, but illustrating portions of the melter in cross section to illustrate internal components and operation.
Figure 11B:
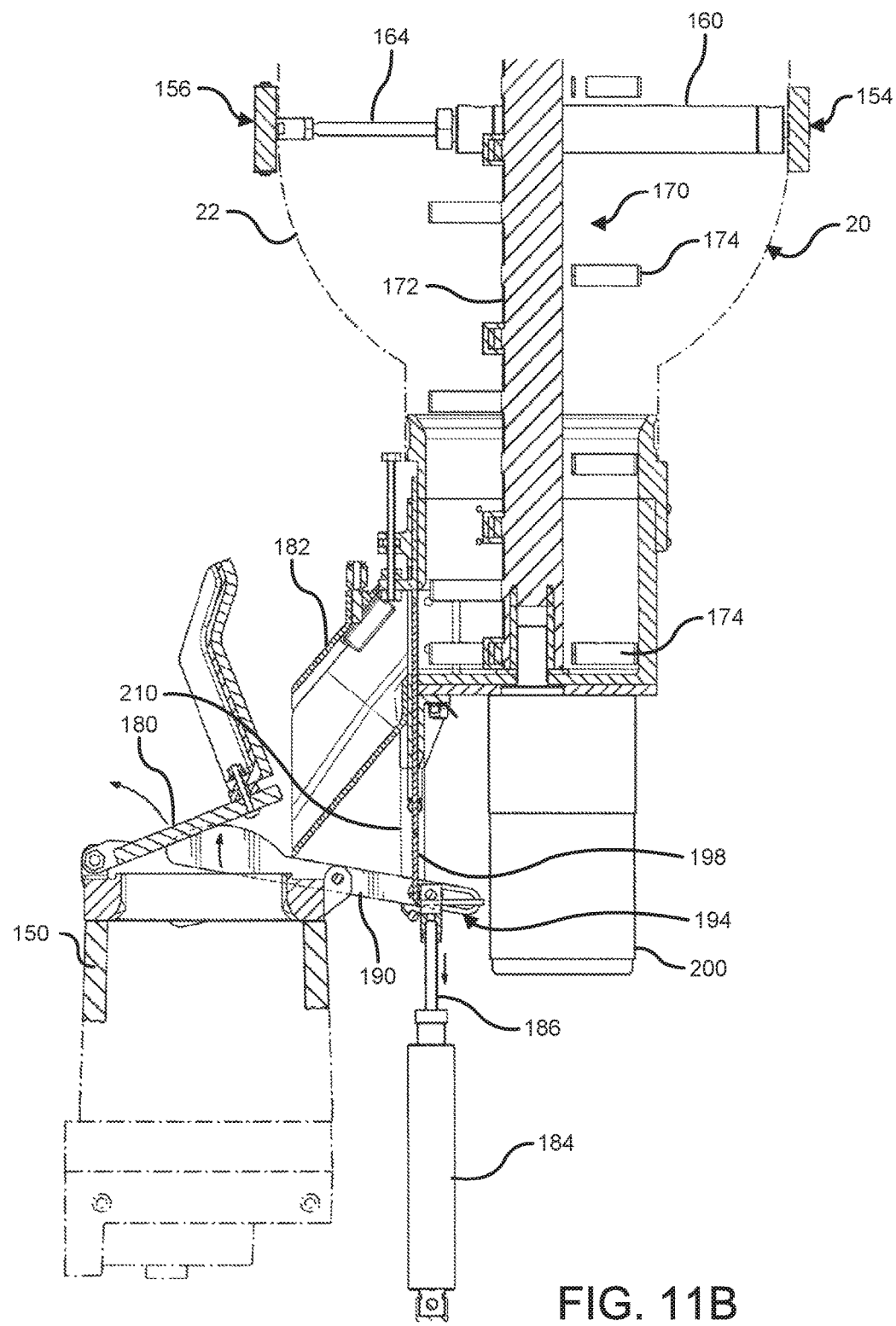
FIG. 11B is a side elevational view, partially cross sectioned as with FIG. 11A, but illustrating further operational details.
Figure 11C:
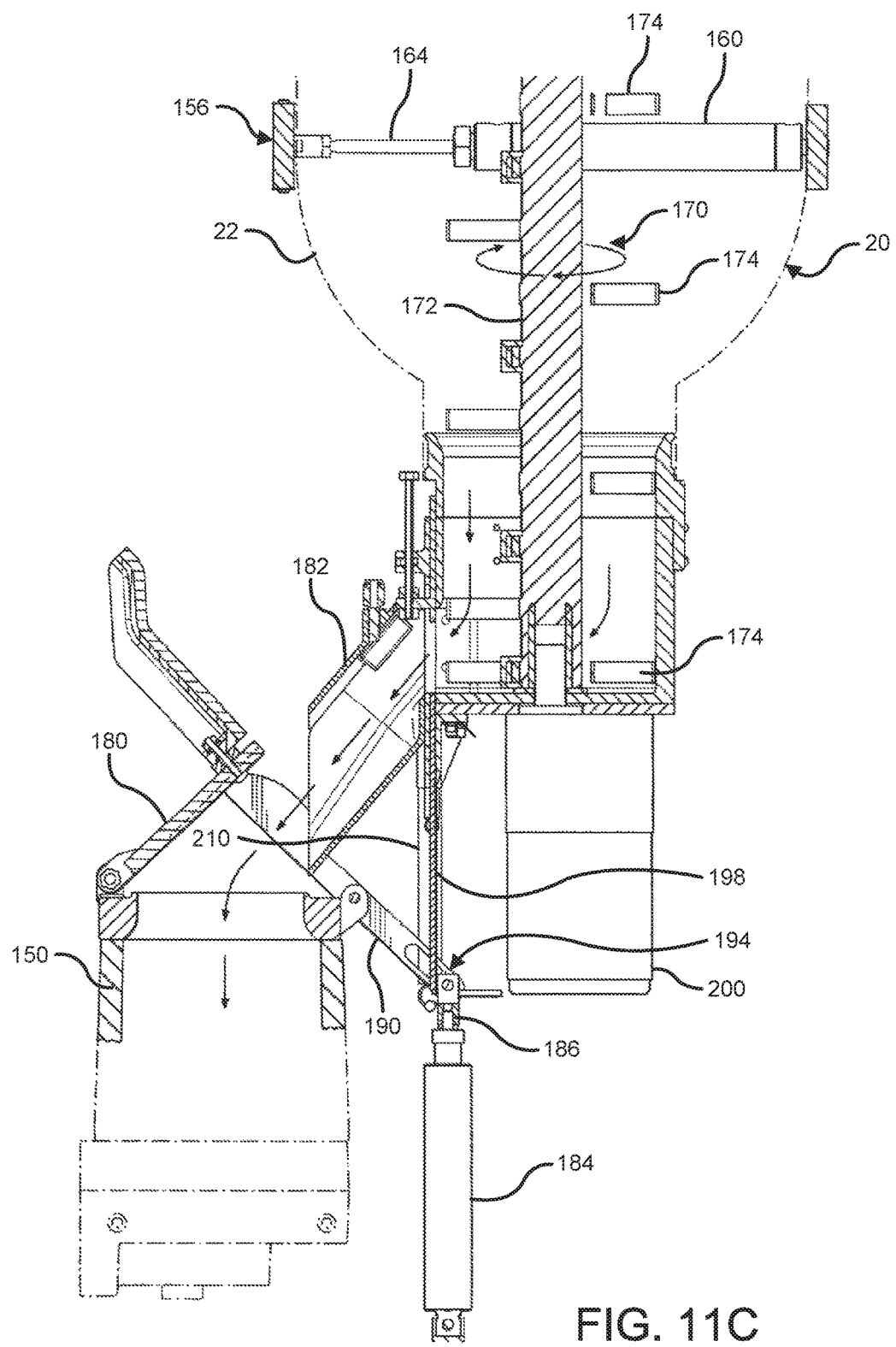
FIG. 11C is a side elevational view, partially cross sectioned as with FIG. 11B, but illustrating further operational details.
Figure 12:
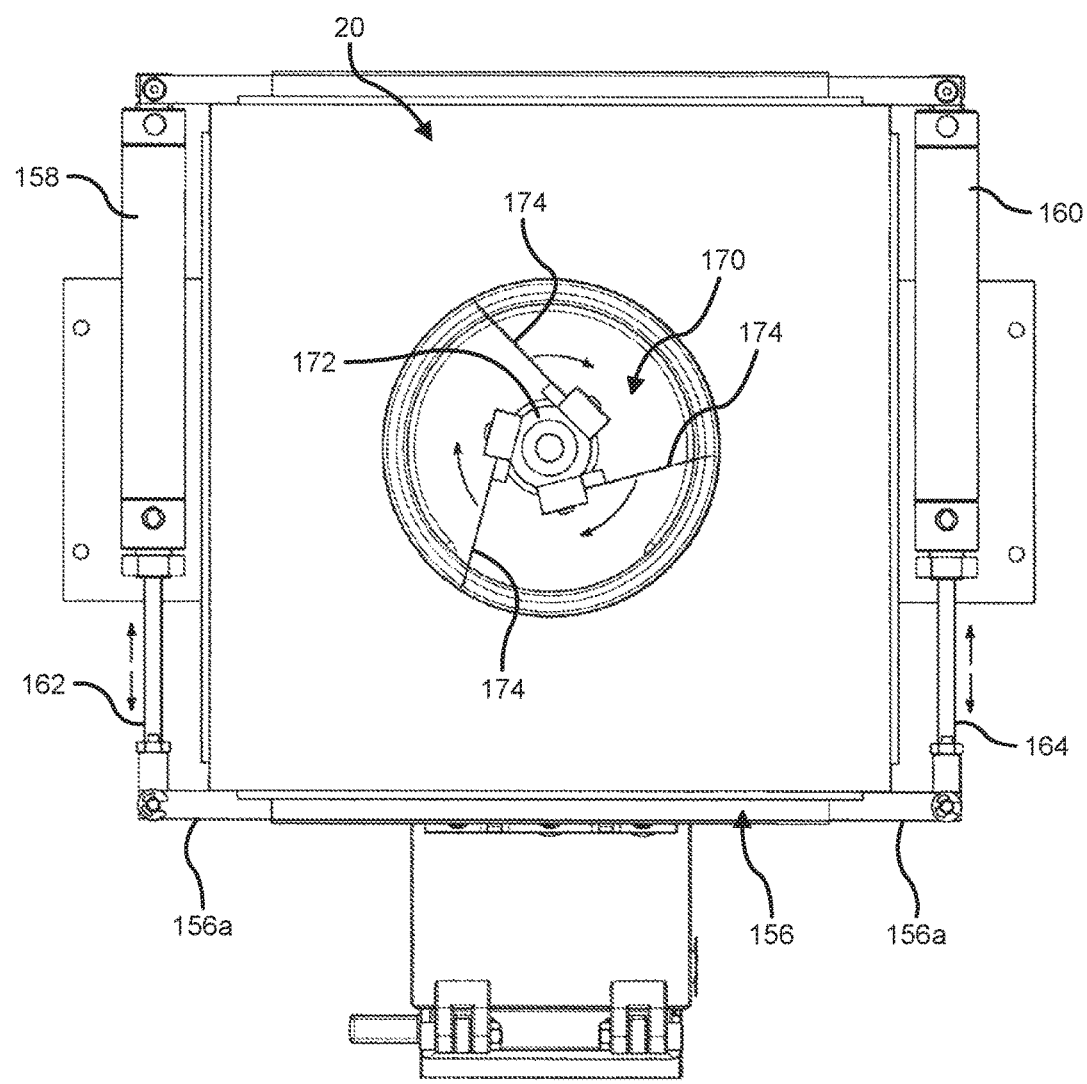
FIG. 12 is a top view of the melter shown in FIGS. 11A through 11C.

This embodiment also includes a lid or cover element 180 for the heated receiving device 30. This lid 180 is opened to allow controlled delivery of the particulate hot melt adhesive 40 from the flexible hopper 20 into the chamber 34 of the heated receiving device 30 or tank. In this embodiment, the particulate hot melt adhesive 40 falls by gravity down and inclined ramp or chute 182 from an outlet 20a of the flexible hopper 20. The rotating paddle elements 174 at the lower end of the shaft 172 will continuously move the particulate hot melt adhesive 40 into the chute 182. When the melter or hot melt adhesive receiving device 150 indicates that there is a low level of adhesive in the chamber 34, an air cylinder 184 is activated to retract a rod 186. The rod 186 is coupled with a lever 190 by way of a pivot and slot connection 194 (see FIGS. 11A and 11B). This connection 194 ensures that the lid 180 opens before a gate 198 is lowered (FIG. 11C). The gate 198 is coupled to the rod 186 as well but, as shown in the succession from FIG. 11B to FIG. 11C, the lid 180 has already partially opened by the time the gate 198 begins to open to allow particulate 40 to begin to fall down the chute 182. Particulate 40 will be prevented from falling onto a closed lid 180 in this manner. A motor 200 may be operated for rotating the shaft 172 so as to be on and slowly rotating when the gate 198 opens, such as at 15 rpm. At the same time, the piston rods 162, 164 are retracted and extended to articulate the outer periphery of the bag 22. When the control 14 (FIG. 1) indicates that the tank chamber 34 is full, the motor 200 will stop operating and the rod 186 extends to close the gate 198, and then close the lid 180 sequentially, i.e., the reverse operation to that described above. A spring 210 is included to ensure that in the event that there is no air pressure for the cylinder 184, the normal position for gate 198 and lid 180 will be a closed position. This stops the flow of particulate hot melt adhesive 40 before the lid 180 of the tank 30 closes. Stickier particulate hot melt adhesives need more agitation. Therefore, in embodiments that include both bag or other container flexion and internal stirring, the large masses of agglomerated particulates 40 will be broken up by the bag flexion and directed into a central region of the bag 22, and the internal stirring device will break the agglomerated masses into small portions of particulates 40 and individual particulates. Without the bag flexion, the internal stirring elements, paddles, pins, etc. may just core out the radially inward or central region of sticky particulate hot melt adhesive. The flexible hopper 20 may be again made of any suitable, strong flexible material such as woven or nonwoven materials, polymeric materials, etc. For example, the fabric can be a woven fabric that is embedded in a polymer. One type of suitable fabric is sold under the brand name Cordura®. Other heavy duty fabrics, such as ballistic materials, canvas materials, rip stop materials or other natural or synthetic materials that can retain their shape and require little outside support, may be used instead. The air cylinders 158, 160 and rods 162, 164 for constructing the articulation device 152 may be compressed in unison or out of phase with one another. For example, each rod 162, 164 may extend and retract simultaneously, or one may be extending when the other one is retracting. Alternatively, the rod 162 on one side of the bag 22 could remain stationary while the other rod 164 is moving.

Figure 13:
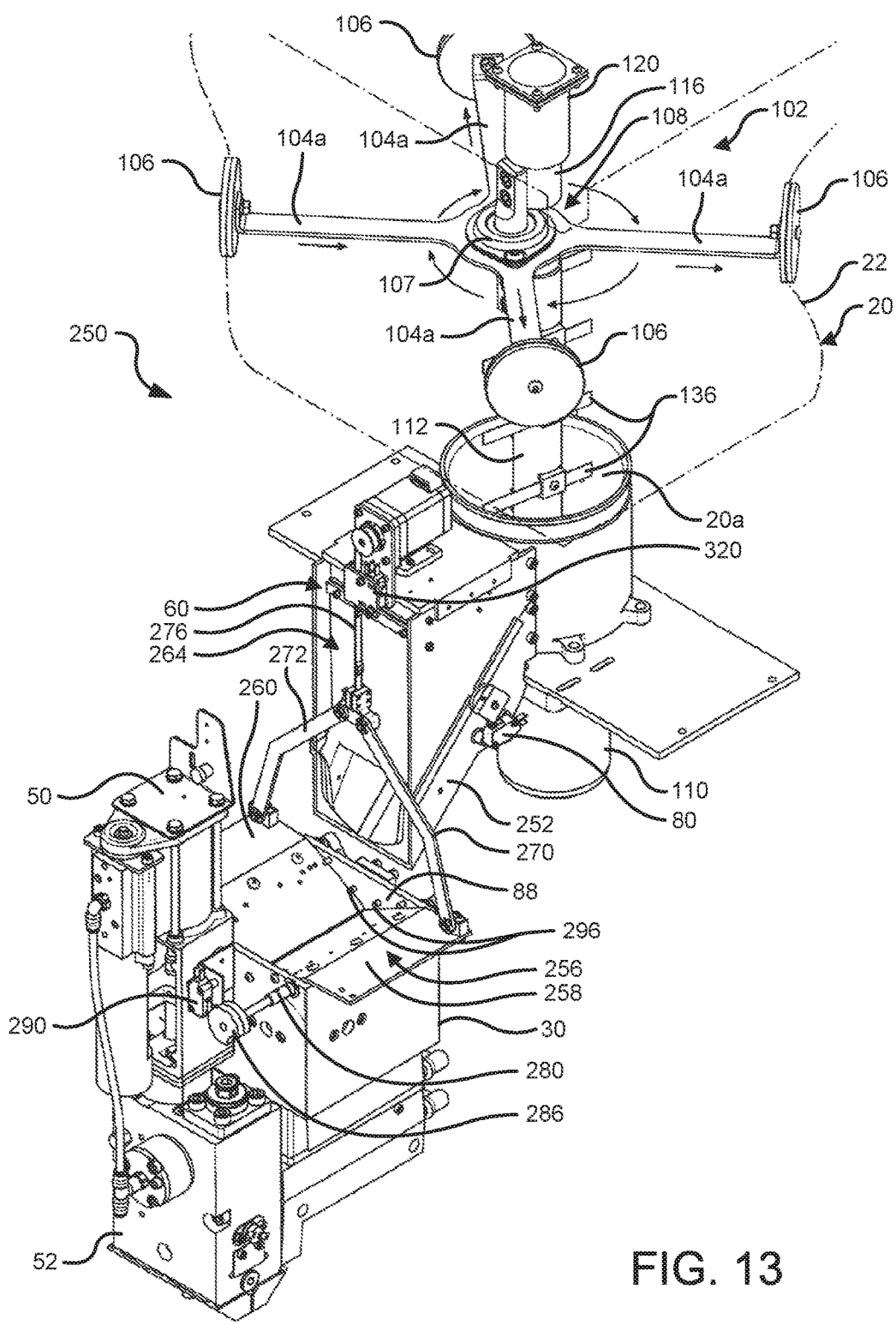
FIG. 13 is a perspective view of another embodiment of a melter constructed in accordance with the invention.
Figure 14A:
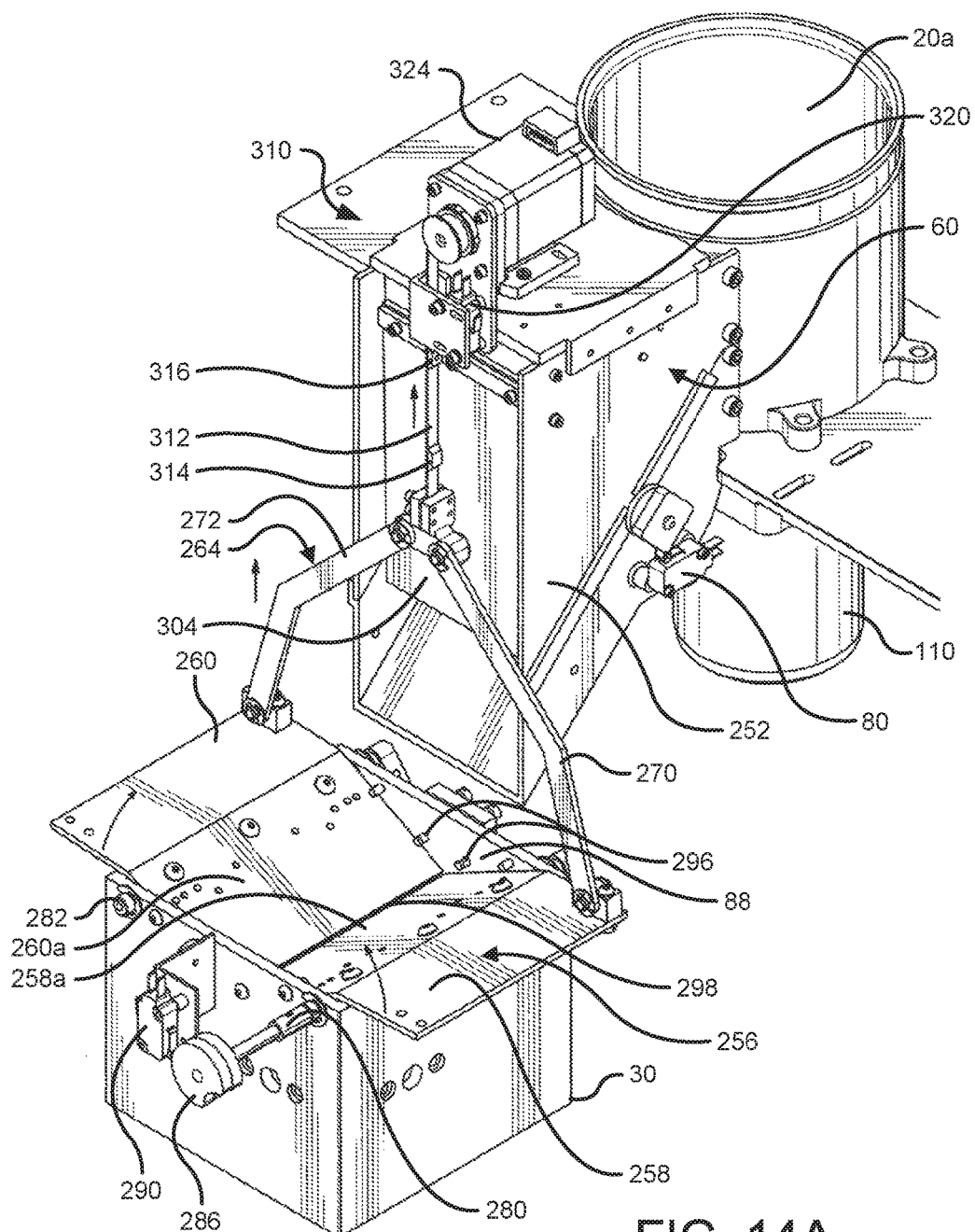
FIG. 14A is a perspective view of a portion of the melter shown in FIG. 13.
Figure 14B:
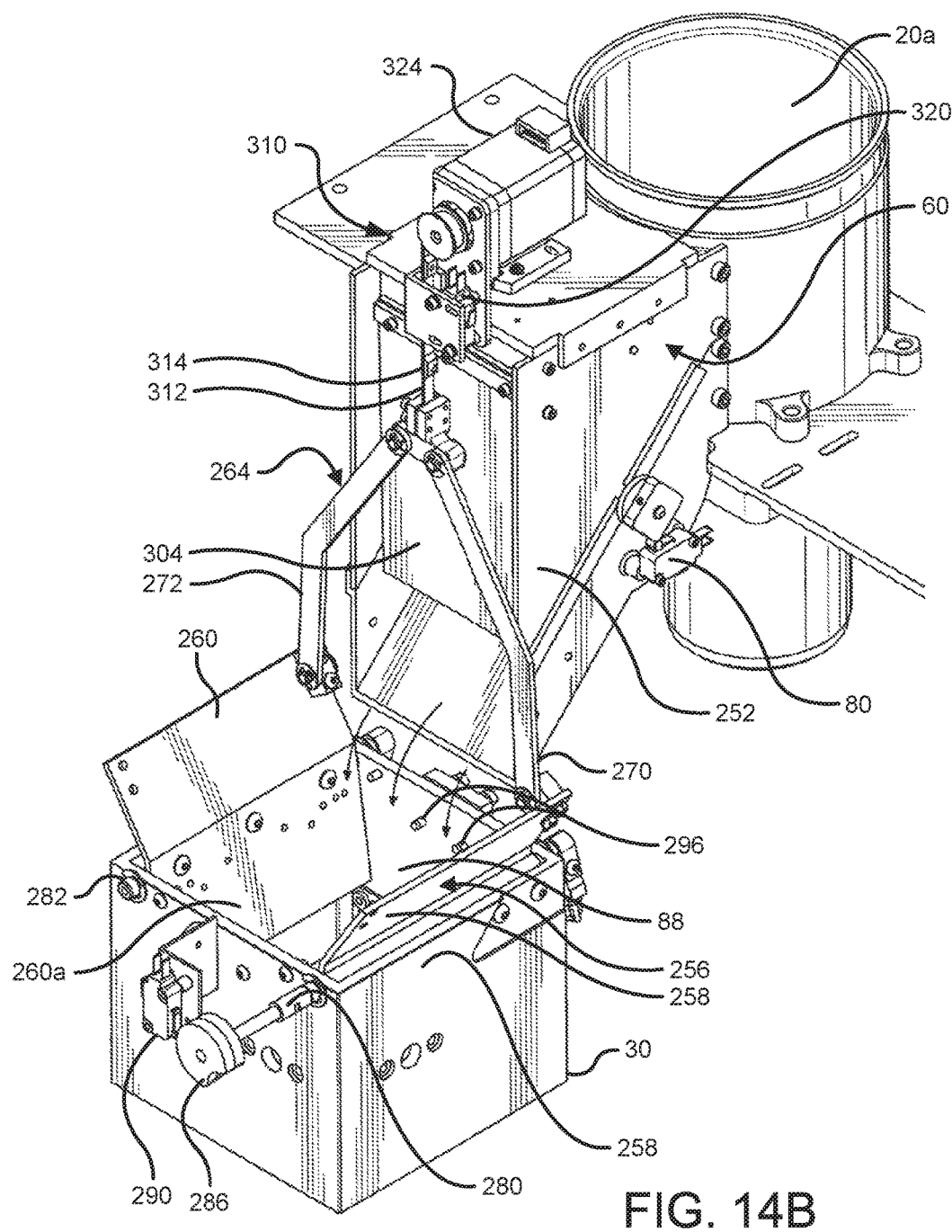
FIG. 14B is a perspective view similar to FIG. 14A, but showing further operational details.
Figure 15A:
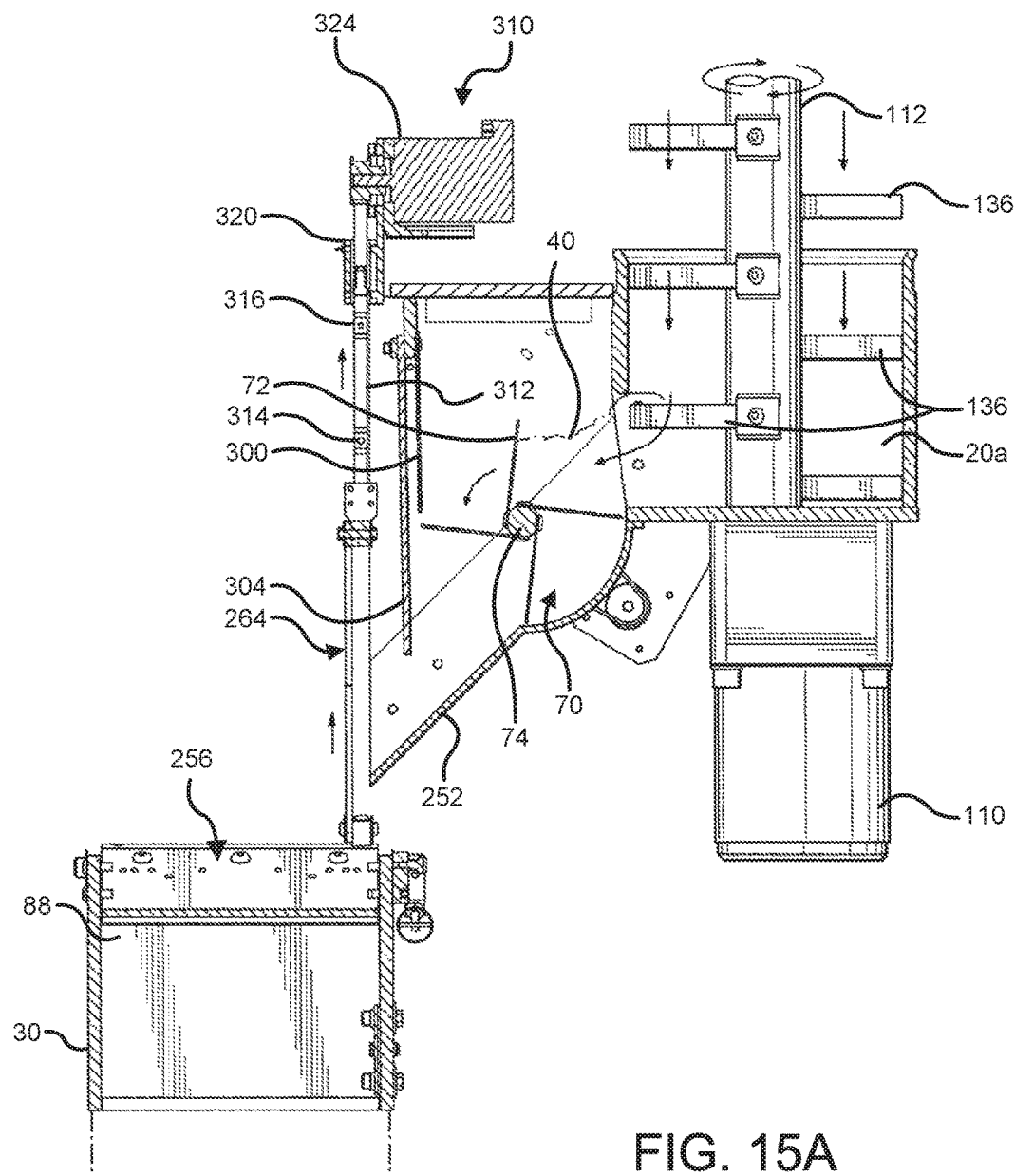
FIG. 15A is a side view, in cross section, illustrating the melter of FIGS. 14A and 14B.
Figure 15B:
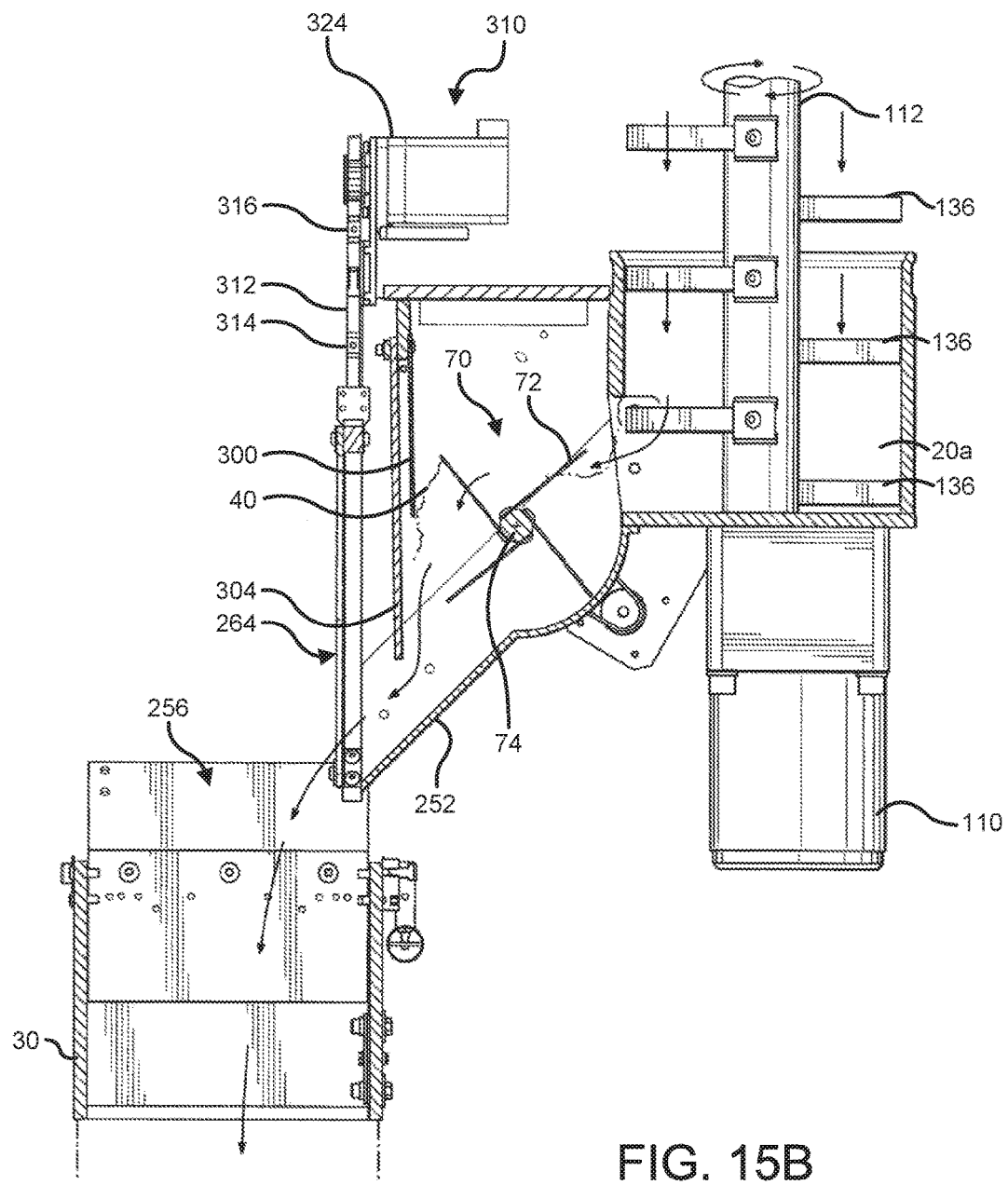
FIG. 15B is a side cross sectional view similar to FIG. 15A, but illustrating further operational details.

FIGS. 13 through 15B are directed to another illustrative embodiment of a melter 250. In this embodiment, the flexible hopper 20 and articulation/stirring mechanisms are configured and designed to operate generally the same as discussed above with respect to the any of the other embodiments described herein. Therefore, further description of these components is not necessary. This embodiment includes a slightly different feed device 60 and different lid operation for the heated receiving device or melting tank 30. Specifically, a downwardly inclined chute 252 is constructed between the outlet 20a of the flexible hopper 20 and the top 88 of the heated receiving device 30. A cover element or lid 256 is provided at the top 88 of the heated receiving device 30 and is specifically constructed with two cover portions 258, 260 that are pivotally coupled to an actuation structure 264. The actuation structure 264 comprises first and second linkages 270, 272 each pivotally connected at one end to a reciprocating element 276 and pivotally coupled at the opposite ends to the respective cover or lid portions 258, 260. The cover or lid portions 258, 260 rotate about axes defined by hinge elements 280, 282. One of the hinge elements 280 includes a cam 286 that operates a microswitch 290 for indicating to the control 14 (FIG. 1) when the cover or lid 256 is in the open and closed positions. This information is used by the control 14 to determine when to feed further particulate adhesive 40 (FIGS. 15A, 15B) into the chute 252, i.e., when to activate the rotary valve feed device 70. Pins 296 provide physical stop elements for the lid portions 258, 260 in the closed position as shown in FIG. 13. The inner ends 258a, 260a of the lid portions 258, 260 are angled downwardly into the chamber 34 such that if particulate hot melt adhesive 40 falls on top of the lid 256, the heated lid 256 will melt the adhesive and it will drain or drip through a central slot 298 into the chamber. As shown in FIGS. 15A and 15B, this embodiment also includes a rotary valve feed device 70 generally as discussed with regard to the first embodiment. As shown in FIGS. 15A and 15B, the rotary valve feed device 70 rotates counterclockwise and each approximately 90 degree segment of the rotary valve movement carries an amount of particulate hot melt adhesive 40 between the adjacent paddle elements 72 and past paddle contact elements 300 such that the particulate hot melt adhesive 40 is dumped into the chute 252. The paddle contact elements 300 align with the paddle elements 72 and can flex away from the paddle elements 72 as the rotary valve 70 rotates. The flexing of the paddle contact elements 300 is designed to prevent the rotary valve 70 from jamming or locking up during operation. Another panel element 304 is flexible rubber, fabric or a similar material and provides flow control for the particulate hot melt adhesive 40 at the lower outlet of the chute 252 and toward the inlet or upper opening 88 of the tank 30 past the lid portions 258, 260. It will also be appreciated that the design of the rotary valve 70 in conjunction with its surrounding structure will ensure that it may be stopped at a position as shown, for example, in FIG. 15A in which free flow of particulate adhesive 40 down the chute 252 will be prevented. In other words, at each of the four stopped positions, only one of the four quadrants of the rotary valve 70 will be aligned and in communication with the chute 252. An actuator 310 for moving the lid portions 258, 260 between the open and closed conditions includes a belt 312 having a pair of switch actuating elements 314, 316. The switch actuating elements 314, 316 respectively contact a microswitch 320 to start and stop a motor 324, respectively, at the open and closed conditions of the lid 256. The remaining portions or components of the melter 250 may be as described above, or generally conventional in nature, including the pump 50 and manifold 52 in fluid communication with the outlet of the heated receiving device 30 or tank. It will be appreciated that the tank or heated receiving device 30 may be constructed in many various forms, and sizes, depending on capacity needs, and/or melt on demand needs.

Figure 16:
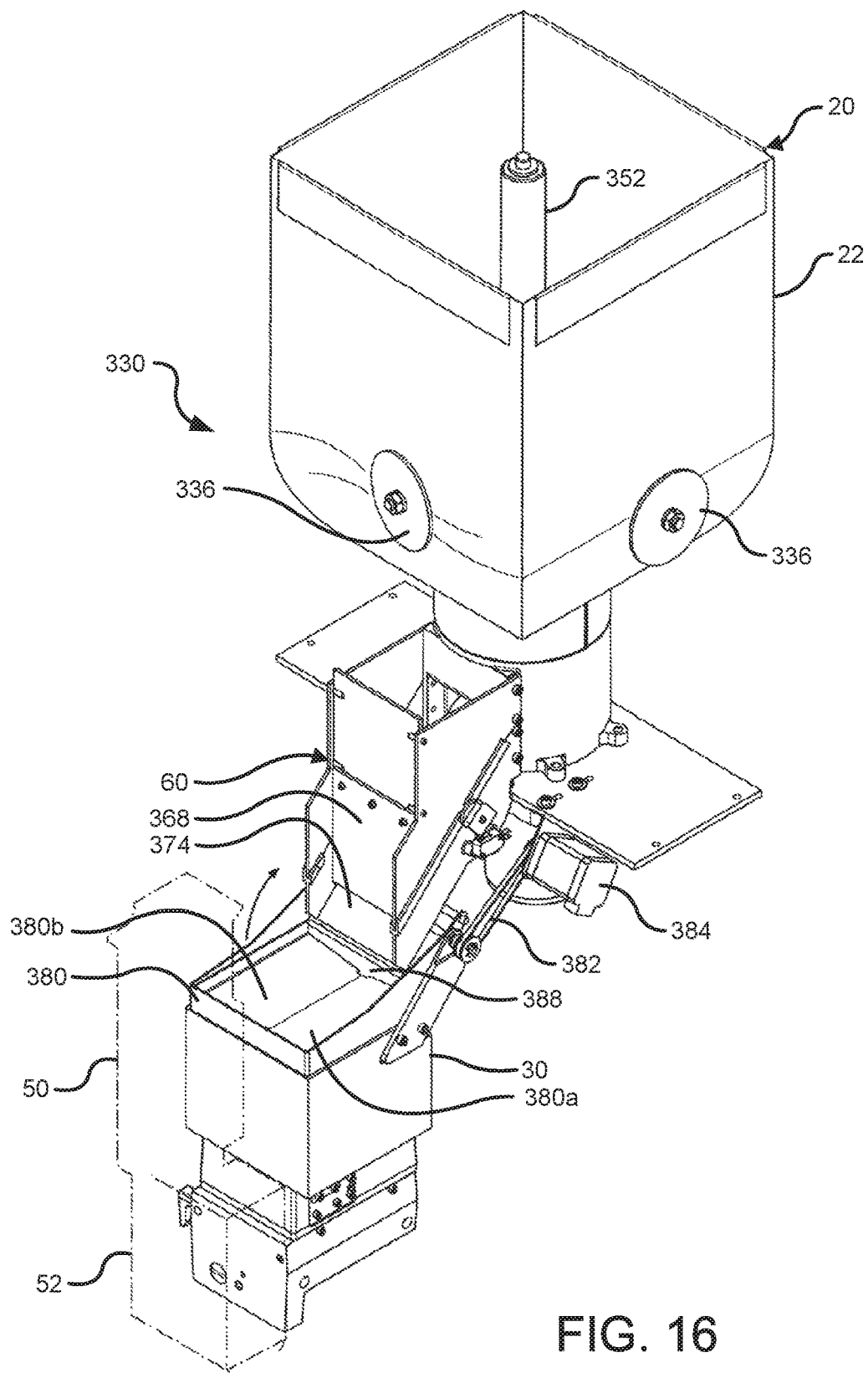
FIG. 16 is a perspective view illustrating another embodiment of a melter constructed in accordance with the invention.
Figure 17A:
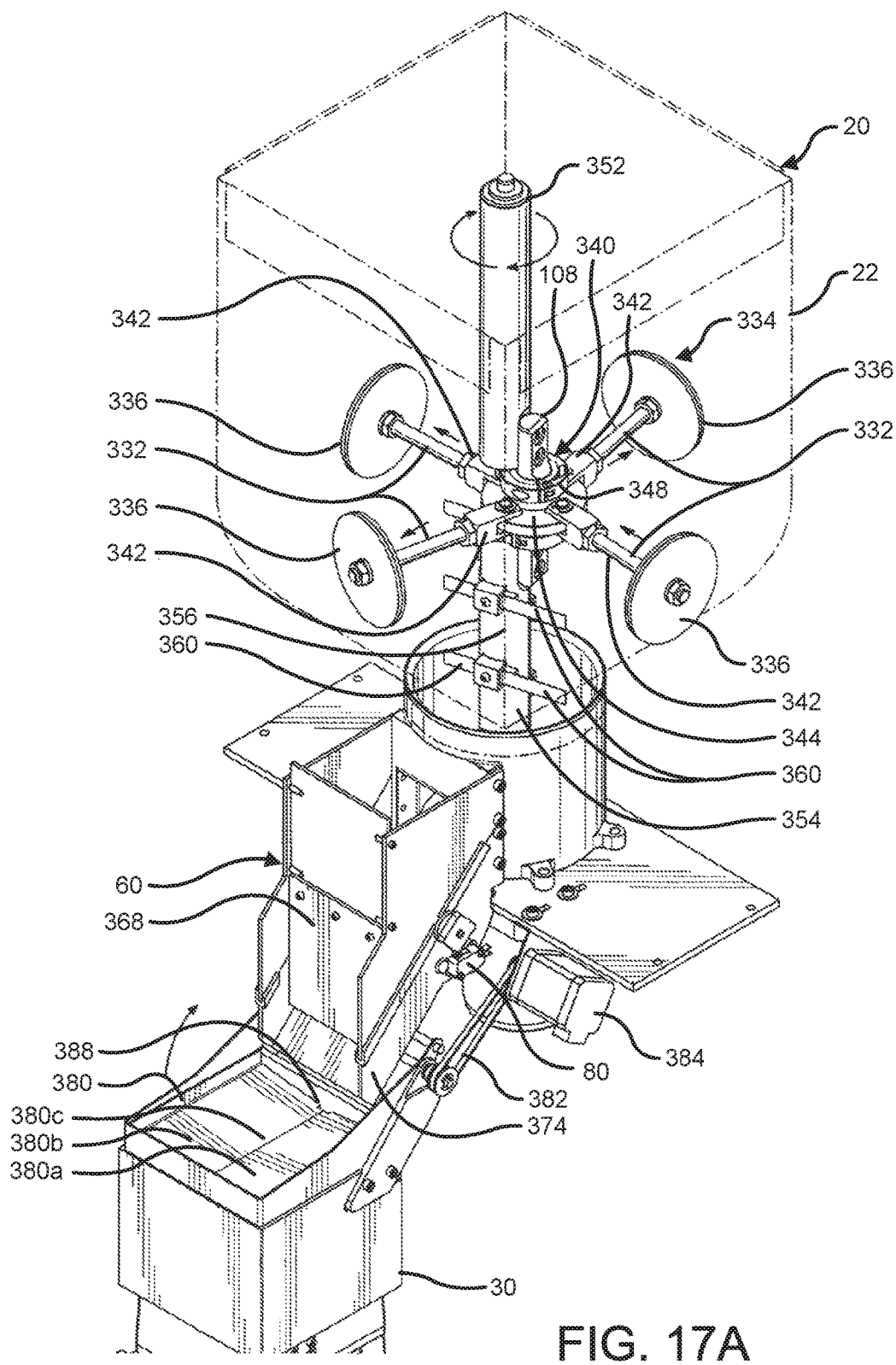
FIG. 17A is a perspective view of the melter shown in FIG. 16, with the cover element or lid of the melter in a closed condition.
Figure 17B:
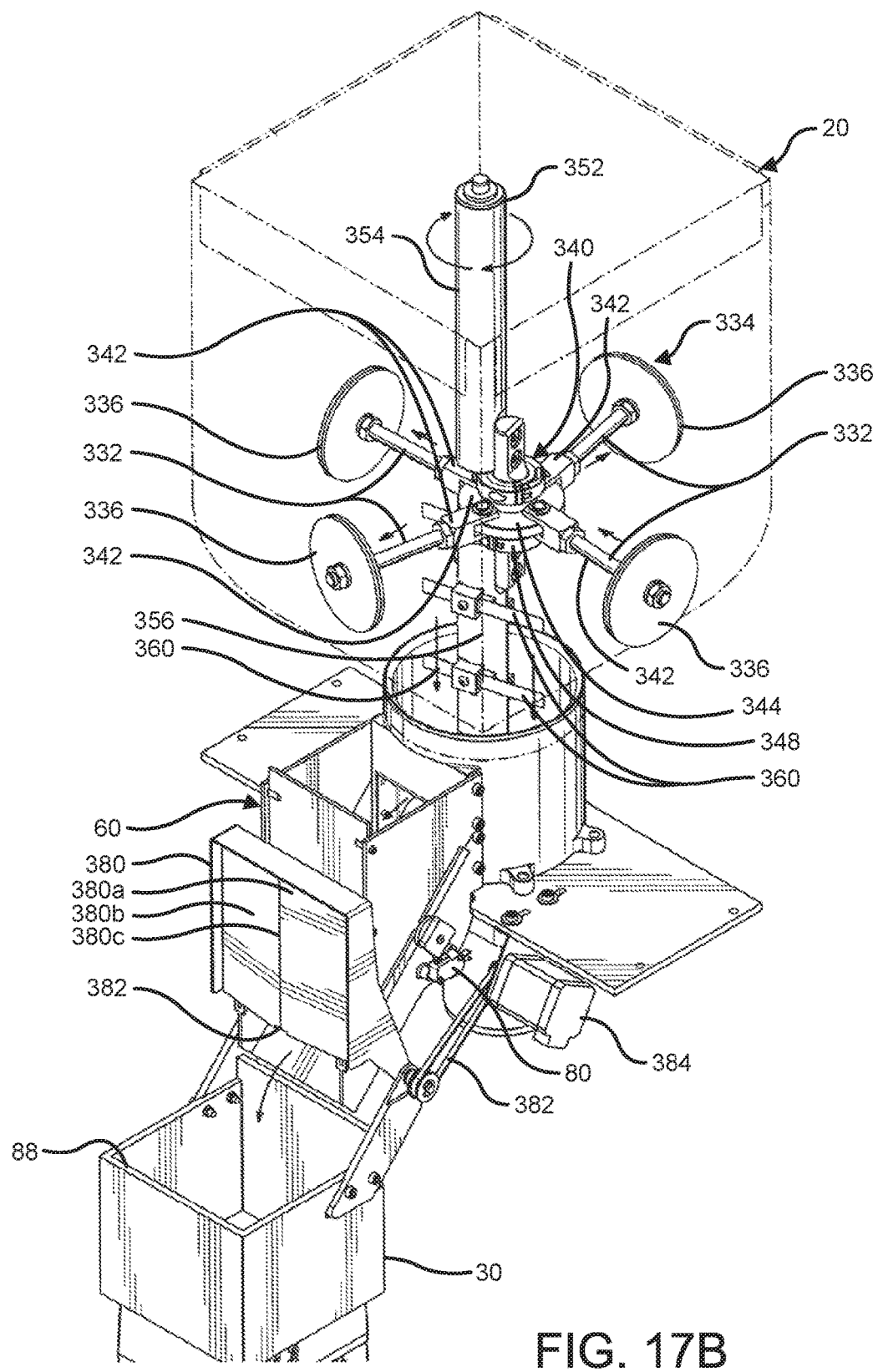
FIG. 17B is a perspective view similar to FIG. 17A, but illustrating the cover element or lid in an open condition.
Figure 18:
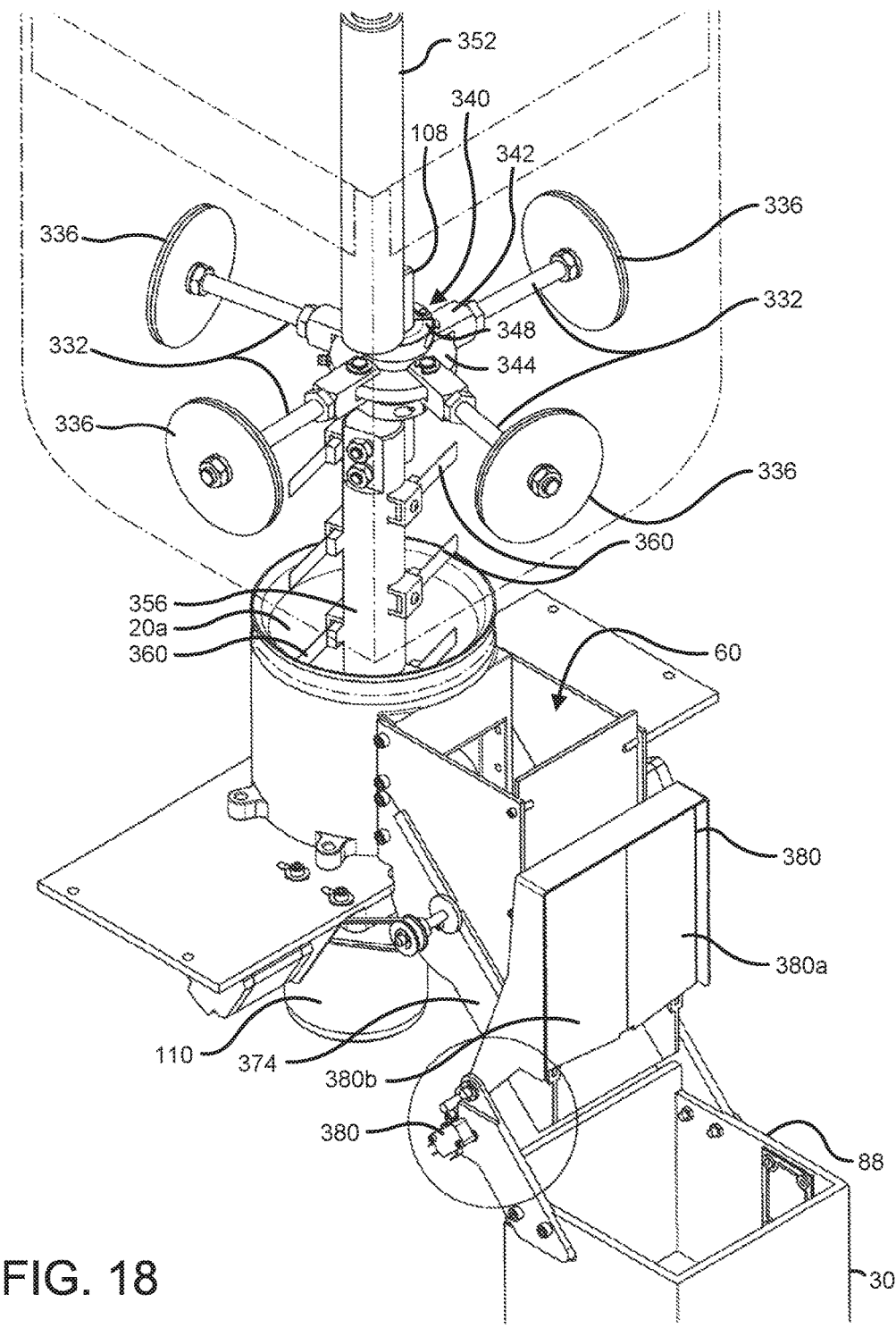
FIG. 18 is a perspective view from an alternative orientation showing the cover in the open condition.
Figure 18A:
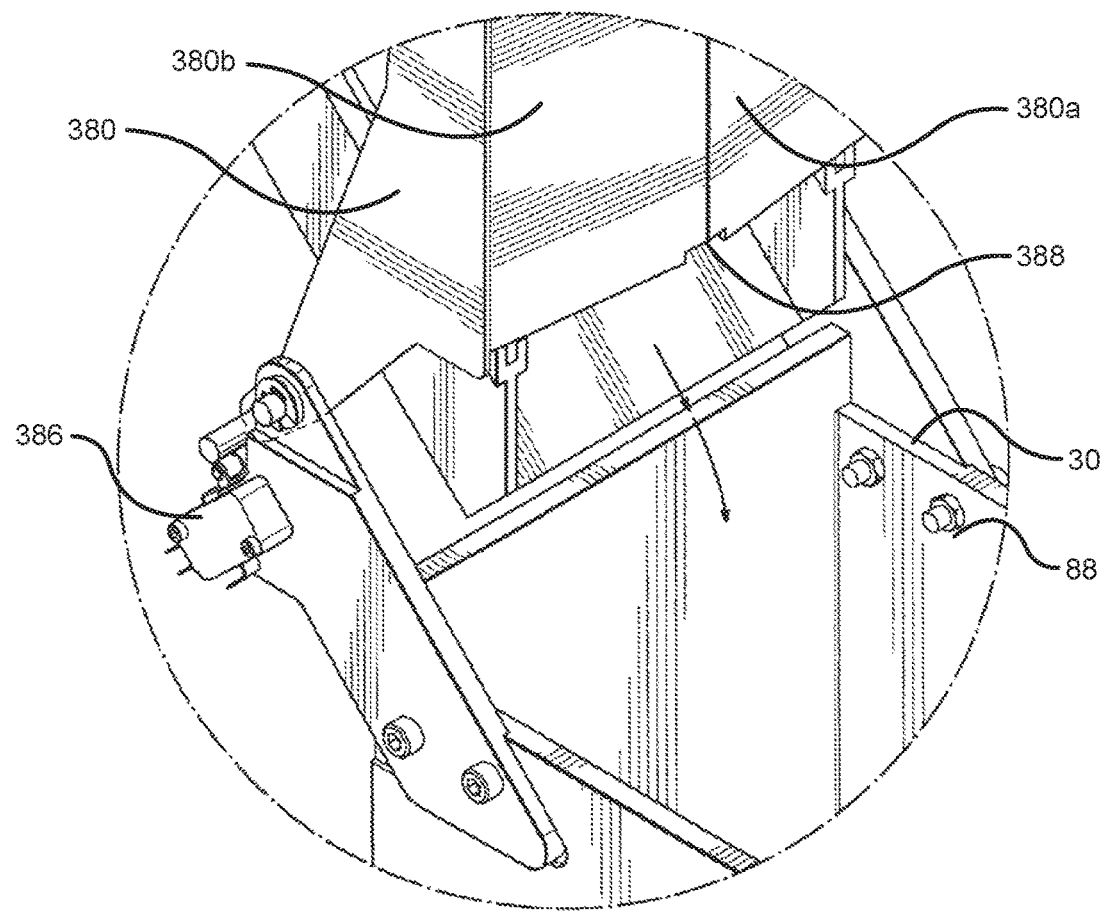
FIG. 18A is a perspective view of the enlarged, encircled portion of FIG. 18.
Figure 19A:
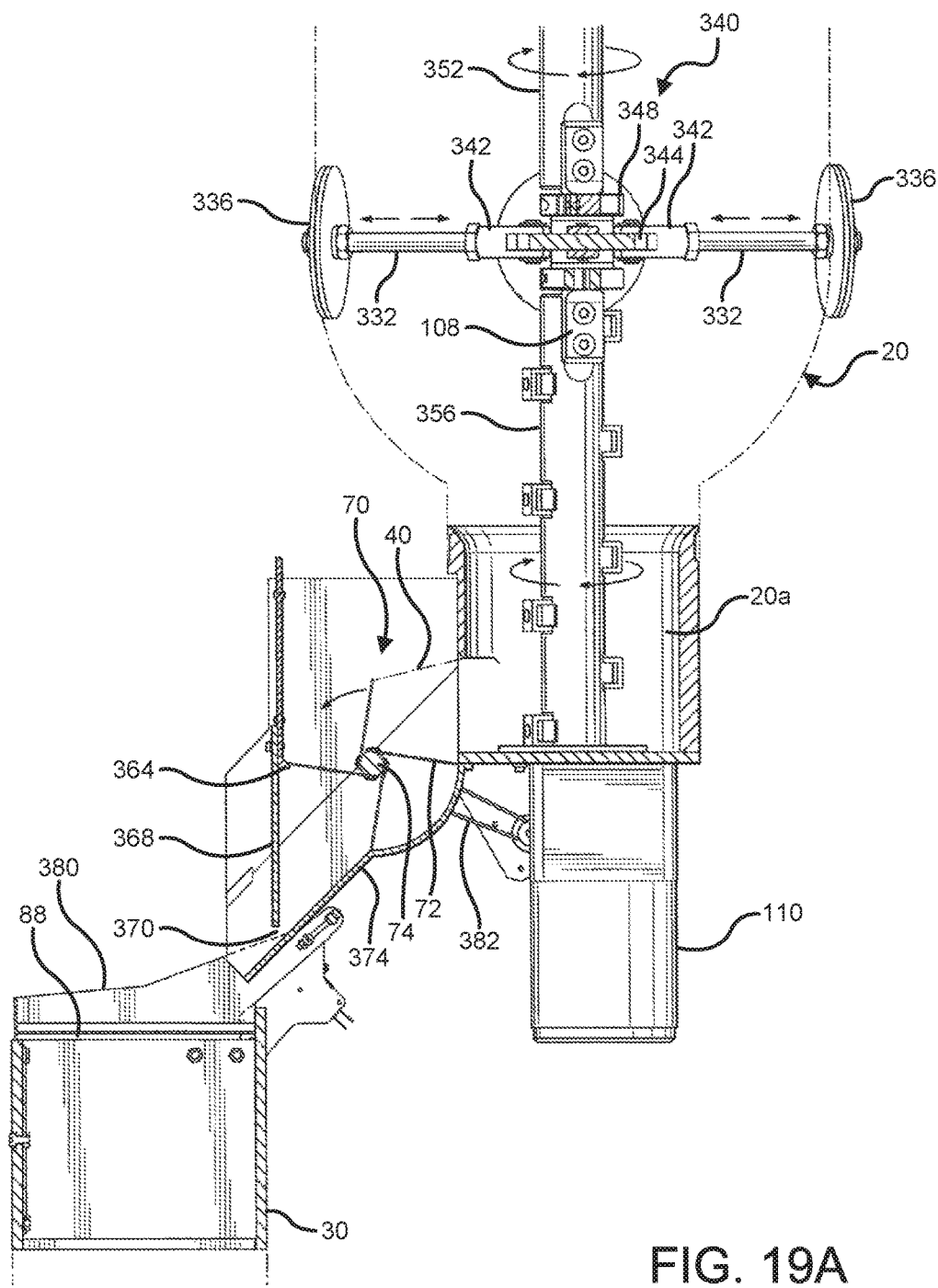
FIG. 19A is a side cross sectional view of the melter shown in FIG. 18.
Figure 19B:
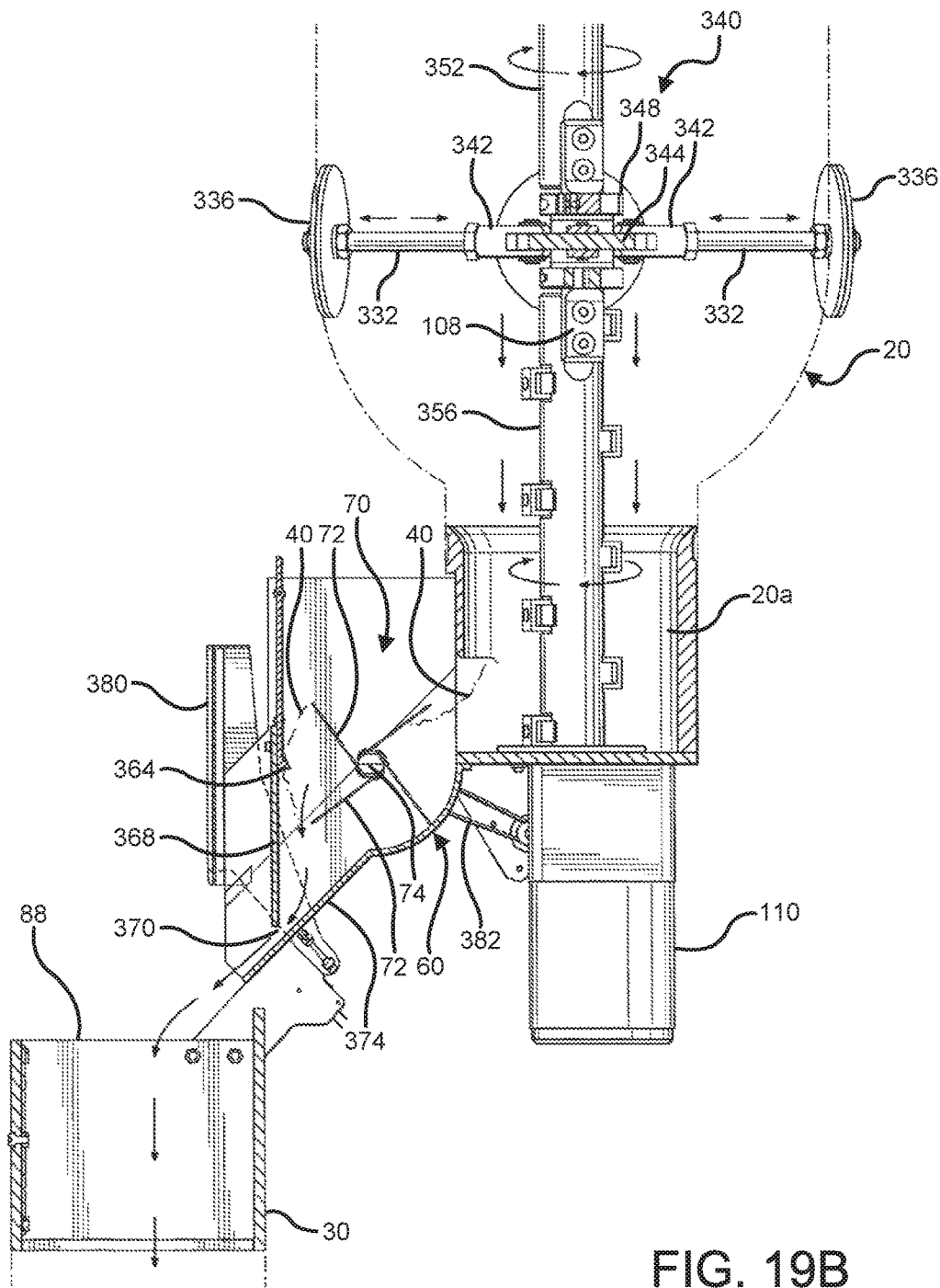
FIG. 19B is a side cross sectional view similar to FIG. 19A, but illustrating further operational details.
Figure 20:
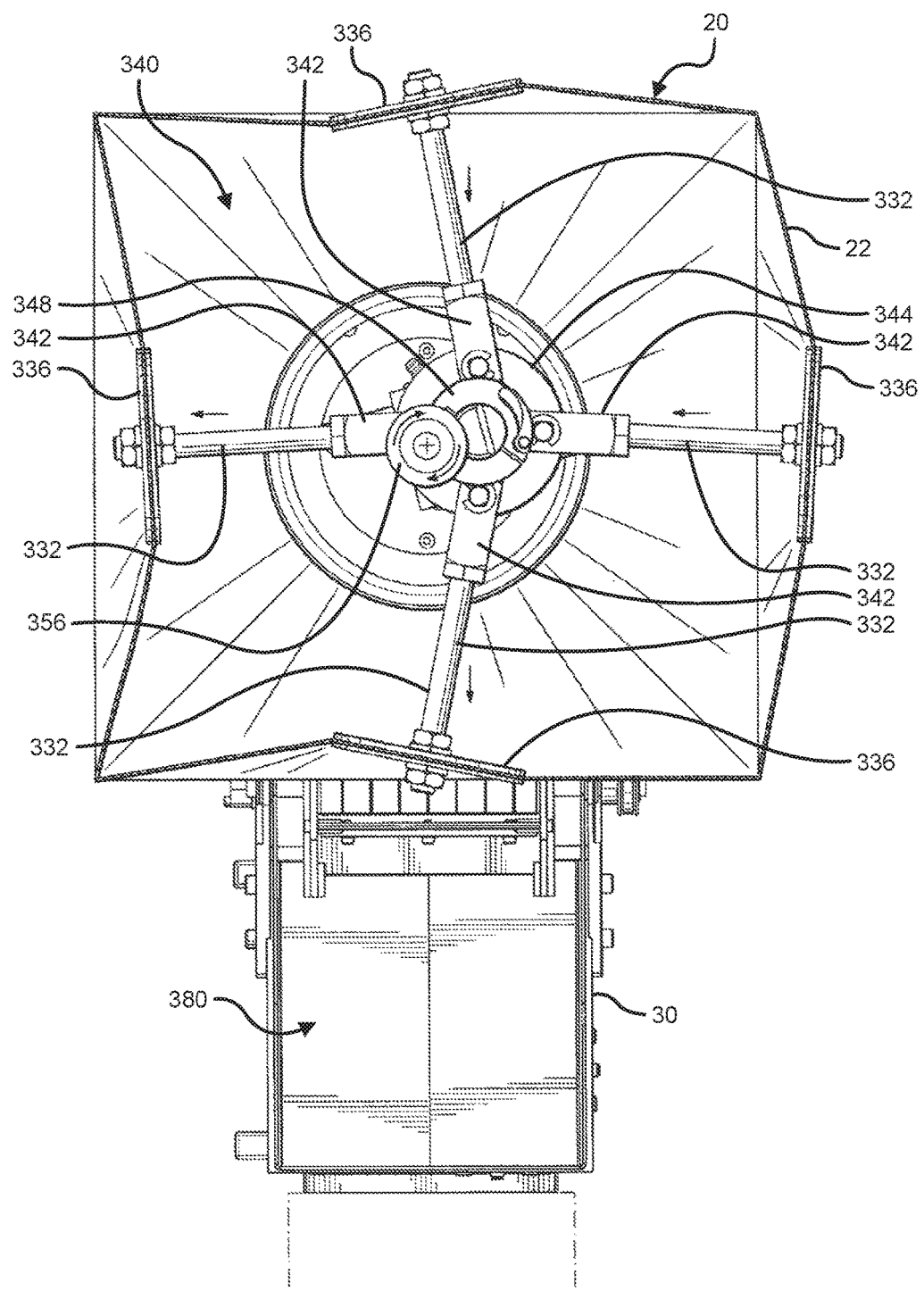
FIG. 20 is a top view of the melter shown in FIGS. 19A and 19B.

Another embodiment of a melter 330 is shown in FIGS. 16 through 20. In this embodiment, a flexible bag-type hopper 20 is shown and is very similar to the flexible hopper shown and described with regard to FIG. 1 and the first embodiment. However, in this embodiment, radial arms 332 of an articulation device 334 are directed toward the side portions of the flexible bag 22 and connecting elements 336 are affixed to or otherwise engage the flexible bag 22 essentially at central portions of each of the sides of the generally square bag 22. In addition, a cam structure 340 at the central region of the articulation device 334 is designed with four pivoting elements 342 secured to a central cam element 344 and dual bearing structure 348. Upper and lower shaft portions 352, 354 rotate about a central axis 356 and carry the cam structure 340 in an eccentric path around and spaced from the central axis 356. This causes the inward and outward radial bag movement generally as described above with regard to the first embodiment to move the flexible bag 22 radially inward and outward during each successive rotation of the upper and lower shafts 352, 354. Again as with the first embodiment, at least the lower shaft 354 includes generally radially outward directed paddle elements 360 that stir and break up central regions of the particulate hot melt adhesive 40 before the adhesive enters the feed device 60. As shown in FIGS. 19A and 19B, the rotary feed device 70 is constructed in a manner similar to the rotary valves previously described. In this embodiment, however, the paddle elements 72 contact a projection 364 for flexing the paddle elements 72 during each approximately 90 degrees of rotation. A stationary panel member 368, in the form of a flexible curtain or skirt, provides a flow control and a lower, small outlet 370 in a chute 374 leading to an upper end 88 of the tank 30, generally as previously described. The lower, small outlet 370 is defined by the rigid surfaces of the chute 374 on the bottom and sides and by the flexible curtain 368 at the top. In this embodiment, the tank or heated receiving device 30 includes a pivotal lid 380 that is raised and lowered between open and closed conditions by a belt 382 and motor 384. A microswitch 386 is used to indicate the open and closed conditions to the control 14 (FIG. 1). This microswitch 386 is used to control operation of the motor 384 for allowing particulate hot melt adhesive 40 to enter the tank 30 when the lid 380 is open. The operation of the motor 384 for actuating the lid 380 is coordinated with the operation of the feed device 60 to ensure that the lid 380 is opened before the feed device 60 is operated to send a further amount of particulate hot melt adhesive 40 down the chute 374 and into the tank 30. The flexible curtain 368 blocks heat from emanating into the chute 374 and toward the outlet 20a of the flexible hopper 20. This creates a thermal break for helping to prevent melting or softening of the particulate hot melt adhesive 40. When the lid 380 is in the closed condition, as shown in FIG. 16, two lid portions 380a, 380b are angled downwardly toward edges 380c of each lid portion 380a, 380b and the lid portions angle both toward each other and toward a notch 388 which acts as a drain. Therefore, if any particulate adhesive falls from the chute 374 onto the closed lid 380, the particulate 40 will melt and drain through the notch 388 into the tank 30.

Figure 21:
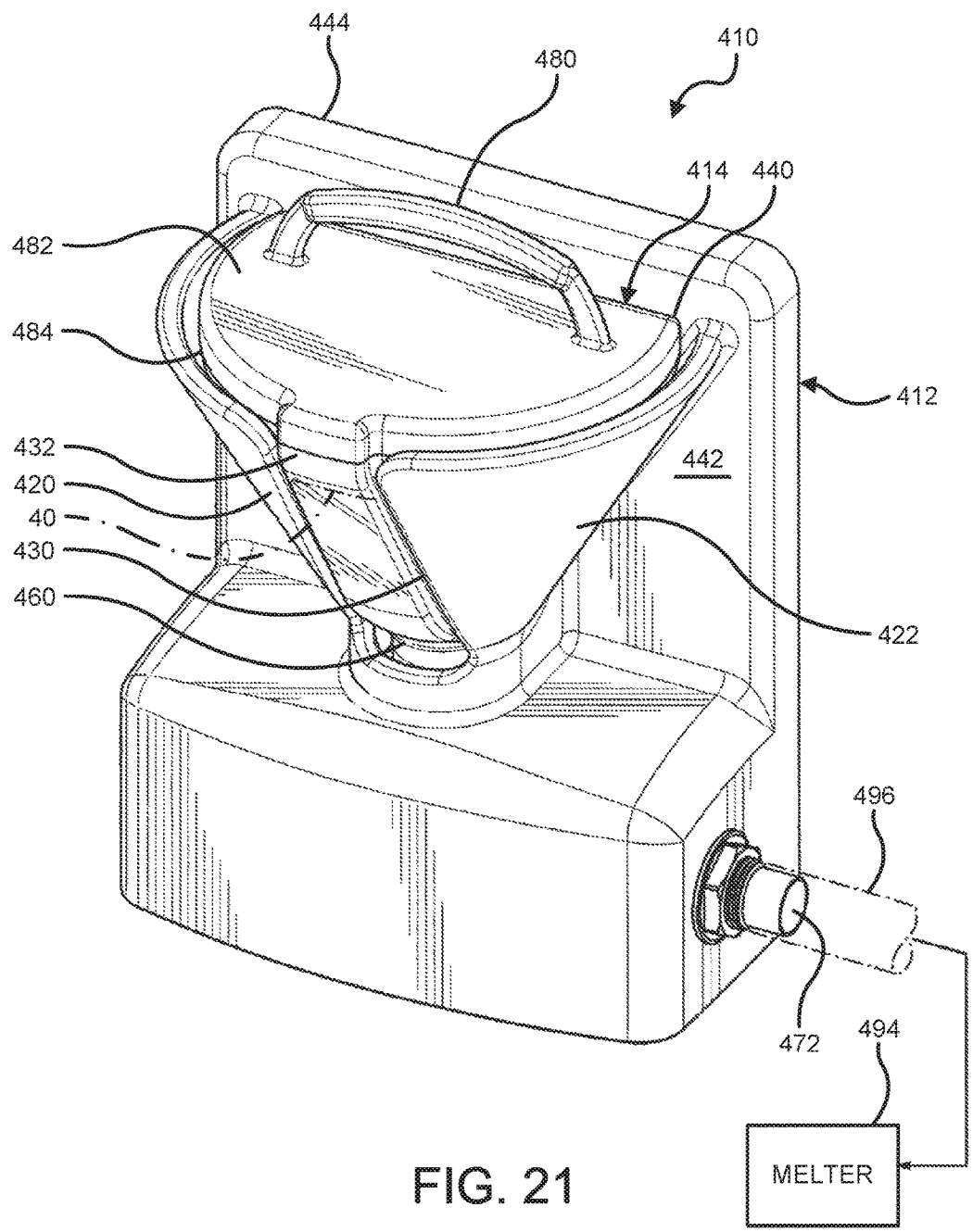
FIG. 21 is a perspective view of a portable container and docking and particulate transport unit for holding and transporting particulate hot melt adhesive to a melter, constructed in accordance with an illustrative embodiment of the invention.
Figure 22:
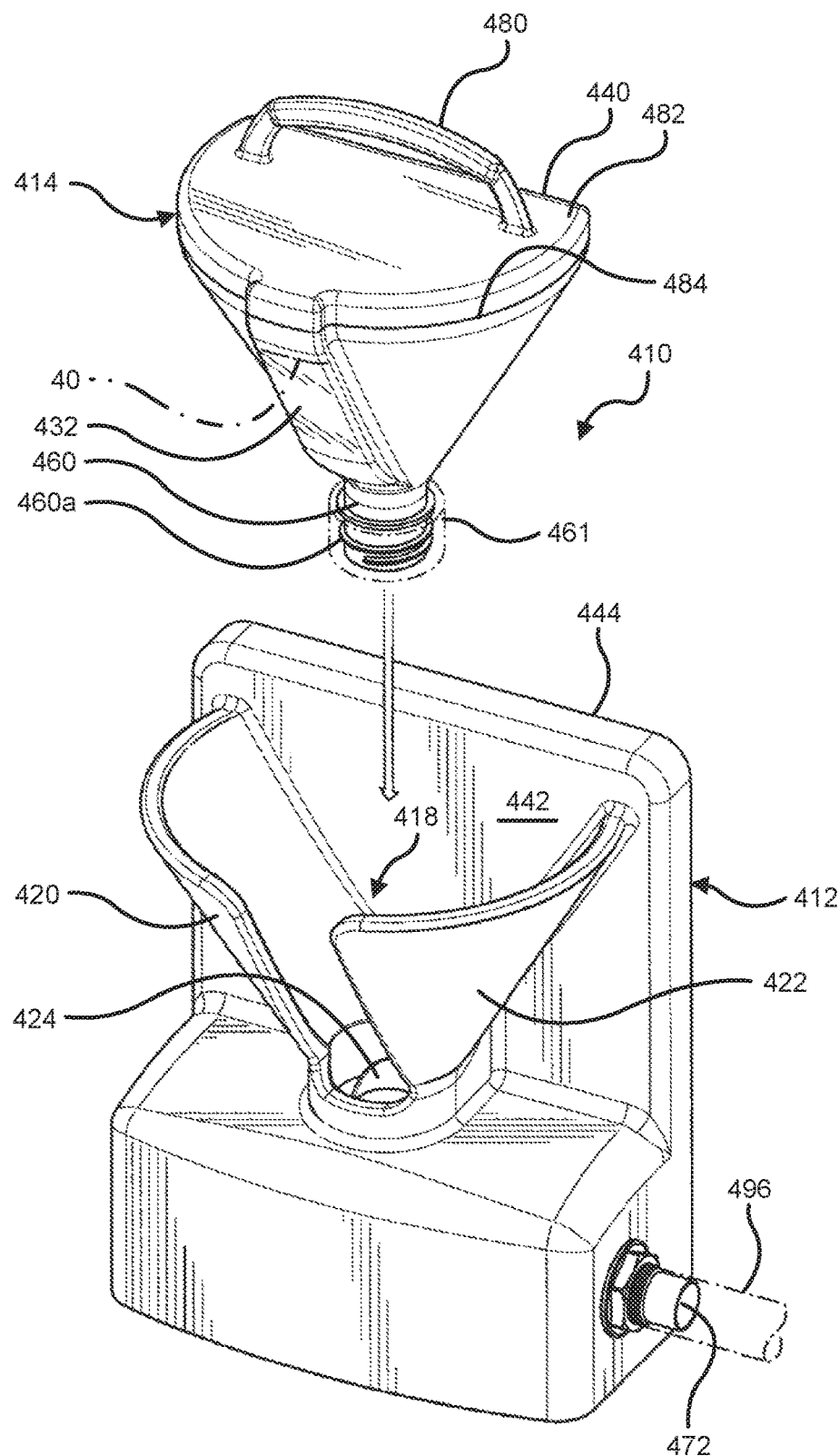
FIG. 22 is a perspective view similar to FIG. 21, but illustrating the portable container being inserted into the docking and particulate transport unit.
Figure 22A:
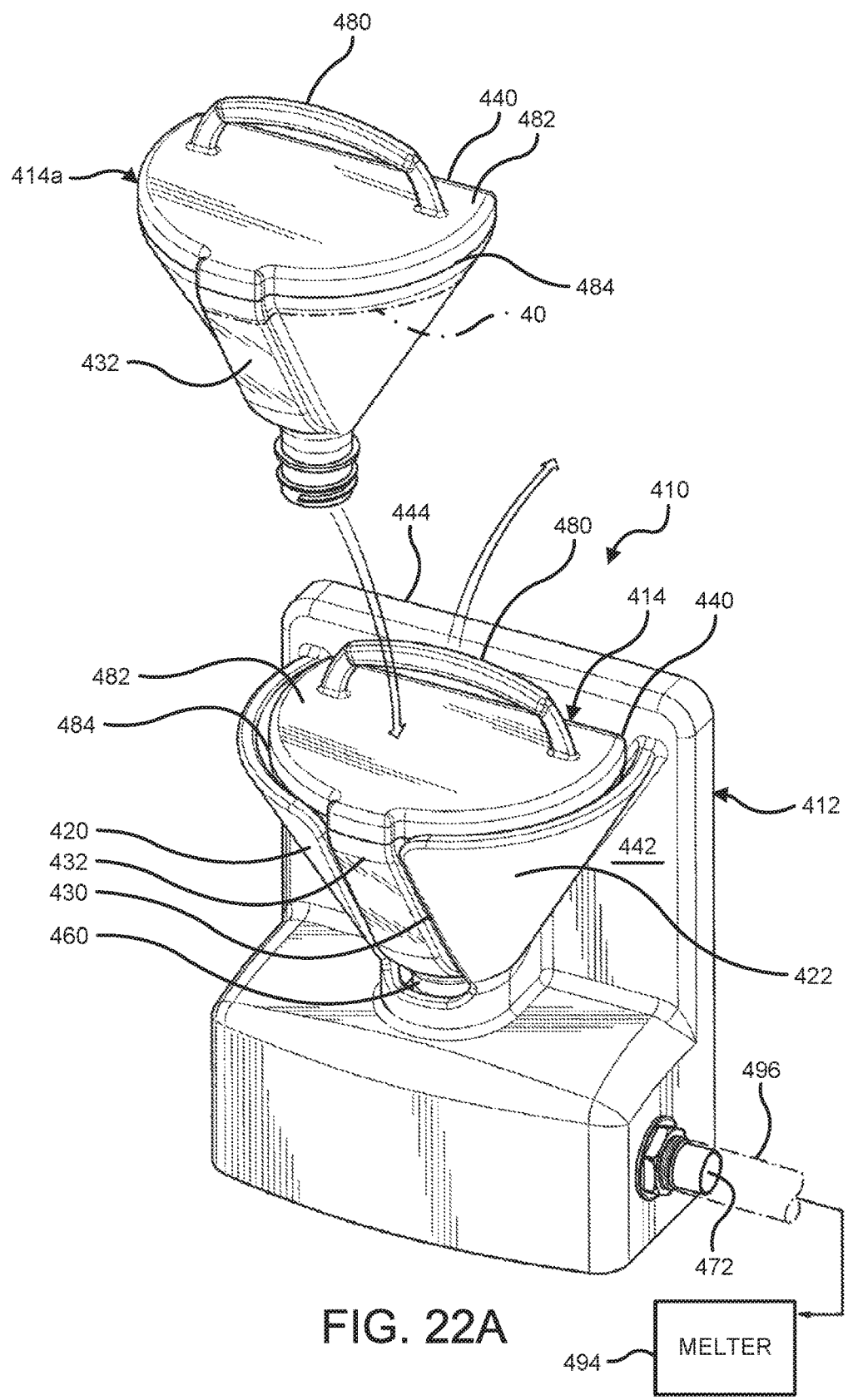
FIG. 22A is a perspective view similar to FIG. 22, but schematically illustrating a first portable container being removed and a second portable container being inserted into the docking and particulate transport unit.
Figure 23A:
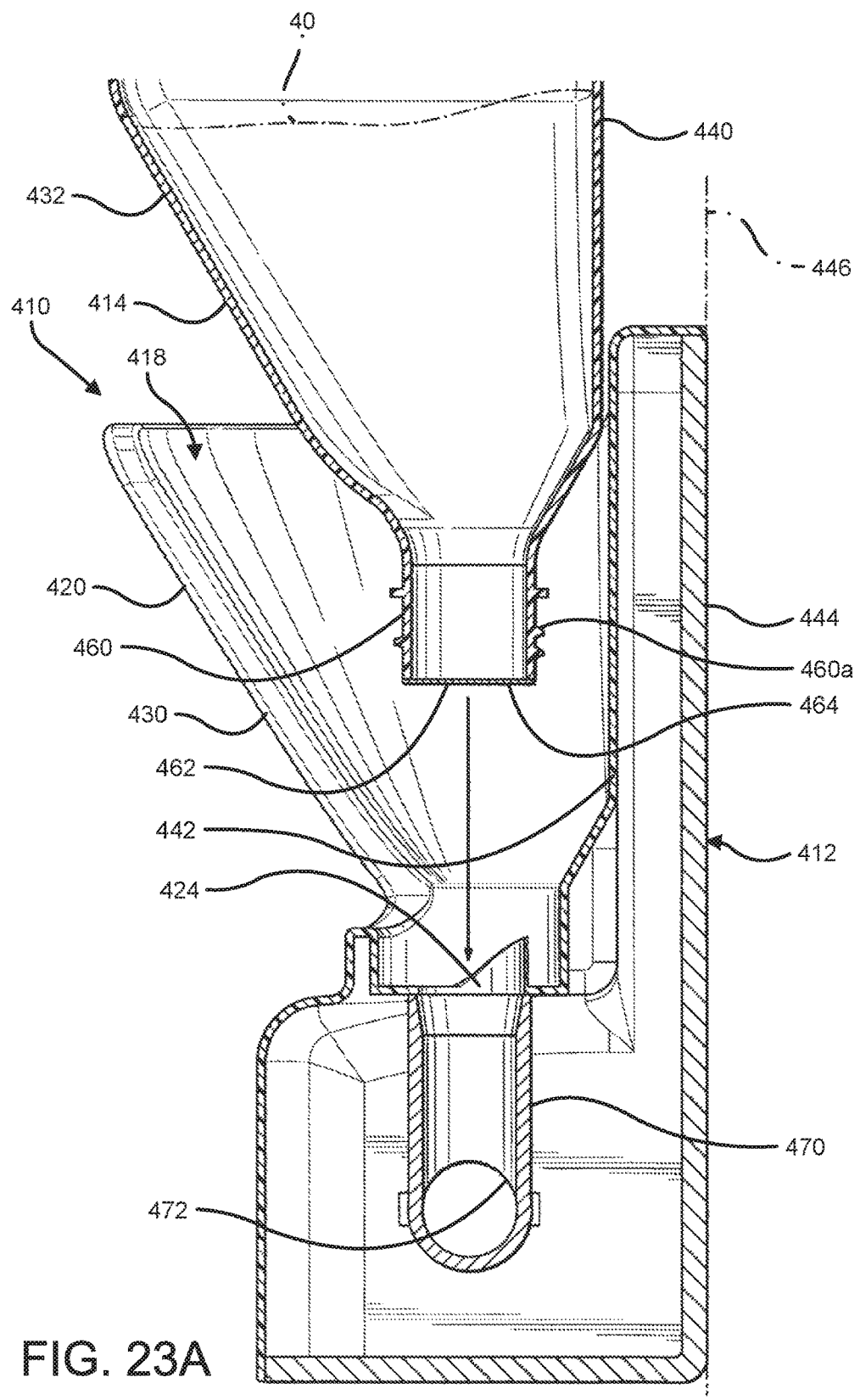
FIG. 23A is a side cross sectional view illustrating the portable container of FIGS. 21 and 22 being inserted into the docking and particulate transport unit.
Figure 23B:
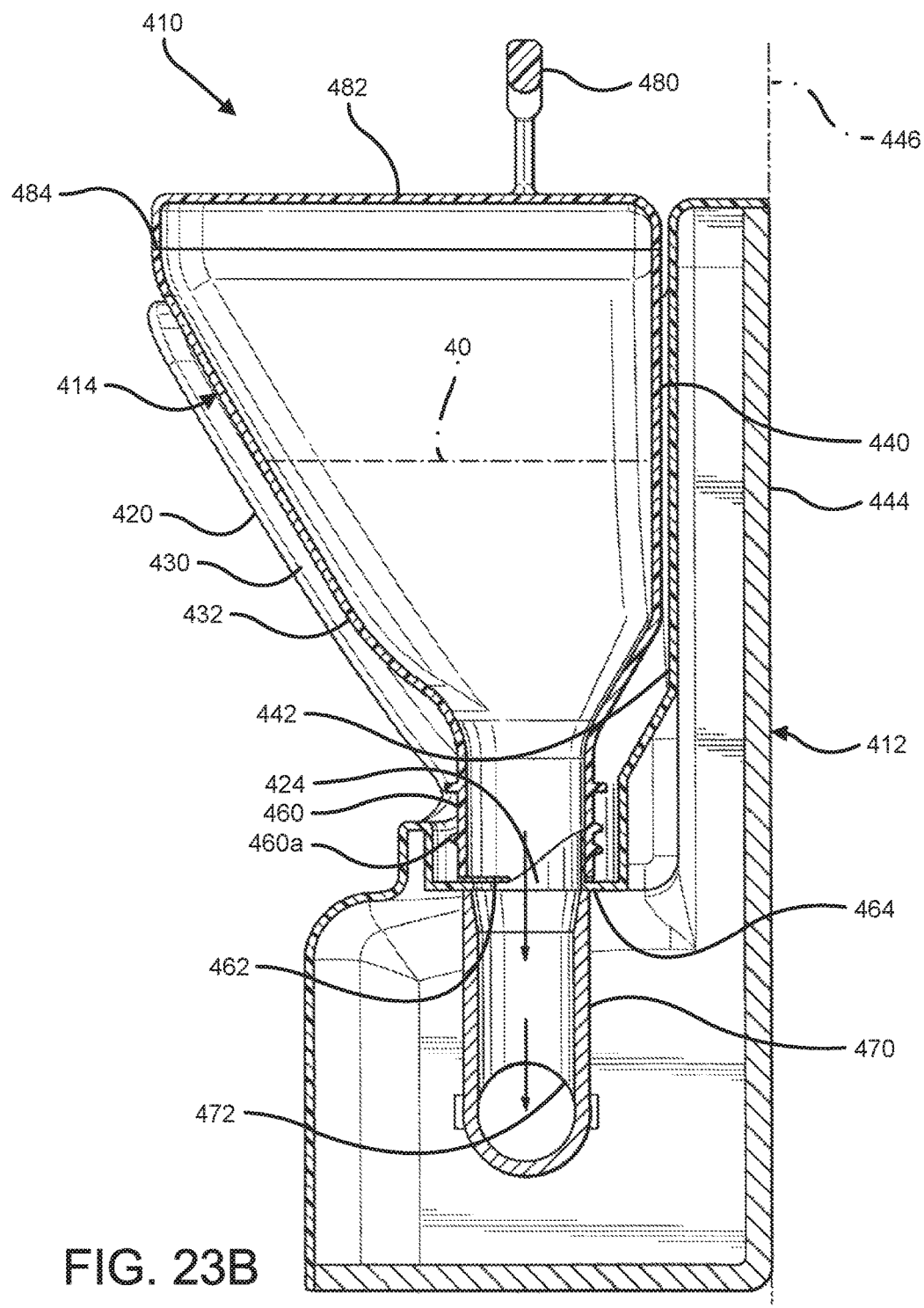
FIG. 23B is a side cross sectional view similar to FIG. 23A, but showing the portable container fully received in the docking and particulate transport unit.

Referring generally to FIGS. 21, 22 and 22A, in another embodiment an apparatus 410 includes a docking and particulate transfer unit 412 and a container 414 constructed in accordance with an illustrative embodiment of the invention. As shown in FIG. 22, the container 414 holds particulate hot melt adhesive 40 and is inserted into a container receiving space 418 of the docking and particulate transfer unit 412. The container 414 may be sized to hold an amount of adhesive 40 equal to a specific time period of use, such as one production shift. The container receiving space 418 is defined by a pair of curved sidewalls 420, 422 converging toward a lower end. A piercing member 424 of the unit 412 is fixed at the lower end of the container receiving space 418 for purposes to be described below. The curved sidewalls 420, 422 define a central slot 430 which is configured to receive an elongate protruding segment 432 of the container 414 as shown in FIG. 21. At least this exposed segment 432 of the container 414 is transparent or at least translucent so that an operator can see the level of particulate hot melt adhesive 40 in the container 414. The container 414 has a shape which is generally complementary to the shape of the internal container receiving space 418 so that a snug fit is formed between the container 414 and the docking and particulate transfer unit 412. The container 414 includes a flat rear wall 440 that engages or is parallel to an interior rear surface 442 of the docking and particulate transfer unit 412. The docking and particulate transfer unit 412 further includes a flat exterior, rear surface 444 with suitable structure (not shown) for hanging the unit 412 on a wall 446 (FIGS. 23A and 23B). As further discussed below, and illustrated schematically in FIG. 22A, a first container 414 may be removed from the unit 412, such as when it is depleted of unmelted particulate hot melt adhesive 40, and then replaced by a second container 414a of particulate hot melt adhesive 40. If empty, the first container 414 may be discarded or recycled if it is a single-use, disposable or recyclable container or it may be refilled, as desired.

As further shown in FIGS. 22, 23A and 23B, the particulate container 414 includes a lower, generally cylindrical end 460 which registers within the lower end of the container receiving space 418. The end 460 includes threads 460a that receive an internally threaded cap 461 (FIG. 22). The cap 461 is used while storing and transporting the container 414 of particulate adhesive 40 and is removed prior to inserting the container 414 into the unit 412. The piercing member 424 pierces a rupturable element or membrane 462 covering a lower end or outlet opening 464 of the container 414 such that the interior of the container 414 and its particulate contents 40 communicate with a vertically oriented conduit 470. The particulate adhesive 40 flows by gravity through the vertical conduit 470 and then into a generally horizontally oriented conduit 472. As further shown in FIGS. 21, 22 and 23B, the container 414 includes a handle 480 coupled with a lid or cover 482 at an upper end of the container 414 as another manner to access the interior of the container 414.

Figure 24:
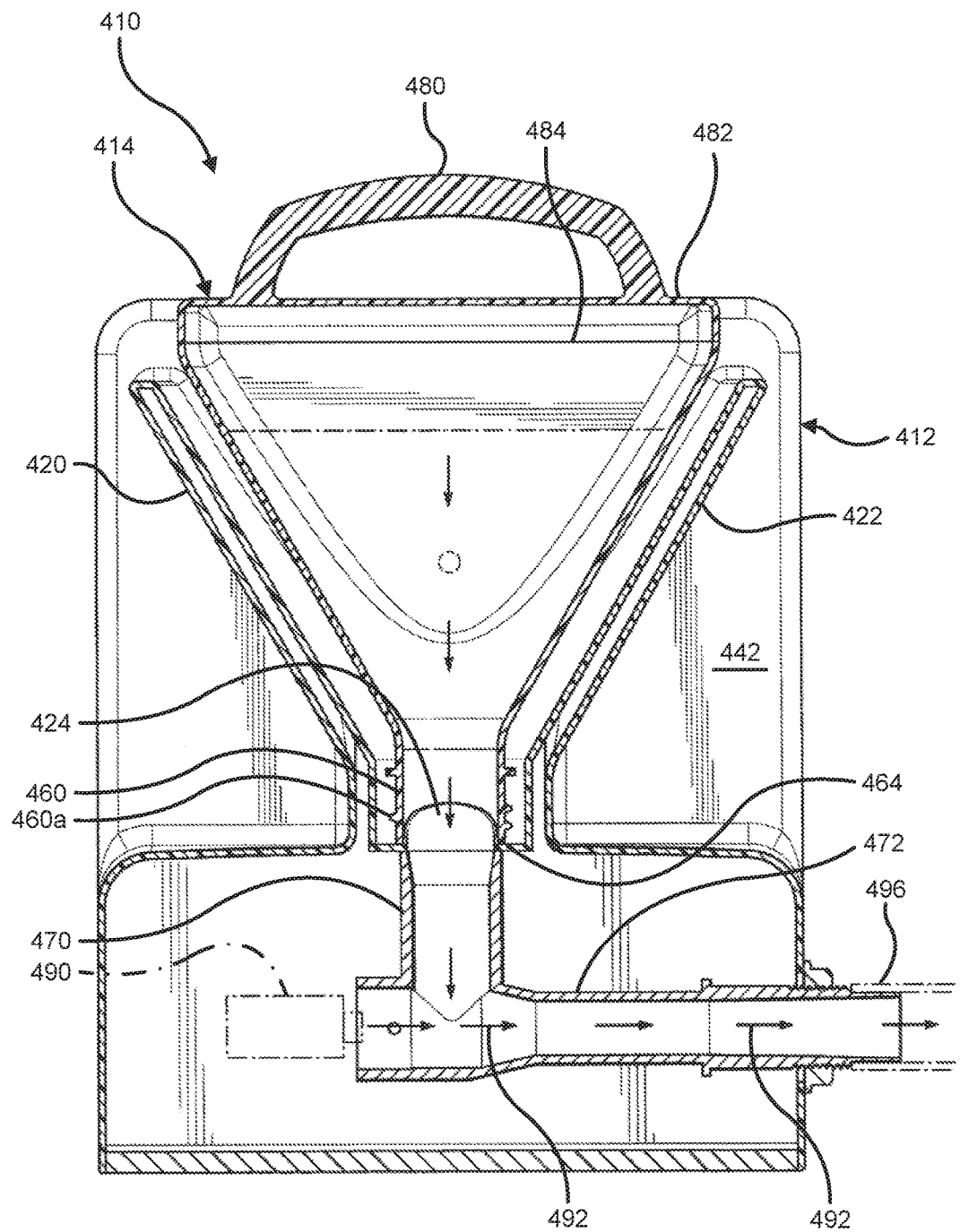
FIG. 24 is a front cross sectional view of the portable container received in the docking and particulate transport unit.

FIG. 24 schematically illustrates the operation of transporting or moving the particulate adhesive 40 in the container 414 through the outlet opening 464 and into the vertical conduit 470. The particulate adhesive 40 is further moved, such as by using a pneumatic air moving device or eductor 490 in the direction shown by the arrows 492 through the generally horizontal conduit 472 to a melter 494 (FIG. 21). The conduit 472 may include one or more different types of conduit and these conduits may be rigid and/or flexible. For example, a flexible hose 496 may be used of any suitable length to direct the particulate adhesive to the melter 494, as needed, to operate the melter 494 during a dispensing operation.

As best illustrated in FIG. 22A, one illustrative embodiment provides a system for holding and transferring unmelted particulate hot melt adhesive from a plurality of containers 414, 414a, used one after the other, to the melter (FIG. 21). In this type of system, the unit 412 is used to hold a first container 414 as previously described. When it is desired to remove that container 414 because the container is depleted of unmelted particulate hot melt adhesive or for other reasons, that container 414 is removed from the unit 412 and replaced by a new container 414a of unmelted particulate hot melt adhesive 40. It will be understood that the containers 414, 414a illustrated herein are merely examples of the constructions, configurations and shapes that are possible. The containers 414, 414a may take on many optional forms, and may be formed as rigid containers, semi-rigid containers, or even flexible containers such as bags. If a flexible container or bag is used as the container 414, 414a, it may be formed of various flexible materials, such as reinforced fabric or mesh materials formed from polymer or other synthetic material. The unheated docking and particulate transfer unit 412 is thermally isolated from other heated components of a hot melt adhesive dispensing system, such as the heated melter 494 (FIG. 21). It is important to note that the unmelted particulate hot melt adhesive 40 in the containers 414, 414a remains unsoftened and unmelted by any external heat source, such as other hot melt adhesive systems components. The first and second containers 414, 414a may be single use containers which are discarded or recycled after the unmelted particulate hot melt adhesive 40 is transferred from the container 414, 414a. Further, it will be appreciated that many different designs of mechanisms for opening the outlet 464 of the containers 414, 414a may be used. For example, as options to the rupturable element 462, various types of movable gate mechanisms or other selectively actuating covering elements may be used instead. Such covering elements may be selectively moved between open and closed positions. Other single use covering elements, other than the rupturable element 462, may be used to carry out embodiments of the invention.

Figure 25:
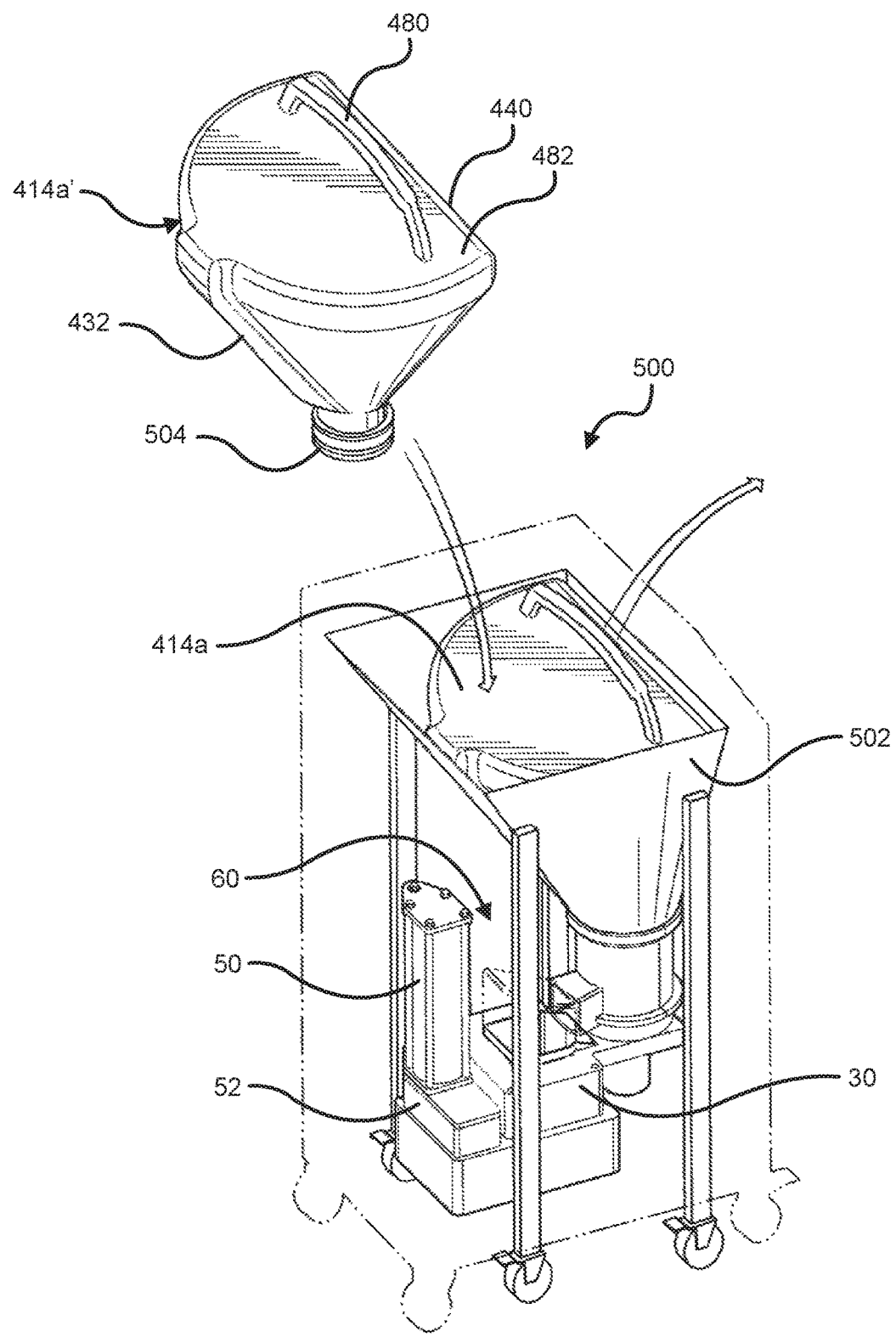
FIG. 25 is a perspective view illustrating another alternative embodiment of a melter in combination with a prepackaged container of particulate hot melt adhesive.

FIG. 25 illustrates another alternative embodiment of a melter 500 utilizing a prepackaged container 414a' of particulate adhesive 40. In this regard, instead of coupling the prepackaged container 414a' to a remote unit for delivering the particulate adhesive to a melter, the prepackaged container 414a' of particulate adhesive is coupled directly to the melter 500. For example, the container 414a' of particulate hot melt adhesive 40 may be inserted directly into a receiving unit 502 such that an outlet 504 of the container 414a' communicates with a suitable particulate hot melt adhesive feed device, such as one of the feed devices 60 described hereinbefore, or another suitable feed device. The feed device 60 then directs the particulate hot melt adhesive 40 into a melting tank 30, such as generally as previously described. The container 414a' shown in FIG. 25 is rigid, however, it will be appreciated that any of the flexible hoppers or containers as described herein may be used instead. The lower end or outlet 504 of the container 414a' has a suitable cover element (not shown) that may be opened, such as described in the previous embodiment or in any other suitable manner. For example, the cover element may be capable of selectively being opened and closed by a user in accordance with intermittent needs of the particular application.

Figure 26:
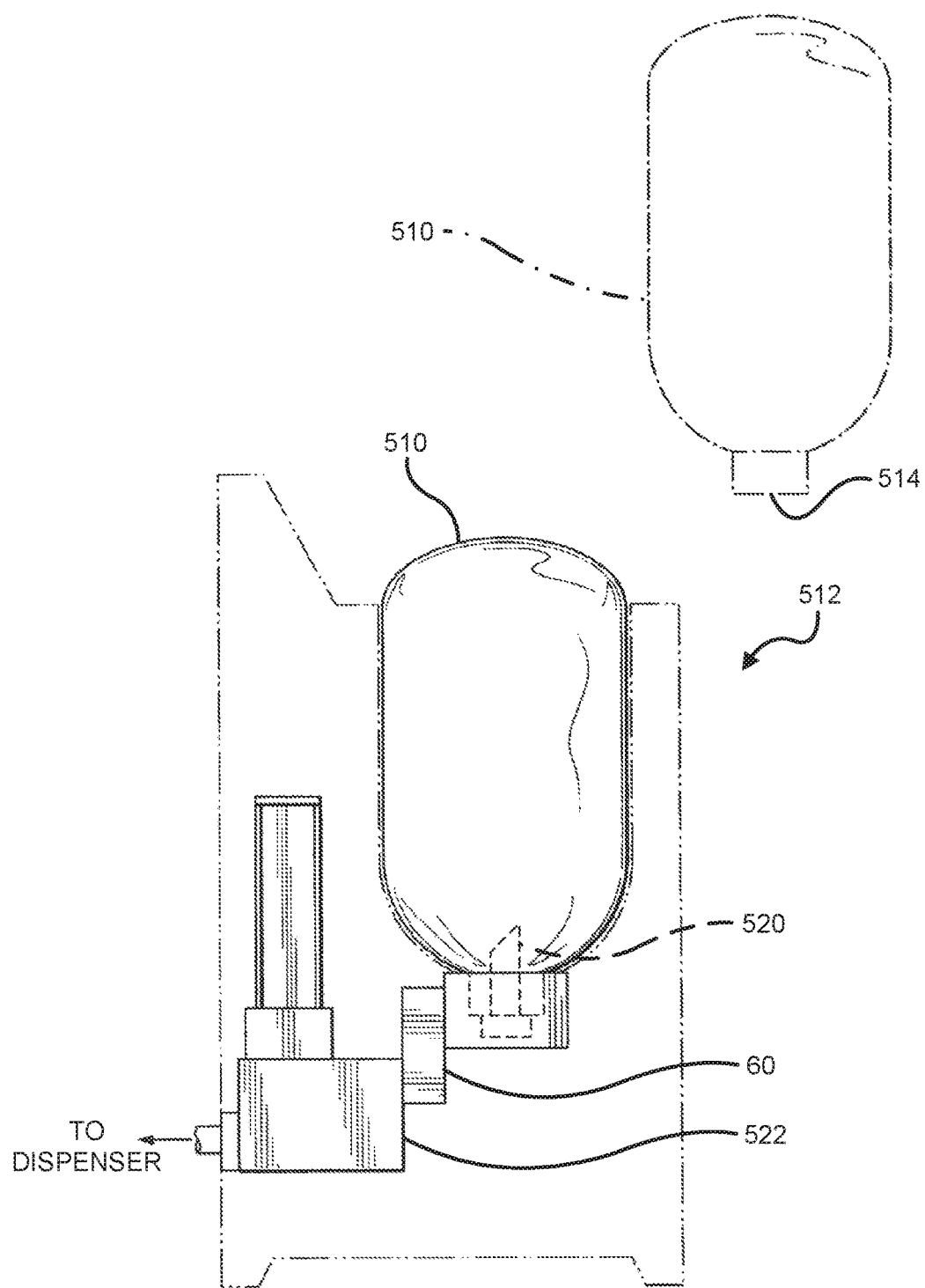
FIG. 26 is a side elevational view of another melter similar to FIG. 25 and illustrating the removal and replacement of a prepackaged container of particulate hot melt adhesive.

FIG. 26 schematically illustrates another embodiment of a prepackaged container 510 of particulate hot melt adhesive 40 coupled with a melter 512. In this embodiment, an outlet cover element 514 is a rupturable element at the lower end of the container 510 and a piercing element 520 associated with the melter 512 is used to open the outlet of the container 510 as the container 510 is inserted thereby facilitating communication between the interior of the container 510 and the contents of the particulate hot melt adhesive 40 and a feed device 60. The feed device 60 is coupled with a suitable heated receiving device 522, such as a hot melt adhesive melt-on-demand device. It will be appreciated that the outlet of the prepackaged container 510 may include any other type of cover element appropriate for sealing and covering the outlet of the container 510 during shipping and storage, but capable of being opened either simultaneously with the insertion of the container 500 into a receiving component or simultaneous with some other type of coupling of the container 510 to the melter 512. Or, the cover element 514 may be capable of being opened by a user after the prepackaged container is coupled with the melter.

FIGS. 27 through 34 depict illustrative embodiments of a hot melt adhesive supply system 610 (the "supply system," hereinafter) including a lateral agitator. In general, the supply system 610 is configured to receive a supply of hot melt adhesive particulate and provide the adhesive particulate to an attached adhesive melter. The adhesive melter, in turn, may provide melted hot melt adhesive to an adhesive dispensing module.

Figure 27:
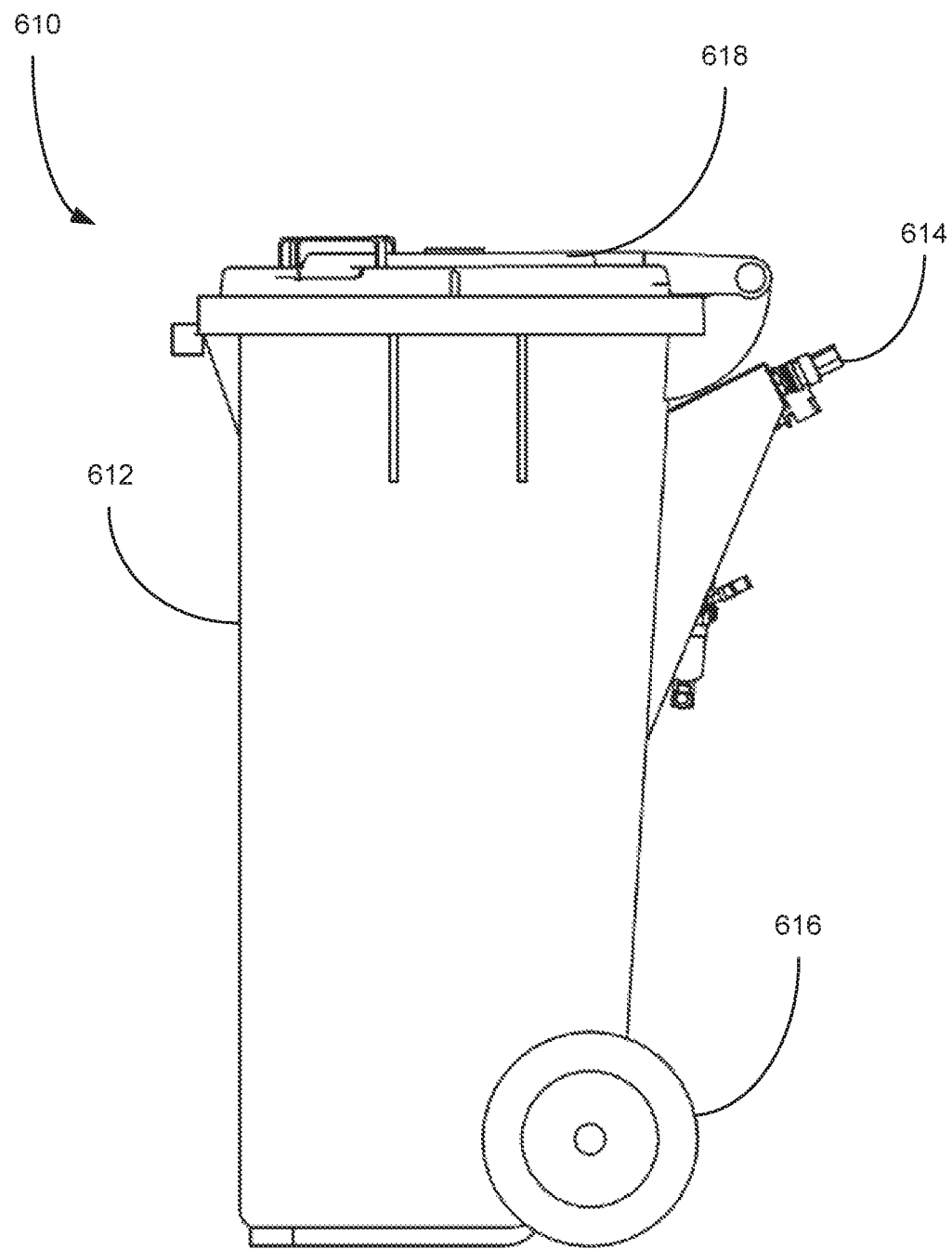
FIG. 27 is a side view of a supply system.
Figure 28:
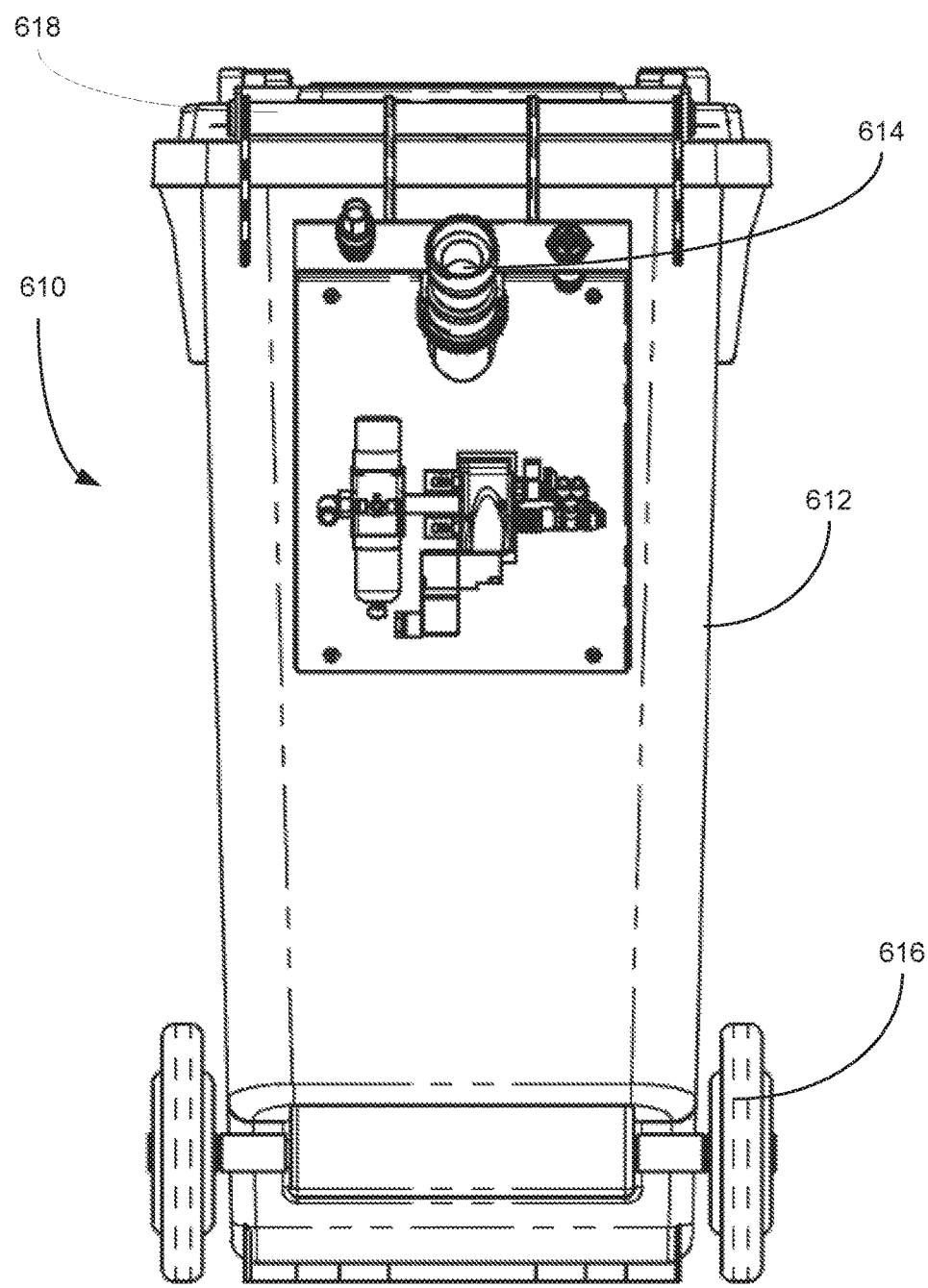
FIG. 28 is a rear view of the supply system shown in FIG. 27.
Figure 29:
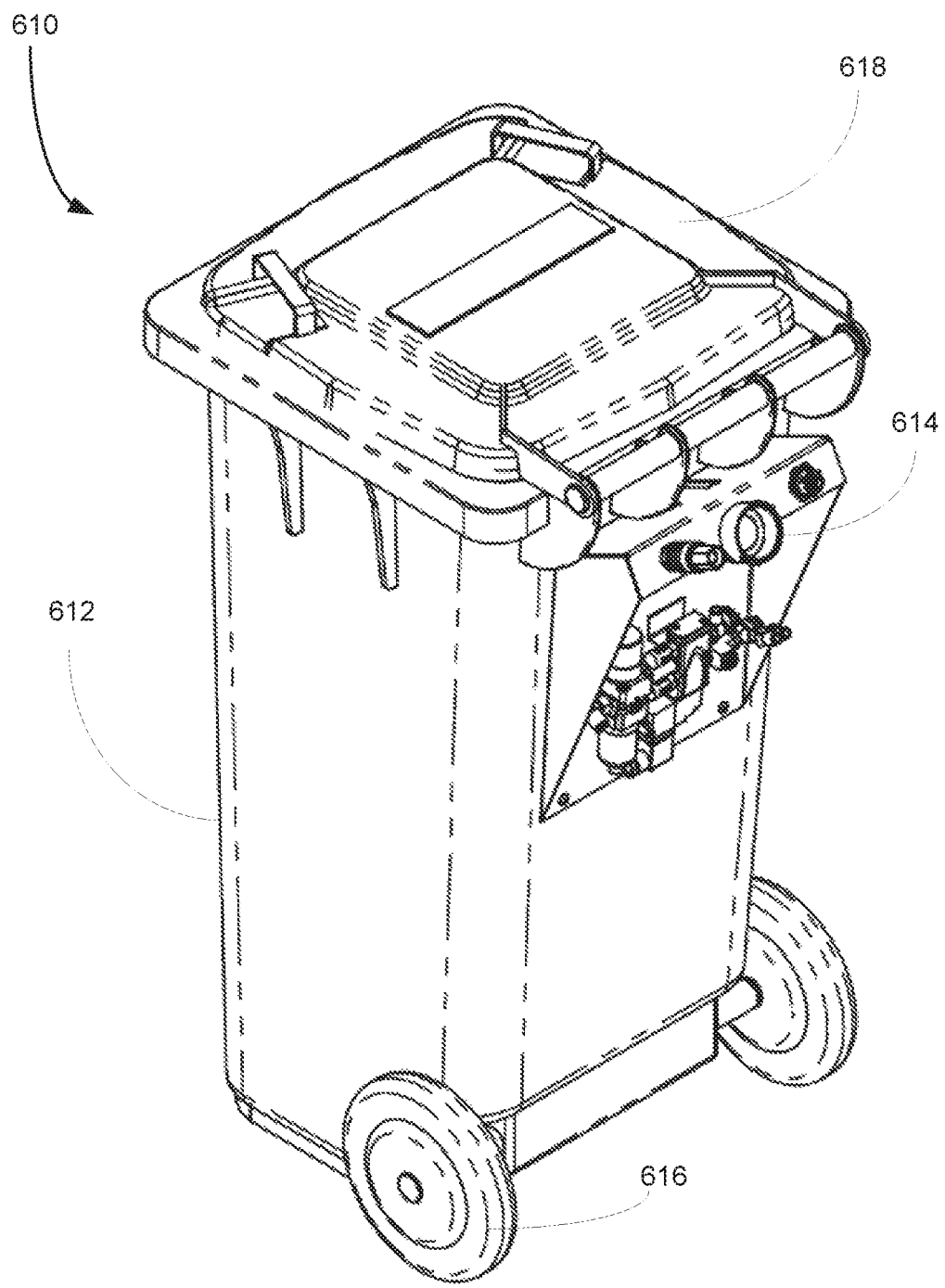
FIG. 29 is a perspective view of the supply system shown in FIG. 27.

Referring to FIGS. 27 through 29, the supply system 610 may include a rigid outer housing 612. In some aspects, the outer housing 612 may fully or substantially enclose the components therein. For example, the outer housing 612 may be formed from a plastic bin. In other aspects, the outer housing 612 may not fully enclose the internal components of the supply system 10. For example, the outer housing 612 may be comprised of a structural frame with open sides. A lid 618 may be hingedly attached to the top of the outer housing 612. Further, one or more wheels 616 may be attached to a bottom portion of the outer housing 612 to facilitate movement of the supply system 610.

The outer housing 612 may include a transfer hose connection 614 through which adhesive particulate may be suctioned or otherwise discharged from the supply system 610. The transfer hose connection 614 may be a connection piece that allows the supply system 610 to connect to and supply a separate device with adhesive particulate. The transfer hose connection 614 may be configured to create a seal with the separate device, such as a melter, such that suction is created between the supply system 610 and the separate device, thus allowing for the discharge of adhesive particulates.

Figure 30:
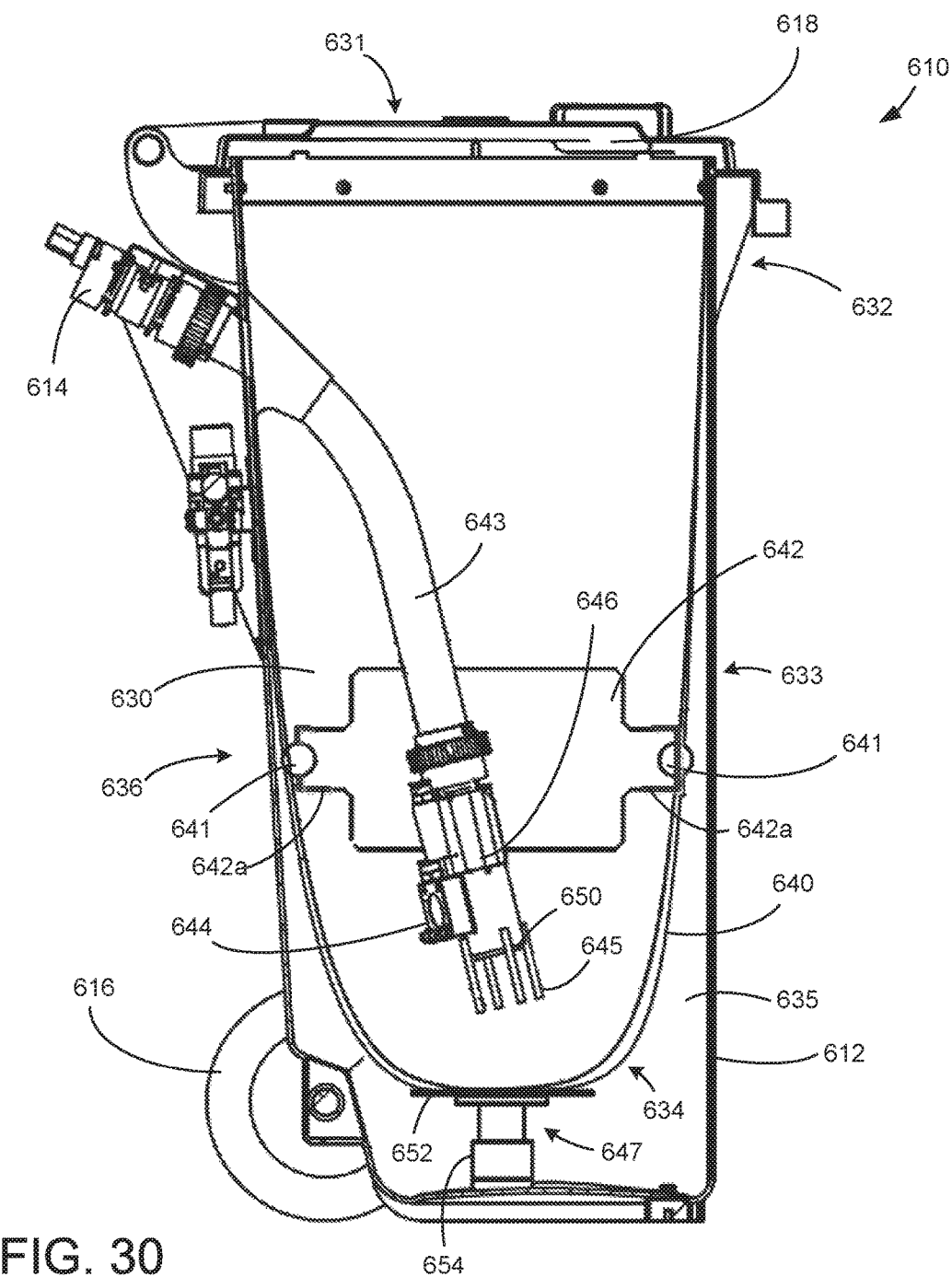
FIG. 30 is a cross-sectional view of a supply system with an agitator plate.
Figure 31:
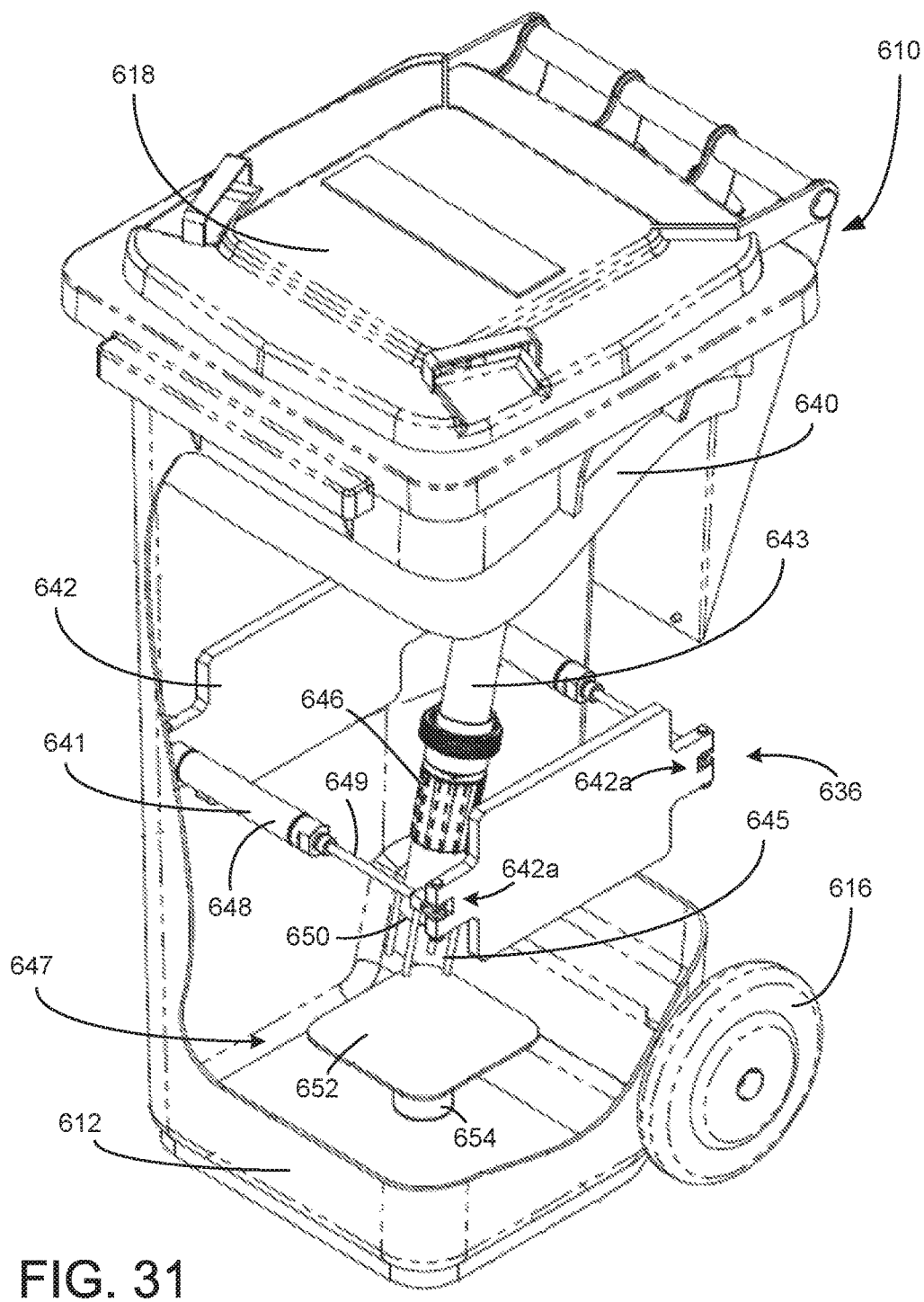
FIG. 31 is a perspective cross-sectional view of the supply system shown in FIG. 30.
Figure 32:
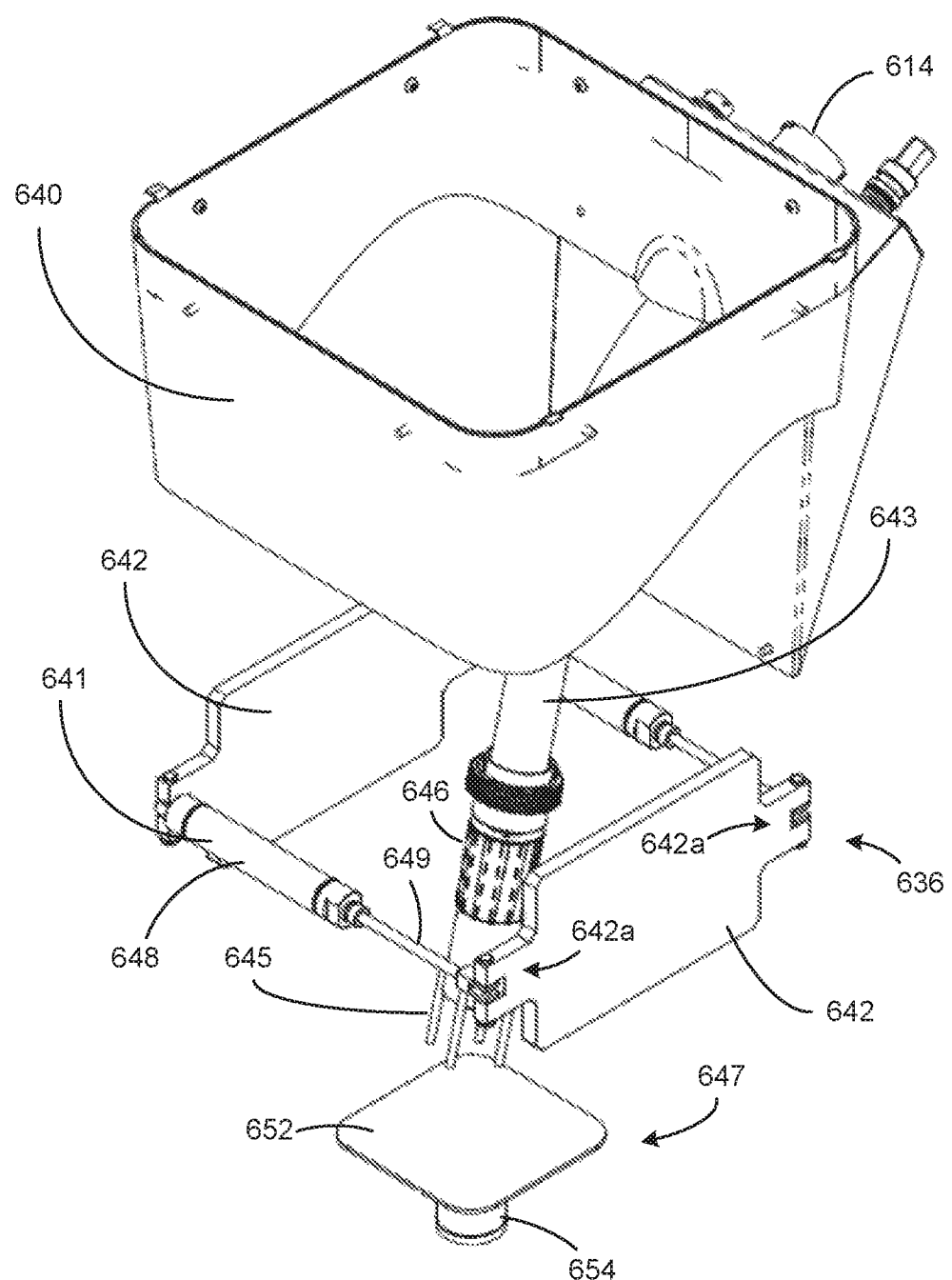
FIG. 32 is a perspective view of interior components of the supply system shown in FIG. 30.

Referring to FIGS. 30 through 32, which further depict internal components of the supply system 610, a flexible inner housing 640 (not shown in FIGS. 31 and 32) is disposed within the outer housing 612 to receive the adhesive particulate. The flexible inner housing 640 may be formed as a bag or similar shape and constructed from a fabric or other flexible material that is suitably durable to sustain repeated motions without tearing or weakening. The flexible inner housing 640 at least partially defines an inner cavity 630 in which the adhesive particulate is held and dispensed from. In some aspects, the inner cavity 630 may be partially defined by the outer housing 612 and partially defined by the flexible inner housing 640. A top opening 631 of the flexible inner housing 640, and thus also of the inner cavity 630, may be defined by a periphery of a top portion 632 of the flexible inner housing 640. The adhesive particulate may be supplied to the flexible inner housing 640 via the top opening 631.

The flexible inner housing 640 may be supported by the outer housing 612. For example, the top portion 632 of the flexible inner housing 640 may be affixed to the outer housing 612 while side portions 633 and a bottom portion 634 of the flexible inner housing 640 remain un-affixed to the outer housing 612. An outer cavity 635 may be defined between the flexible inner housing 640 and the outer housing 612.

A suction lance 643, which may include an elongated hollow tube, is connected to the transfer hose connection 614 at an upper end and situated within the inner cavity 630 at a lower end. At the lower end of the suction lance 643, a transfer pump 646 having a transfer opening 650 provides suction or other motive means to cause, at least in part, the transfer of adhesive particulate from the inner cavity 630 to an attached device through the transfer hose connection 614. In some aspects, the suction or other motive means may be provided additionally or alternatively by a pump or other mechanism at the transfer hose connection 614 or further downstream from the transfer hose connection 614.

An agitator 636 facilitates movement of adhesive particulate within the inner cavity 630 and/or prevents clumping and sticking of adhesive particulate. In the embodiment depicted in FIGS. 30 through 32, the agitator 636 includes one or more elongated agitator plates 642 situated in the outer cavity 635 external to and on opposite sides of the flexible inner housing 640. The agitator plates 642 may be coupled, at respective elongate ends 642a, to one another or another structure in the outer housing 612 via one or more actuators 641, such as pneumatic or hydraulic actuators. Each actuator 641 may include a cylinder 648 and a reciprocating rod 649. The agitator 636, including the one or more agitator plates 642 and one or more actuators 641, may preferably be situated above (i.e., closer to the top portion 632 of the flexible inner housing 640) the transfer opening 650 of the transfer pump 646.

Upon the reciprocating operation of the one or more actuators 641, the agitator plates 642 may laterally engage with the side portions 633 of the flexible inner housing 640 to manipulate the shape of the flexible inner housing 640 and, thus, the adhesive particulate therein. The external lateral forces imparted upon the adhesive particulate by the agitator plates 642 may serve to prevent undesirable bridging or "ratholing" near the transfer opening 650 of the transfer pump 646 of the suction lance 643 and/or prevent or break up clumping of adhesive particulate before it reaches the area of the inner cavity 630 (e.g., the area proximate the bottom portion 34 of the flexible inner housing 40) from which the transfer pump 646 draws adhesive particulate. For example, "ratholing" may occur when a central void forms above the transfer opening 650 of the transfer pump 646 while adhesive particulate along the circumferential periphery of the inner cavity 630 fails to flow into the central void. The lateral force and manipulation caused by the actuation of the agitator plates 642 urges the adhesive particulate along the circumferential periphery of the inner cavity 630 to move to and fill in the central void and thus be suctioned into the transfer opening 650 of the transfer pump 646.

To further facilitate movement of adhesive particulate within the inner cavity 630, the transfer pump 646 may be configured with a vibrator 644 and pins 645. The vibrator 644 causes the transfer pump 646 and attached pins 645 to vibrate, thus agitating any adhesive particulate located near the transfer pump 646. The pins 645 may be affixed to the transfer pump 646 around a periphery of the transfer opening 650 and extend in a direction generally parallel to an elongate axis of the transfer pump 646 and/or the suction lance 643.

A vertical agitator 647 may be disposed in the outer cavity 635 between the bottom portion 634 of the flexible inner housing 640 and the bottom of the outer housing 612. The vertical agitator 647 may engage the bottom portion 634 of the flexible inner housing 640 to agitate by, for example, vertical oscillations, the adhesive particulate therein. For example, the vertical agitator 647 may include a vertical agitator plate 652 operatively connected to a vertical actuator 654. The vertical actuator 654 may be configured to vertically oscillate (i.e., in directions generally towards and away from the top opening 631 of the flexible inner housing 640) the vertical agitator plate 652, which is in contact with the bottom portion 634 of the flexible inner housing 640. The vertical oscillation of the vertical agitator plate 652 causes agitation of the adhesive particulate within the flexible inner housing 640, particularly the adhesive particulate proximate the transfer opening 650 of the transfer pump 646, to facilitate flow of the adhesive particulate into the transfer pump 646.

Figure 33:
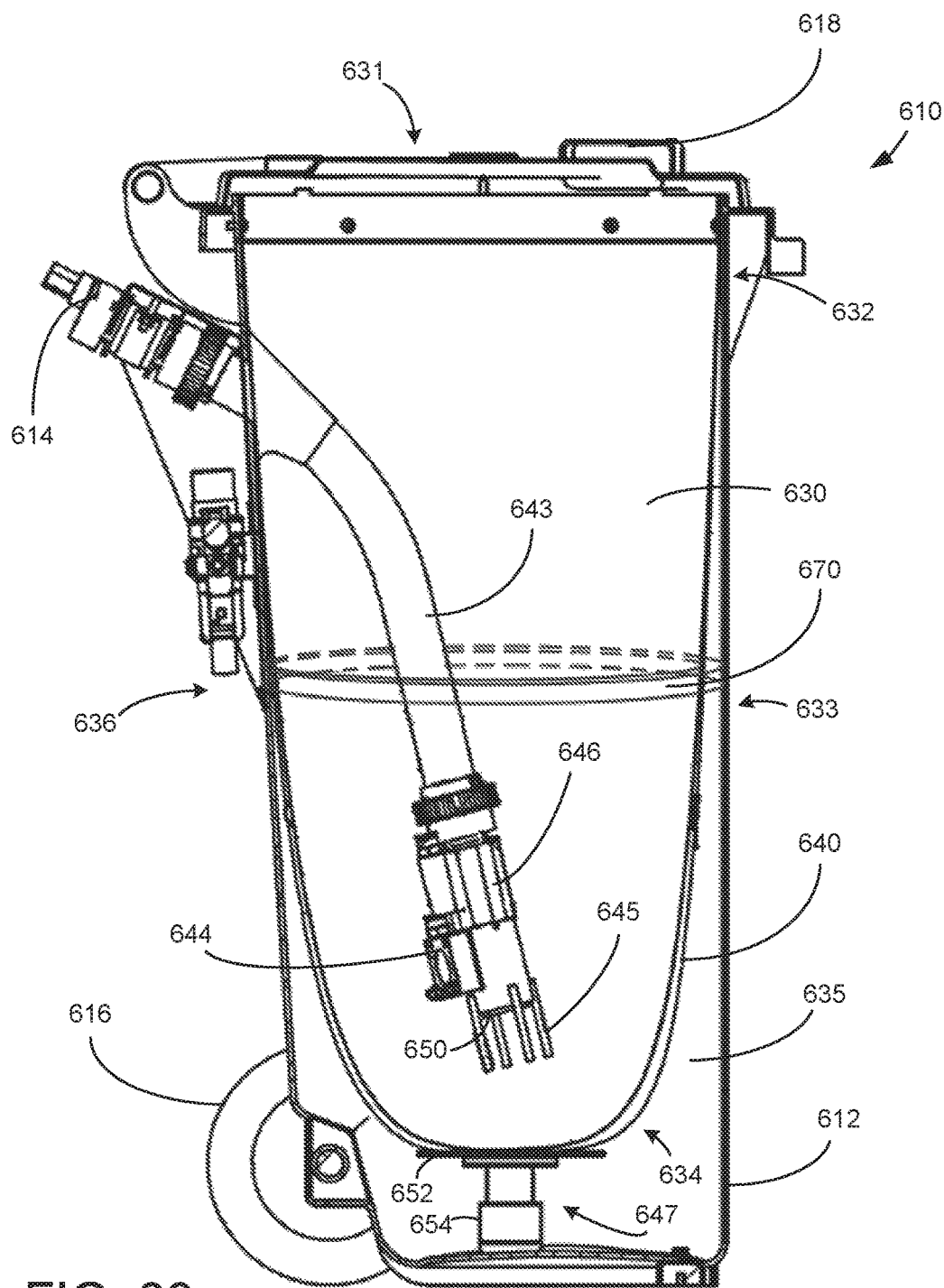
FIG. 33 is a cross-sectional view of a supply system with an agitator ring.

FIG. 33 depicts an alternative embodiment of the supply system 610 in which the agitator 636 comprises an agitator ring 670, which may be circular, elliptical, or other generally round shape. The agitator ring 670 may be disposed in the outer cavity 635 between the outer housing 612 and the flexible inner housing 640 such that the agitator ring 670 may at least partially contact the flexible inner housing 640. The agitator ring 670 may be configured to rotate eccentrically around the flexible inner housing 640 such that the agitator ring 670 applies a lateral force to the flexible inner housing 640. Due the eccentric rotation of the agitator ring 670, the circumferential point of the flexible inner housing 640 at which the agitator ring 670 applies a lateral force to the flexible inner housing 640 will be continuously varied. The lateral force applied by the agitator ring 670 causes adhesive particulates inside of the flexible inner housing 640 to agitate, urging the adhesive particulates to drop down to the transfer pump 646 and be discharged.

In an aspect, the agitator 636 may include multiple agitator rings 670. The multiple agitator rings 670 may be configured to rotate eccentrically in concert with each other, in a specified pattern or sequence, or in an unrelated manner (e.g., the rotation of a first agitator ring 670 is out of sync with a second agitator ring 670). Each agitator ring 670 may rotate at the same speed or variable speeds (e.g., a first agitator ring 670 rotates at a different speed as that of a second agitator ring 670). Similarly, the agitator rings 670 may be formed in the same shape or different shapes. It will be appreciated that agitator rings 670 that are not perfectly round may rotate on a fixed axis and still accomplish the desired function in agitating the adhesive particulates inside of the flexible inner housing 640.

Figure 34:
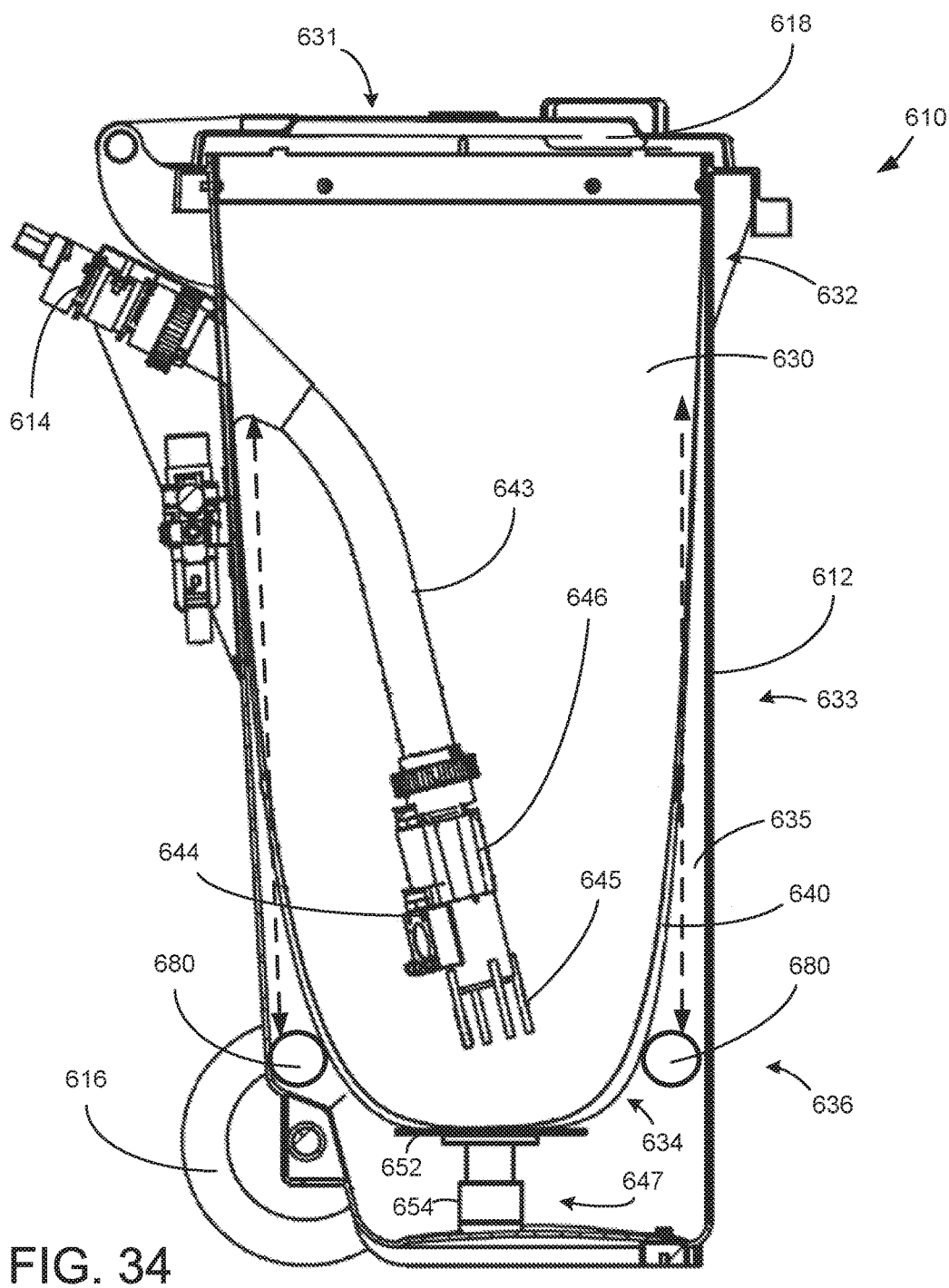
FIG. 34 is a cross-sectional view of a supply system with an agitator bar.

FIG. 34 depicts an alternative embodiment of the supply system 610 in which the agitator 636 includes one or more agitator bars 680. As indicated by the corresponding arrows, the one or more agitator bars 680 may each move generally vertically up and down in the outer cavity 635 between the outer housing 612 and the flexible inner housing 640. During at least a portion of the vertical travel of the one or more agitator bars 680, the one or more agitator bars 680 may be in contact with the flexible inner housing 640. The one or more agitator bars 680 may be spaced from one another or an opposite side wall of the outer housing 612 such that as the one or more agitator bars 680 move vertically up and down, the flexible inner housing 640 therebetween is compressed, thus causing a lateral force to the adhesive particulate within the corresponding portion of the inner cavity 630 and facilitating its movement.

The agitator 636 may include one or multiple agitator bars 680. The agitator bars 680 may be of varying cross-sectional shapes, such as round, square, triangular, etc. and may be straight, curved, or other shape. The agitator bars 680 may each be formed as a roller. In embodiments with multiple agitator bars 680, the agitator bars 680 may move up and down in concert with each other, in a specified pattern or sequence, or in an unrelated manner. For example, the agitator bars 680 may be configured such that one more upwards while another moves downward and vice versa. The agitator bars 680 may move at the same speed or at variable speeds.

It will be appreciated that the various agitation components of the supply system 610, such as the agitator 636, the agitator plates 642, the vibrator 644, the pins 645, the vertical agitator 647, the agitator ring 670, and/or the agitator bars 380, may be operated sequentially, concurrently, or in concert in a predetermined pattern. For example, in the embodiment depicted in FIGS. 32 through 33, the agitator plates 642 may be initially operated following an extended period of disuse of the supply system 610 to break up any agglomerations of adhesive particulate that formed during the period of disuse. During this initial period of agitator plate 642 operation, the vibrator 644 and the vertical agitator 647 may remain idle. After the agglomerations of adhesive particulate are broken up and the supply system 610 is ready to supply adhesive particulate, the agitator plates 642, the vibrator 644, and the vertical agitator 647 may all operate simultaneously. As another example, the agitator plates 642 and vibrator 644 may be configured to operate such that the vibrator 644 does not vibrate during the compressive stroke of the agitator plates 642 but does vibrate during the expansive stroke of the agitator plates 642.

Figure 35:
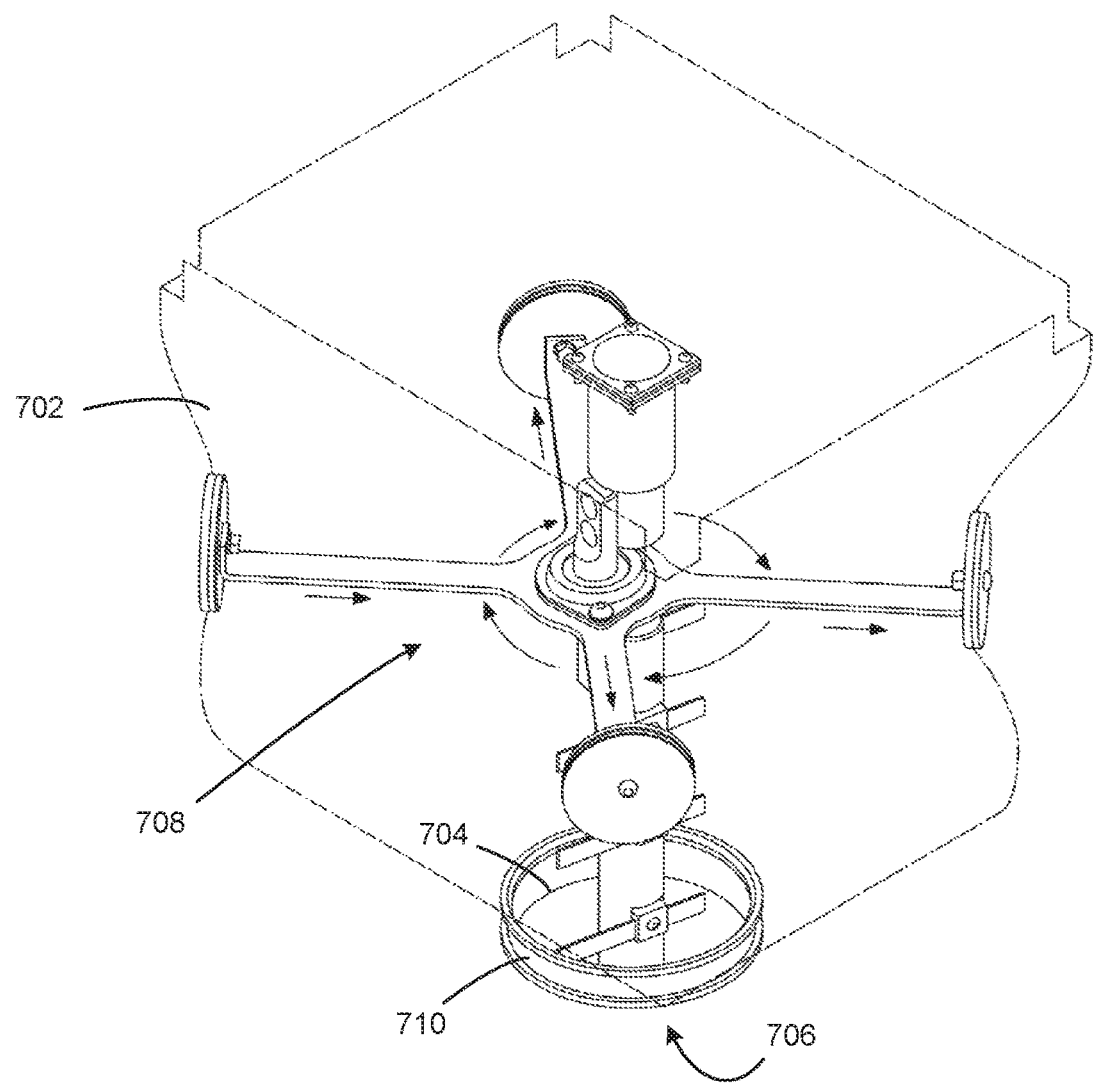
FIG. 35 is a partially-transparent perspective view of a flexible hopper with an articulation device.

FIG. 35 depicts an illustrative embodiment of an independent flexible hopper 702, having a plurality of side walls defining an interior, that is configured to hold a supply of particulate hot melt adhesive. The side walls of the flexible hopper 702 are depicted as transparent in FIG. 35 so that the various other components may be visualized. The flexible hopper 702 includes an aperture 704 defining an outlet 706 through which the particulate hot melt adhesive may be supplied, such as to another device. In some aspects, the aperture 704 may be positioned in a bottom surface of the flexible hopper 702 (as shown in FIG. 35) so that the flow of particulate hot melt adhesive through the outlet 706 is generally in a direction parallel with the longitudinal axis of the flexible hopper 702. While in other aspects, the aperture 704 may be positioned at the bottom of one of the plurality of side walls so that the flow of particulate hot melt adhesive through the outlet 706 is generally in a direction perpendicular to the longitudinal axis of the flexible hopper 702.

The flexible hopper 702 further includes an articulation device 708, such as the articulation device 102 depicted in FIGS. 2 through 5, that is operable to move a section of a side wall of the flexible hopper 702 relative to another section of the side wall. This movement of the section of the side wall may move a portion of the particulate hot melt adhesive that is adjacent to the side wall towards a central interior location of the flexible hopper 702.

Figure 36:
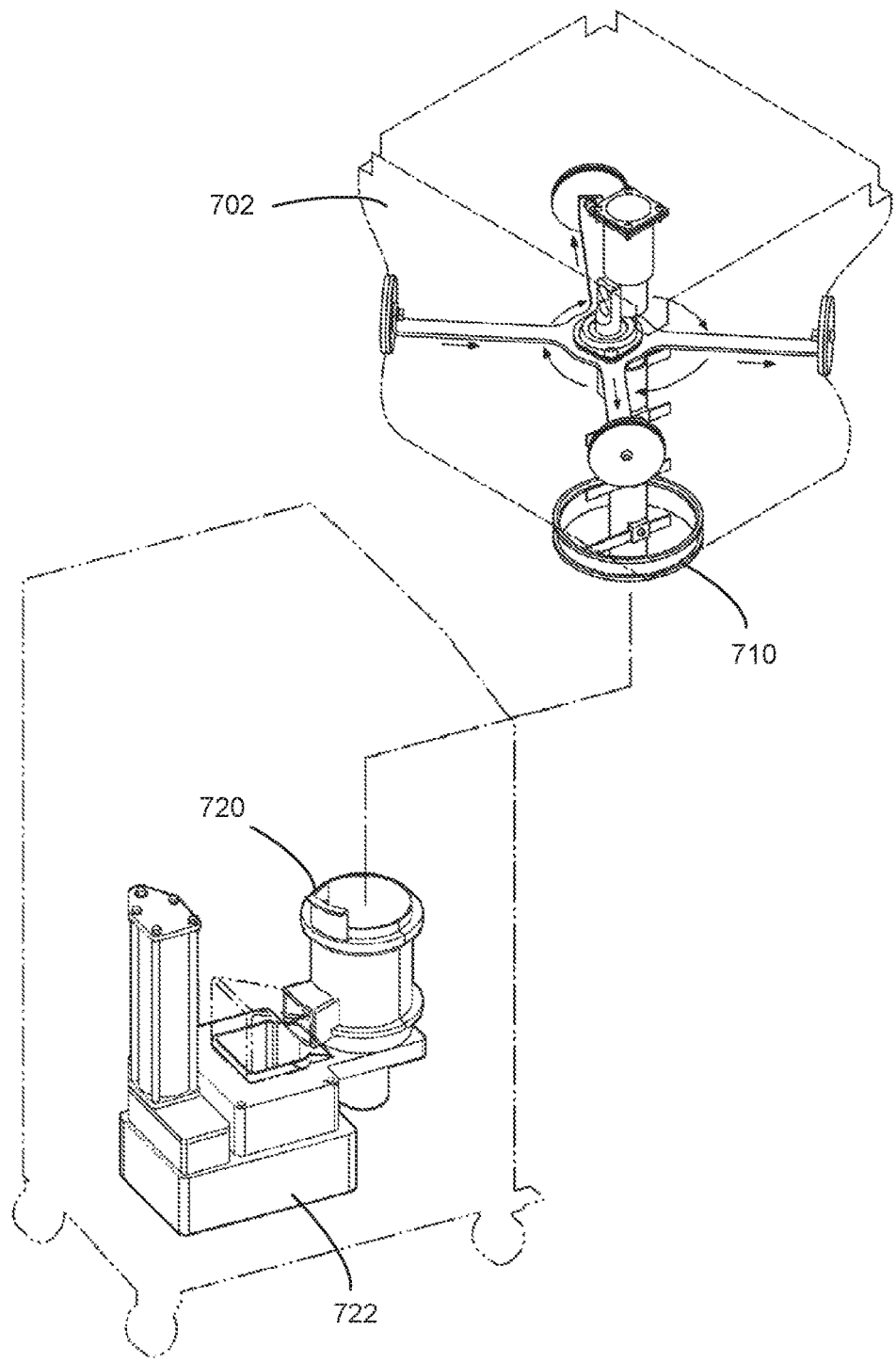
FIG. 36 is a perspective view of the flexible hopper of FIG. 35 showing a connection to a feed device and melter.

The flexible hopper 702 is configured with a coupling element 710, which may include the aperture 704, to connect the flexible hopper 702 with another device, such as a melter or an intermediate distribution or feed device connected to a melter, that receives the particulate hot melt adhesive supplied from the flexible hopper 702. For example, FIG. 36 depicts the connection of the flexible hopper 702, via the coupling element 710, with a feed device 720 which, in turn, is connected to a melter 722.

Figure 37:
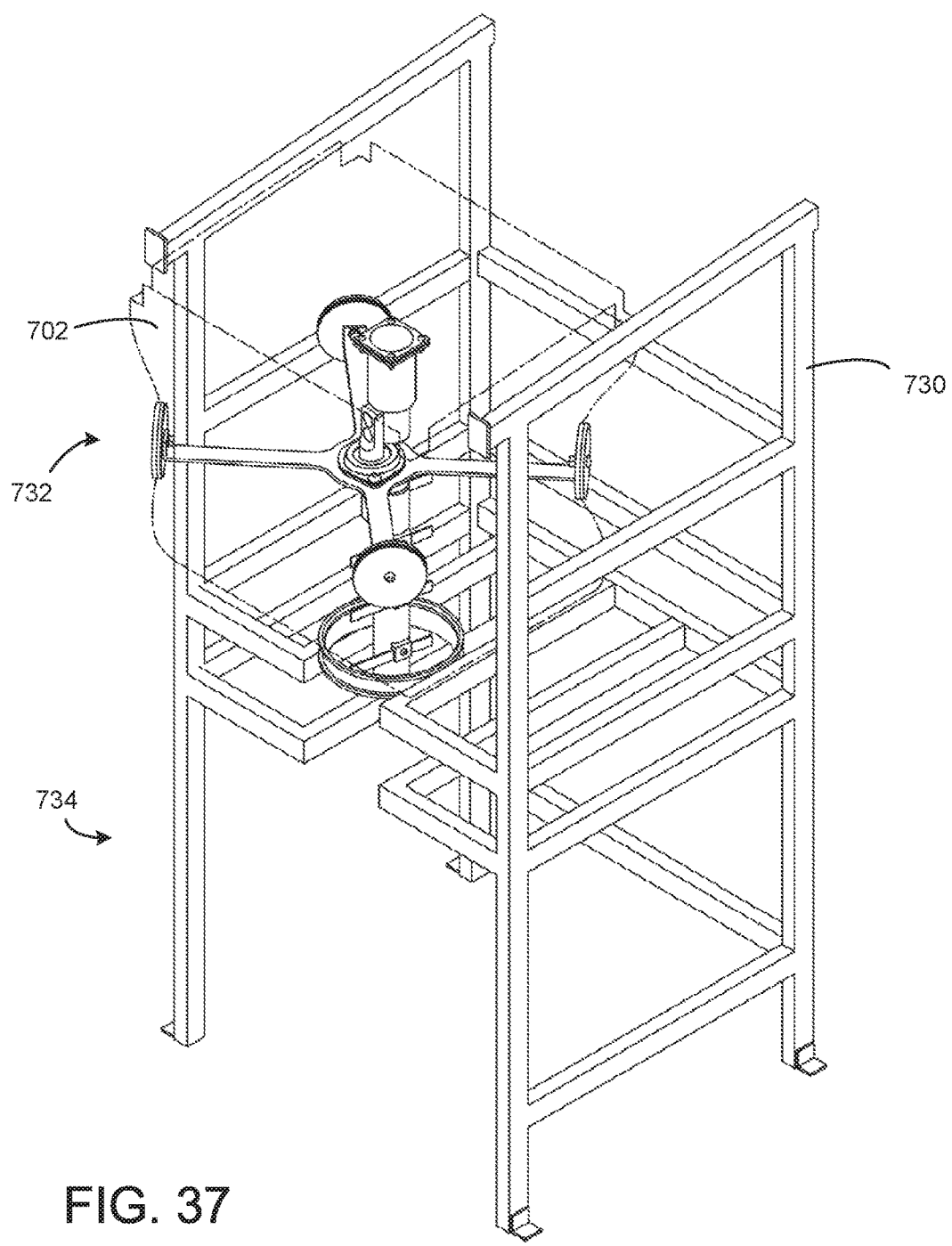
FIG. 37 is a perspective view of the flexible hopper of FIG. 35 supported by a frame structure.

As shown in FIG. 37, the flexible hopper 702 may be supported by a frame structure 730. The frame structure 730 may be configured such that a top portion 732 of the frame structure 730 accommodates and supports the flexible hopper 702 and a bottom portion 734 of the frame structure 730 accommodates a device, such as a melter or an intermediate feed device connected to a melter, that receives the particulate hot melt adhesive from the flexible hoper 702.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A melter for heating and melting particulate hot melt adhesive into a liquefied form, the melter comprising:
   a heated receiving device having an interior with an inlet configured to receive the particulate hot melt adhesive and an outlet, the heated receiving device operative to heat and melt the particulate hot melt adhesive, and to direct the liquified hot melt adhesive to the outlet;
   a hopper configured to hold a supply of the particulate hot melt adhesive, the hopper being at least partially defined by a movable wall;
   an articulation device comprising a driven element configured to move the movable wall to move the particulate hot melt adhesive adjacent to the movable wall toward a central interior location of the hopper; and
   a particulate hot melt adhesive feed device configured to allow the particulate hot melt adhesive to be directed from the hopper to the inlet of the heated receiving device.

2. The melter of claim 1, wherein the hopper is a bag.

3. The melter of claim 2, wherein the bag further comprises a fabric.

4. The melter of claim 1, wherein at least a portion of the articulation device is operatively coupled to an exterior of the movable wall.

5. The melter of claim 1, wherein at least a portion of the articulation device is operatively coupled to an interior of the movable wall.

6. The melter of claim 1, further comprising a driven device positioned within the hopper, the driven device configured to move the particulate hot melt adhesive within the hopper.

7. The melter of claim 6, wherein the driven device comprises at least one rotating element configured to stir the particulate hot melt adhesive.

8. The melter of claim 1, further comprising:
a driven feed element positioned within the particulate hot melt adhesive feed device, the driven feed element configured to move the particulate hot melt adhesive from the hopper to the inlet of the heated receiving device; and
a cover mounted for movement adjacent to the inlet of the heated receiving device between an open condition and a closed condition, wherein the cover is in the open condition when the adhesive feed device is activated to move the particulate hot melt adhesive to the inlet, and the cover is in the closed condition when the adhesive feed device is not moving the particulate hot melt adhesive to the inlet.

9. The melter of claim 8, wherein the driven feed element further comprises at least one of a rotating wheel, an auger, or a conveyor.

10. The melter of claim 8, wherein the cover is heated and, in the closed condition, particulate hot melt adhesive will melt and flow past the cover into the interior of the heated receiving device.

11. The melter of claim 1, further comprising:
an inlet opening within the heated receiving device, the inlet opening configured to receive the particulate hot melt adhesive;
a driven feed element positioned within the particulate hot melt adhesive feed device, the driven feed element configured to move the particulate hot melt adhesive from the hopper to the inlet of the heated receiving device; and
an air mover device positioned proximate the inlet opening of the heated receiving device, the air mover device configured to direct air across the inlet opening.

12. The melter of claim 8, wherein the cover further comprises a rupturable element.

13. The melter of claim 1, wherein the hopper is a prepackaged container.

14. The melter of claim 13, further comprising:
a container mounting component positioned adjacent the heated receiving device, wherein the prepackaged container is directly connected to the container mounting component, and wherein the prepackaged container is configured to be connected to and disconnected from the container mounting component to allow removal of one prepackaged container and replacement by a different prepackaged container.

15. The melter of claim 1, wherein the hopper is a hopper.

16. The melter of claim 1, wherein the hopper is a rigid container.

17. The melter of claim 1, wherein the driven element is configured to move the movable wall inward and outward.

18. A method for heating and melting particulate hot melt adhesive into a liquefied form, the method comprising:
holding a supply of the particulate hot melt adhesive in a hopper being at least partially defined by a movable wall and including an outlet coupled in fluid communication with a pathway leading to an inlet of a heated receiving device;
moving the movable wall of the hopper to move the particulate hot melt adhesive adjacent to the movable wall toward a central interior location of the hopper;
feeding the particulate hot melt adhesive from the outlet of the hopper through the inlet of the heated receiving device;
heating and melting the particulate hot melt adhesive in an interior of the heated receiving device;
directing liquefied hot melt adhesive from the interior of the heated receiving device to an outlet of the heated receiving device; and
pumping the liquefied hot melt adhesive from the outlet to a hot melt adhesive dispenser.

19. The method of claim 18, further comprising moving the particulate hot melt adhesive in the hopper by moving a device within the hopper.

20. The method of claim 19, wherein moving the particulate hot melt adhesive by moving a device further comprises rotating the device within the hopper.

21. The method of claim 18, wherein moving the movable wall comprises moving the movable wall with respect to another wall portion of the hopper.

22. The method of claim 21, wherein moving the movable wall comprises engaging an interior surface of the movable wall with a driven device.

23. The method of claim 21, wherein moving the movable wall comprises engaging an exterior surface of the movable wall portion with a driven device.

24. The method of claim 18, wherein the hopper is a first prepackaged container, and the outlet is a first outlet.

25. The method of claim 24, further comprising:
removing the first prepackaged container from fluid communication with the pathway;
replacing the first prepackaged container with a second prepackaged container of particulate hot melt adhesive including a second outlet;
feeding the particulate hot melt adhesive from the second outlet of the second prepackaged container through the inlet of the heated receiving device;
heating and melting the particulate hot melt adhesive from the second prepackaged container in an interior of the heated receiving device;
directing liquefied hot melt adhesive from the interior of the heated receiving device to an outlet of the heated receiving device; and
pumping the liquefied hot melt adhesive from the outlet to a hot melt adhesive dispenser.

26. The method of claim 25, wherein the first and second prepackaged containers further comprise flexible bags, and the method further comprises:
opening respective first and second covers disposed over the first and second outlets either during or after coupling the first and second prepackaged containers, respectively, to a melter.

* * * * *